United States Patent
Strohmenger et al.

(10) Patent No.: US 11,927,929 B2
(45) Date of Patent: Mar. 12, 2024

(54) MODELING OF AN INDUSTRIAL AUTOMATION ENVIRONMENT IN THE CLOUD

(71) Applicant: Rockwell Automation Technologies, Inc., Mayfield Heights, OH (US)

(72) Inventors: John Strohmenger, Strongsville, OH (US); Jessica L Korpela, Milwaukee, WI (US); Matthew W. Fordenwalt, Hudson, OH (US); Jan Pingel, Weddington, NC (US); Stephen L Hickox, Middlefield, OH (US); Douglas B. Weber, Glendale, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 6 days.

(21) Appl. No.: 17/812,894

(22) Filed: Jul. 15, 2022

(65) Prior Publication Data

US 2023/0013700 A1 Jan. 19, 2023

Related U.S. Application Data

(63) Continuation of application No. 16/599,276, filed on Oct. 11, 2019, now Pat. No. 11,409,251, which is a
(Continued)

(51) Int. Cl.
*G05B 17/02* (2006.01)
*G05B 19/4155* (2006.01)
*G05B 19/418* (2006.01)

(52) U.S. Cl.
CPC ......... *G05B 17/02* (2013.01); *G05B 19/4155* (2013.01); *G05B 19/41885* (2013.01);
(Continued)

(58) Field of Classification Search
CPC ............... G05B 17/02; G05B 19/4155; G05B 19/41885; G05B 2219/23456;
(Continued)

(56) References Cited

U.S. PATENT DOCUMENTS

| 5,014,317 A | 5/1991 | Kita et al. |
| 5,122,948 A | 6/1992 | Zapolin |

(Continued)

FOREIGN PATENT DOCUMENTS

| CN | 1232553 A | 10/1999 |
| CN | 1255208 | 5/2000 |

(Continued)

OTHER PUBLICATIONS

Non-Final Office Action received for U.S. Appl. No. 14/658,345 dated Jun. 24, 2021, 73 pages.
(Continued)

*Primary Examiner* — Chad G Erdman
(74) *Attorney, Agent, or Firm* — Amin, Turocy & Watson, LLP

(57) ABSTRACT

A cloud-based modeler component that generates interactive models of an industrial automation system(s) (IAS(s)) is presented. An interactive model facilitates remote viewing of, interaction with, troubleshooting of problems with, or optimization of industrial assets of an IAS. The modeler component polls industrial assets via cloud gateways to obtain information relating to the industrial assets to identify industrial assets of the IAS and relationships with other industrial assets or can receive information from a communication device that obtains information relating to legacy industrial assets to identify those legacy assets and their relationships. The modeler component generates an interactive model of the industrial assets of the IAS based on the information. The modeler component also can discover new
(Continued)

industrial assets added to the IAS, can receive a pre-deployed model of an industrial asset from the industrial asset or another source, and can incorporate the pre-deployed model in the interactive model.

20 Claims, 22 Drawing Sheets

Related U.S. Application Data continuation of application No. 14/658,327, filed on Mar. 16, 2015, now Pat. No. 10,496,061.

(52) U.S. Cl.
CPC ............ *G05B 2219/23456* (2013.01); *G05B 2219/31368* (2013.01); *Y02P 90/02* (2015.11); *Y02P 90/80* (2015.11)

(58) Field of Classification Search
CPC .......... G05B 2219/31368; G05B 13/04; Y02P 90/02; Y02P 90/80
See application file for complete search history.

(56) References Cited

U.S. PATENT DOCUMENTS

| | | |
|---|---|---|
| 5,199,009 A | 3/1993 | Svast |
| 5,598,572 A | 1/1997 | Tanikoshi et al. |
| 5,611,059 A | 3/1997 | Benton et al. |
| 5,612,869 A | 3/1997 | Letzt et al. |
| 5,682,460 A | 10/1997 | Hyziak et al. |
| 5,710,885 A | 1/1998 | Bondi |
| 5,844,794 A | 12/1998 | Keeley |
| 5,845,149 A | 12/1998 | Husted et al. |
| 5,856,931 A | 1/1999 | McCasland |
| 5,957,985 A | 9/1999 | Wong et al. |
| 5,966,301 A | 10/1999 | Cook et al. |
| 5,970,430 A | 10/1999 | Burns et al. |
| 5,978,568 A | 11/1999 | Abraham et al. |
| 6,167,337 A | 12/2000 | Haack et al. |
| 6,175,770 B1 | 1/2001 | Bladow |
| 6,175,801 B1 | 1/2001 | Millington |
| 6,199,068 B1 | 3/2001 | Carpenter |
| 6,279,113 B1 | 8/2001 | Vaidya |
| 6,282,455 B1 | 8/2001 | Engdahl |
| 6,324,607 B1 | 11/2001 | Korowitz et al. |
| 6,381,502 B1 | 4/2002 | Rudder et al. |
| 6,400,996 B1 | 6/2002 | Hoffberg et al. |
| 6,412,032 B1 | 6/2002 | Neet et al. |
| 6,437,692 B1 | 8/2002 | Petite et al. |
| 6,457,024 B1 | 9/2002 | Felsentein et al. |
| 6,463,338 B1 | 10/2002 | Neet |
| 6,466,972 B1 | 10/2002 | Paul et al. |
| 6,529,780 B1 | 3/2003 | Soergel et al. |
| 6,535,926 B1 | 3/2003 | Esker |
| 6,578,005 B1 | 6/2003 | Lesaint et al. |
| 6,624,388 B1 | 9/2003 | Blankenship et al. |
| 6,640,145 B2 | 10/2003 | Hoffberg et al. |
| 6,651,062 B2 | 11/2003 | Ghannam et al. |
| 6,675,226 B1 | 1/2004 | Nair et al. |
| 6,686,838 B1 | 2/2004 | Rezvani et al. |
| 6,691,159 B1 | 2/2004 | Grewal et al. |
| 6,705,229 B2 | 3/2004 | Frankenberger |
| 6,708,074 B1 | 3/2004 | Chi et al. |
| 6,708,385 B1 | 3/2004 | Lemelson |
| 6,714,974 B1 | 3/2004 | Machida |
| 6,728,262 B1 | 4/2004 | Woram |
| 6,732,165 B1 | 5/2004 | Jennings, III |
| 6,732,191 B1 | 5/2004 | Baker et al. |
| 6,757,897 B1 | 6/2004 | Shi et al. |
| 6,774,598 B1 | 8/2004 | Kohler et al. |
| 6,801,920 B1 | 10/2004 | Wischinski |
| 6,819,960 B1 | 11/2004 | McKelvey et al. |
| 6,891,850 B1 | 5/2005 | Vandesteeg et al. |
| 6,895,532 B2 | 5/2005 | Raynham |
| 6,904,600 B1 | 6/2005 | James et al. |
| 6,907,302 B2 | 6/2005 | Karbassi |
| 6,920,502 B2 | 7/2005 | Araujo et al. |
| 6,952,680 B1 | 10/2005 | Melby et al. |
| 6,965,802 B2 | 11/2005 | Sexton |
| 6,968,242 B1 | 11/2005 | Hwu et al. |
| 6,970,913 B1 | 11/2005 | Albert et al. |
| 6,982,953 B1 | 1/2006 | Swales |
| 7,032,045 B2 | 4/2006 | Kostadinov |
| 7,085,814 B1 | 8/2006 | Gandhi et al. |
| 7,103,428 B2 | 9/2006 | Varone et al. |
| 7,133,900 B1 | 11/2006 | Szeto |
| 7,149,792 B1 | 12/2006 | Hansen et al. |
| 7,151,966 B1 | 12/2006 | Baier et al. |
| 7,203,560 B1 | 4/2007 | Wylie et al. |
| 7,210,095 B1 | 4/2007 | Mor |
| 7,233,830 B1 | 6/2007 | Callaghan et al. |
| 7,242,009 B1 | 7/2007 | Wilson et al. |
| 7,275,037 B2 | 9/2007 | Lauer |
| 7,277,865 B1 | 10/2007 | Silverstone et al. |
| 7,289,994 B2 | 10/2007 | Nixon et al. |
| 7,298,275 B2 | 11/2007 | Brandt et al. |
| 7,310,344 B1 | 12/2007 | Sue |
| 7,383,155 B2 | 6/2008 | Rosam et al. |
| 7,412,548 B2 | 8/2008 | Sichner |
| 7,428,495 B2 | 9/2008 | Dhar et al. |
| 7,478,010 B2 | 1/2009 | Hashemian |
| 7,480,728 B2 | 1/2009 | Evans |
| 7,539,724 B1 | 5/2009 | Callaghan |
| 7,734,590 B2 | 6/2010 | Chand et al. |
| 7,827,122 B1 | 11/2010 | Campbell, Jr. et al. |
| 7,831,317 B2 | 11/2010 | McGreevy et al. |
| 8,150,959 B1 | 4/2012 | Bezdicek et al. |
| 8,266,066 B1 | 9/2012 | Wezter et al. |
| 8,353,012 B2 | 1/2013 | Del Real |
| 8,392,845 B2 | 3/2013 | Cahill et al. |
| 8,451,753 B2 | 5/2013 | Vanga et al. |
| 8,468,272 B2 | 6/2013 | Giroti |
| 8,484,250 B2 | 7/2013 | Sujeet et al. |
| 8,686,871 B2 | 4/2014 | Jensen et al. |
| 8,914,300 B2 | 12/2014 | Sustaeta et al. |
| 8,924,328 B1 | 12/2014 | Kozlovsky et al. |
| 9,024,955 B2 | 5/2015 | Ramarao et al. |
| 9,117,076 B2 | 8/2015 | Devost |
| 9,438,648 B2 | 9/2016 | Asenjo et al. |
| 9,507,807 B1 | 11/2016 | Florissi et al. |
| 9,685,053 B2 | 6/2017 | Palmeri |
| 9,690,669 B2 | 6/2017 | Bernal et al. |
| 9,703,902 B2 | 7/2017 | Asenjo et al. |
| 9,709,978 B2 | 7/2017 | Asenjo et al. |
| 10,026,049 B2 | 7/2018 | Asenjo et al. |
| 10,054,914 B2 | 8/2018 | Vartiainen et al. |
| 2001/0035729 A1 | 11/2001 | Graiger et al. |
| 2002/0004798 A1 | 1/2002 | Babula et al. |
| 2002/0016839 A1 | 2/2002 | Smith et al. |
| 2002/0042756 A1 | 4/2002 | Kumar et al. |
| 2002/0046239 A1 | 4/2002 | Stawikowski et al. |
| 2002/0049833 A1 | 4/2002 | Kikinis |
| 2002/0065898 A1 | 5/2002 | Leontiev et al. |
| 2002/0068983 A1 | 6/2002 | Sexton |
| 2002/0068984 A1 | 6/2002 | Alexander et al. |
| 2002/0073236 A1 | 6/2002 | Helgeson et al. |
| 2002/0077711 A1 | 6/2002 | Nixon et al. |
| 2002/0078432 A1 | 6/2002 | Charisius et al. |
| 2002/0082966 A1 | 6/2002 | O'Brien et al. |
| 2002/0094588 A1 | 7/2002 | Fan et al. |
| 2002/0095483 A1 | 7/2002 | Lee et al. |
| 2002/0096077 A1 | 7/2002 | Frankenberger |
| 2002/0107904 A1 | 8/2002 | Talluri et al. |
| 2002/0138378 A1 | 9/2002 | Leskuski |
| 2002/0156562 A1 | 10/2002 | Berger et al. |
| 2002/0156872 A1 | 10/2002 | Brown |
| 2002/0156926 A1 | 10/2002 | Batke et al. |
| 2002/0161745 A1 | 10/2002 | Call |
| 2002/0169993 A1 | 11/2002 | Woods et al. |
| 2003/0004937 A1 | 1/2003 | Salmenkaita et al. |
| 2003/0009253 A1 | 1/2003 | McIntyre et al. |
| 2003/0009572 A1 | 1/2003 | Thurner |

(56) References Cited

U.S. PATENT DOCUMENTS

| | | |
|---|---|---|
| 2003/0011467 A1 | 1/2003 | Suomela |
| 2003/0014149 A1 | 1/2003 | Kreidler et al. |
| 2003/0023336 A1 | 1/2003 | Kreidler et al. |
| 2003/0033179 A1 | 2/2003 | Katz et al. |
| 2003/0041089 A1 | 2/2003 | Mauro |
| 2003/0051074 A1 | 3/2003 | Edwards |
| 2003/0056224 A1 | 3/2003 | Stone |
| 2003/0069002 A1 | 4/2003 | Hunter et al. |
| 2003/0084016 A1 | 5/2003 | Norgaard et al. |
| 2003/0105535 A1 | 6/2003 | Rammler |
| 2003/0105585 A1 | 6/2003 | Ukita |
| 2003/0109942 A1 | 6/2003 | Yeh et al. |
| 2003/0120817 A1 | 6/2003 | Ott et al. |
| 2003/0150908 A1 | 8/2003 | Pokorny et al. |
| 2003/0156639 A1 | 8/2003 | Liang |
| 2003/0167238 A1 | 9/2003 | Zeif |
| 2003/0167449 A1 | 9/2003 | Warren et al. |
| 2003/0177169 A1 | 9/2003 | Nutt et al. |
| 2003/0177201 A1 | 9/2003 | Shen |
| 2003/0183456 A1 | 10/2003 | Hatzor |
| 2003/0198188 A1 | 10/2003 | Castlebury et al. |
| 2003/0200285 A1 | 10/2003 | Hansen et al. |
| 2003/0208545 A1 | 11/2003 | Eaton et al. |
| 2003/0217100 A1 | 11/2003 | Kronk |
| 2003/0224769 A1 | 12/2003 | Solve et al. |
| 2003/0236576 A1 | 12/2003 | Resnick et al. |
| 2004/0024572 A1 | 2/2004 | Pagnano et al. |
| 2004/0025173 A1 | 2/2004 | Levonai et al. |
| 2004/0032935 A1 | 2/2004 | Mills et al. |
| 2004/0083165 A1 | 4/2004 | Lawrence |
| 2004/0111512 A1 | 6/2004 | Barth |
| 2004/0148039 A1 | 7/2004 | Farchmin et al. |
| 2004/0148187 A1 | 7/2004 | Boettcher et al. |
| 2004/0148383 A1 | 7/2004 | Gonsalves et al. |
| 2004/0159113 A1 | 8/2004 | Singh et al. |
| 2004/0199573 A1 | 10/2004 | Schwartz et al. |
| 2004/0203895 A1 | 10/2004 | Balasuriya |
| 2004/0214566 A1 | 10/2004 | Suzuki et al. |
| 2004/0215551 A1 | 10/2004 | Eder |
| 2004/0225629 A1 | 11/2004 | Eder |
| 2004/0267729 A1 | 12/2004 | Swaminathan et al. |
| 2005/0005093 A1 | 1/2005 | Bartels et al. |
| 2005/0021158 A1 | 1/2005 | De meyer et al. |
| 2005/0038528 A1 | 2/2005 | McKelvey et al. |
| 2005/0055429 A1 | 3/2005 | Abele et al. |
| 2005/0080799 A1 | 4/2005 | Harnden et al. |
| 2005/0090911 A1 | 4/2005 | Ingargiola et al. |
| 2005/0091410 A1 | 4/2005 | Gibart et al. |
| 2005/0120112 A1 | 6/2005 | Wing et al. |
| 2005/0125441 A1 | 6/2005 | Clemens et al. |
| 2005/0137735 A1 | 6/2005 | Loy et al. |
| 2005/0149922 A1 | 7/2005 | Vincent |
| 2005/0203869 A1 | 9/2005 | Minamino et al. |
| 2005/0203960 A1 | 9/2005 | Suarez et al. |
| 2005/0209902 A1 | 9/2005 | Iwasaki et al. |
| 2005/0257204 A1 | 11/2005 | Bryant et al. |
| 2005/0278441 A1 | 12/2005 | Bond et al. |
| 2006/0022048 A1 | 2/2006 | Johnson |
| 2006/0026193 A1 | 2/2006 | Hood |
| 2006/0046712 A1 | 3/2006 | Shamp et al. |
| 2006/0067209 A1 | 3/2006 | Sheehan et al. |
| 2006/0077095 A1 | 4/2006 | Tucker et al. |
| 2006/0078859 A1 | 4/2006 | Mullin |
| 2006/0149813 A1 | 7/2006 | Janik |
| 2006/0153089 A1 | 7/2006 | Silverman |
| 2006/0173873 A1 | 8/2006 | Prompt et al. |
| 2006/0190106 A1 | 8/2006 | Kay et al. |
| 2006/0236374 A1 | 10/2006 | Hartman |
| 2006/0253205 A1 | 11/2006 | Gardiner |
| 2006/0259154 A1 | 11/2006 | Hood et al. |
| 2006/0259472 A1 | 11/2006 | MacClellan |
| 2006/0282432 A1 | 12/2006 | Cassidy et al. |
| 2007/0008129 A1 | 1/2007 | Soliman |
| 2007/0019641 A1 | 1/2007 | Pai et al. |
| 2007/0021968 A1 | 1/2007 | Amir et al. |
| 2007/0043674 A1 | 2/2007 | DiFalco et al. |
| 2007/0050206 A1 | 3/2007 | Whikehart et al. |
| 2007/0061018 A1 | 3/2007 | Callaghan et al. |
| 2007/0067145 A1 | 3/2007 | Miller et al. |
| 2007/0073850 A1 | 3/2007 | Callaghan et al. |
| 2007/0078525 A1 | 4/2007 | Chand |
| 2007/0078536 A1 | 4/2007 | Gordon et al. |
| 2007/0078537 A1 | 4/2007 | Chand et al. |
| 2007/0078736 A1 | 4/2007 | Chand et al. |
| 2007/0078862 A1 | 4/2007 | Chand et al. |
| 2007/0095907 A1 | 5/2007 | Robinson et al. |
| 2007/0112801 A1 | 5/2007 | McGreevy et al. |
| 2007/0118560 A1 | 5/2007 | Bornhoevd et al. |
| 2007/0130112 A1 | 6/2007 | Lin |
| 2007/0168057 A1 | 7/2007 | Blevins et al. |
| 2007/0192213 A1 | 8/2007 | Wu et al. |
| 2007/0194097 A1 | 8/2007 | Jones et al. |
| 2007/0213989 A1 | 9/2007 | Cooksy et al. |
| 2007/0244892 A1 | 10/2007 | Narancic |
| 2007/0245169 A1 | 10/2007 | Farchmin et al. |
| 2007/0247789 A1 | 10/2007 | Benson et al. |
| 2007/0255431 A1 | 11/2007 | Kinsey |
| 2008/0004739 A1 | 1/2008 | Varadhan et al. |
| 2008/0027704 A1 | 1/2008 | Kephart et al. |
| 2008/0049013 A1 | 2/2008 | Nasle |
| 2008/0065243 A1 | 3/2008 | Fallman et al. |
| 2008/0077512 A1 | 3/2008 | Grewal |
| 2008/0082186 A1 | 4/2008 | Hood et al. |
| 2008/0109099 A1 | 5/2008 | Moshier |
| 2008/0125887 A1 | 5/2008 | Case |
| 2008/0155064 A1 | 6/2008 | Kosuge et al. |
| 2008/0162688 A1 | 7/2008 | Reumann et al. |
| 2008/0189637 A1 | 8/2008 | Krajewski et al. |
| 2008/0208365 A1 | 8/2008 | Grgic et al. |
| 2008/0209211 A1 | 8/2008 | Grgic et al. |
| 2008/0214104 A1 | 9/2008 | Baumert et al. |
| 2008/0229754 A1 | 9/2008 | Goebel et al. |
| 2008/0263514 A1 | 10/2008 | DeMesa et al. |
| 2008/0303472 A1 | 12/2008 | John et al. |
| 2009/0024440 A1 | 1/2009 | Spahn |
| 2009/0037378 A1 | 2/2009 | Moor et al. |
| 2009/0037872 A1 | 2/2009 | Schnabele et al. |
| 2009/0063258 A1 | 3/2009 | Mueller et al. |
| 2009/0065578 A1 | 3/2009 | Peterson et al. |
| 2009/0070163 A1 | 3/2009 | Angell et al. |
| 2009/0083204 A1 | 3/2009 | Baier et al. |
| 2009/0086692 A1 | 4/2009 | Chen |
| 2009/0088875 A1 | 4/2009 | Baier et al. |
| 2009/0089032 A1 | 4/2009 | Sturrock et al. |
| 2009/0089233 A1 | 4/2009 | Gach et al. |
| 2009/0089359 A1 | 4/2009 | Siorek et al. |
| 2009/0089682 A1 | 4/2009 | Baier et al. |
| 2009/0109889 A1 | 4/2009 | Budampati et al. |
| 2009/0125460 A1 | 5/2009 | Hewison et al. |
| 2009/0127325 A1 | 5/2009 | Macurek et al. |
| 2009/0132458 A1 | 5/2009 | Edwards et al. |
| 2009/0182689 A1 | 7/2009 | Chiles et al. |
| 2009/0204234 A1 | 8/2009 | Sustaeta et al. |
| 2009/0210071 A1 | 8/2009 | Agrusa et al. |
| 2009/0210814 A1 | 8/2009 | Agrusa et al. |
| 2009/0216341 A1 | 8/2009 | Enkerud et al. |
| 2009/0265157 A1 | 10/2009 | Piepenbrock et al. |
| 2009/0300151 A1 | 12/2009 | Friedman et al. |
| 2009/0316977 A1 | 12/2009 | Juncker et al. |
| 2009/0319831 A1 | 12/2009 | Kruchinin et al. |
| 2009/0319848 A1 | 12/2009 | Thaper |
| 2010/0010859 A1 | 1/2010 | Ratakonda et al. |
| 2010/0023562 A1 | 1/2010 | Kreuch et al. |
| 2010/0042704 A1 | 2/2010 | Chakra et al. |
| 2010/0057660 A1 | 3/2010 | Kato |
| 2010/0076575 A1 | 3/2010 | Vasko et al. |
| 2010/0077160 A1 | 3/2010 | Liu et al. |
| 2010/0082127 A1 | 4/2010 | Plache et al. |
| 2010/0082129 A1 | 4/2010 | McGreevy et al. |
| 2010/0082142 A1 | 4/2010 | Usadi et al. |
| 2010/0082314 A1 | 4/2010 | Pritchard et al. |
| 2010/0082453 A1 | 4/2010 | Speers et al. |
| 2010/0082669 A1 | 4/2010 | Obitko et al. |
| 2010/0083232 A1 | 4/2010 | Chouinard et al. |

(56) References Cited

U.S. PATENT DOCUMENTS

| | | |
|---|---|---|
| 2010/0083356 A1 | 4/2010 | Steckley et al. |
| 2010/0118895 A1 | 5/2010 | Radulescu |
| 2010/0146014 A1 | 6/2010 | Ionescu et al. |
| 2010/0153487 A1 | 6/2010 | Greven et al. |
| 2010/0192144 A1 | 7/2010 | Schmit |
| 2010/0210240 A1 | 8/2010 | Mahaffey et al. |
| 2010/0211509 A1 | 8/2010 | Jacobs |
| 2010/0219950 A1 | 9/2010 | Kong et al. |
| 2010/0223212 A1 | 9/2010 | Manolescu et al. |
| 2010/0241260 A1 | 9/2010 | Kilibarda et al. |
| 2010/0256795 A1 | 10/2010 | McLaughlin et al. |
| 2010/0257227 A1 | 10/2010 | McLaughlin et al. |
| 2010/0257228 A1 | 10/2010 | Staggs et al. |
| 2010/0306377 A1 | 12/2010 | DeHaan et al. |
| 2010/0318392 A1 | 12/2010 | Cassels et al. |
| 2010/0318837 A1 | 12/2010 | Murphy et al. |
| 2010/0324855 A1 | 12/2010 | Parker |
| 2010/0332008 A1 | 12/2010 | Knipfer et al. |
| 2011/0004446 A1 | 1/2011 | Dorn et al. |
| 2011/0016058 A1 | 1/2011 | Pinchuk |
| 2011/0035253 A1 | 2/2011 | Mason et al. |
| 2011/0047230 A1 | 2/2011 | McGee |
| 2011/0078300 A9 | 3/2011 | Grelewicz et al. |
| 2011/0093308 A1 | 4/2011 | Majeed |
| 2011/0161378 A1 | 6/2011 | Williamson |
| 2011/0173127 A1 | 7/2011 | Ho et al. |
| 2011/0257766 A1 | 10/2011 | Sundaram et al. |
| 2011/0265020 A1 | 10/2011 | Fields et al. |
| 2011/0276498 A1 | 11/2011 | Madhok |
| 2011/0288667 A1 | 11/2011 | Noda et al. |
| 2011/0295634 A1 | 12/2011 | Bhamidipaty et al. |
| 2012/0005242 A1 | 1/2012 | Feng et al. |
| 2012/0022700 A1 | 1/2012 | Dress et al. |
| 2012/0054246 A1 | 3/2012 | Fischer |
| 2012/0072597 A1 | 3/2012 | Teather et al. |
| 2012/0079461 A1 | 3/2012 | Copass et al. |
| 2012/0083906 A1 | 4/2012 | Weatherhead et al. |
| 2012/0084400 A1 | 4/2012 | Almadi et al. |
| 2012/0089920 A1 | 4/2012 | Fick |
| 2012/0095808 A1 | 4/2012 | Kattapuram et al. |
| 2012/0101801 A1 | 4/2012 | Van Dorsselaer |
| 2012/0143374 A1 | 6/2012 | Mistry et al. |
| 2012/0147894 A1 | 6/2012 | Mulligan et al. |
| 2012/0191439 A1* | 7/2012 | Meagher ............... G06F 30/20 703/18 |
| 2012/0197911 A1 | 8/2012 | Banka et al. |
| 2012/0232876 A1 | 9/2012 | Misra |
| 2012/0257544 A1 | 10/2012 | Schein et al. |
| 2012/0262069 A1 | 10/2012 | Reed |
| 2012/0290104 A1 | 11/2012 | Holt et al. |
| 2012/0290266 A1 | 11/2012 | Jain et al. |
| 2012/0297249 A1 | 11/2012 | Yang et al. |
| 2012/0304007 A1 | 11/2012 | Hanks et al. |
| 2012/0306620 A1 | 12/2012 | Karaffa et al. |
| 2012/0311387 A1 | 12/2012 | Santhosh et al. |
| 2013/0004281 A1 | 1/2013 | Anders et al. |
| 2013/0012220 A1 | 1/2013 | Waris et al. |
| 2013/0018696 A1 | 1/2013 | Meldrum |
| 2013/0024542 A1 | 1/2013 | Keller et al. |
| 2013/0031158 A1 | 1/2013 | Salsburg |
| 2013/0036198 A1 | 2/2013 | Galm et al. |
| 2013/0041705 A1 | 2/2013 | Hampapur et al. |
| 2013/0097563 A1 | 4/2013 | Pacheco Rodrigues Velho et al. |
| 2013/0097710 A1 | 4/2013 | Basavapatna et al. |
| 2013/0104236 A1 | 4/2013 | Ray et al. |
| 2013/0107772 A1 | 5/2013 | Splitz et al. |
| 2013/0111019 A1 | 5/2013 | Tjew et al. |
| 2013/0111034 A1 | 5/2013 | Upadhya |
| 2013/0117064 A1 | 5/2013 | Sadeghi et al. |
| 2013/0117806 A1 | 5/2013 | Parthasarathy et al. |
| 2013/0125233 A1 | 5/2013 | Bush et al. |
| 2013/0138812 A1 | 5/2013 | Assuncao et al. |
| 2013/0138818 A1 | 5/2013 | Wolf |
| 2013/0145033 A1 | 6/2013 | Polla et al. |
| 2013/0159500 A1 | 6/2013 | Reus et al. |
| 2013/0182107 A1 | 7/2013 | Anderson |
| 2013/0191106 A1 | 7/2013 | Kephart et al. |
| 2013/0204982 A1 | 8/2013 | Kim et al. |
| 2013/0211546 A1 | 8/2013 | Lawson et al. |
| 2013/0211547 A1 | 8/2013 | Buchdunger et al. |
| 2013/0211555 A1 | 8/2013 | Lawson et al. |
| 2013/0211559 A1 | 8/2013 | Lawson et al. |
| 2013/0211870 A1 | 8/2013 | Lawson et al. |
| 2013/0212420 A1 | 8/2013 | Lawson et al. |
| 2013/0212521 A1 | 8/2013 | Fedoseyeva et al. |
| 2013/0218971 A1 | 8/2013 | Sasaki et al. |
| 2013/0237204 A1 | 9/2013 | Buck et al. |
| 2013/0257627 A1 | 10/2013 | Rafael |
| 2013/0262654 A1 | 10/2013 | Masli et al. |
| 2013/0274899 A1 | 10/2013 | Hamzaoui et al. |
| 2013/0282150 A1 | 10/2013 | Panther et al. |
| 2013/0283265 A1 | 10/2013 | Acharya et al. |
| 2013/0304237 A1 | 11/2013 | Schroeder et al. |
| 2013/0311827 A1 | 11/2013 | Drory et al. |
| 2013/0325545 A1 | 12/2013 | Mordvinova et al. |
| 2013/0347003 A1 | 12/2013 | Whitmore |
| 2014/0013100 A1 | 1/2014 | Menzel et al. |
| 2014/0046618 A1 | 2/2014 | Arunachalam et al. |
| 2014/0046977 A1 | 2/2014 | Gopalakrishnan et al. |
| 2014/0047107 A1 | 2/2014 | Maturana et al. |
| 2014/0052499 A1 | 2/2014 | Wagner et al. |
| 2014/0059056 A1 | 2/2014 | Chaney et al. |
| 2014/0067360 A1 | 3/2014 | Bhamidipaty et al. |
| 2014/0081691 A1 | 3/2014 | Wendell |
| 2014/0095231 A1 | 4/2014 | Cherusseri et al. |
| 2014/0095654 A1 | 4/2014 | Finnerty et al. |
| 2014/0116341 A1 | 5/2014 | Kopic et al. |
| 2014/0121789 A1 | 5/2014 | Brandes et al. |
| 2014/0137257 A1 | 5/2014 | Martinez et al. |
| 2014/0156032 A1 | 6/2014 | Jenkins et al. |
| 2014/0156584 A1 | 6/2014 | Motukuri et al. |
| 2014/0215487 A1 | 7/2014 | Cherkasova et al. |
| 2014/0250153 A1 | 9/2014 | Nixon et al. |
| 2014/0250337 A1 | 9/2014 | Yamaji et al. |
| 2014/0278738 A1 | 9/2014 | Feit et al. |
| 2014/0279201 A1 | 9/2014 | Iyoob et al. |
| 2014/0279641 A1 | 9/2014 | Singh et al. |
| 2014/0279948 A1 | 9/2014 | Mahate et al. |
| 2014/0282015 A1 | 9/2014 | Nixon et al. |
| 2014/0282257 A1 | 9/2014 | Nixon et al. |
| 2014/0297354 A1 | 10/2014 | Kogiso et al. |
| 2014/0306533 A1 | 10/2014 | Paquin et al. |
| 2014/0316794 A1 | 10/2014 | Goll et al. |
| 2014/0335480 A1 | 11/2014 | Asenjo et al. |
| 2014/0336785 A1 | 11/2014 | Asenjo et al. |
| 2014/0336786 A1 | 11/2014 | Asenjo et al. |
| 2014/0336791 A1* | 11/2014 | Asenjo ............... G05B 13/026 700/44 |
| 2014/0336795 A1* | 11/2014 | Asenjo ............... G05B 19/4083 700/86 |
| 2014/0337000 A1* | 11/2014 | Asenjo ............... G06Q 10/06 703/13 |
| 2014/0337086 A1 | 11/2014 | Asenjo et al. |
| 2014/0358606 A1 | 12/2014 | Hull |
| 2014/0372347 A1 | 12/2014 | Cohen et al. |
| 2015/0012763 A1 | 1/2015 | Cohen et al. |
| 2015/0019191 A1 | 1/2015 | Maturana et al. |
| 2015/0032242 A1 | 1/2015 | Schouwenburg et al. |
| 2015/0032886 A1 | 1/2015 | Wang |
| 2015/0048952 A1 | 2/2015 | Murphy |
| 2015/0235161 A1 | 8/2015 | Azar et al. |
| 2015/0278407 A1 | 10/2015 | Vennelakanti et al. |
| 2015/0304193 A1 | 10/2015 | Ishii et al. |
| 2015/0378356 A1 | 12/2015 | Hefeeda et al. |
| 2016/0154693 A1 | 6/2016 | Uhde et al. |
| 2016/0188769 A1 | 6/2016 | Aylott et al. |
| 2016/0217378 A1 | 7/2016 | Bellala et al. |
| 2016/0217410 A1 | 7/2016 | Santos et al. |
| 2017/0019483 A1 | 1/2017 | Maturana et al. |

(56) References Cited

U.S. PATENT DOCUMENTS

| | | |
|---|---|---|
| 2017/0236391 A1 | 8/2017 | Palmeri |
| 2018/0157995 A1 | 6/2018 | O'Malley |
| 2018/0205803 A1 | 7/2018 | Asenjo et al. |

FOREIGN PATENT DOCUMENTS

| | | |
|---|---|---|
| CN | 1529837 A | 9/2004 |
| CN | 1605958 A | 4/2005 |
| CN | 1690685 A | 11/2005 |
| CN | 1833424 A | 9/2006 |
| CN | 101086760 A | 12/2007 |
| CN | 101091195 A | 12/2007 |
| CN | 100362442 C | 1/2008 |
| CN | 101114160 A | 1/2008 |
| CN | 101276209 | 10/2008 |
| CN | 101326471 A | 12/2008 |
| CN | 101536002 A | 9/2009 |
| CN | 101553763 A | 10/2009 |
| CN | 201444256 U | 4/2010 |
| CN | 101739007 A | 6/2010 |
| CN | 101776862 A | 7/2010 |
| CN | 102262401 | 11/2011 |
| CN | 102435870 A | 5/2012 |
| CN | 102449567 A | 5/2012 |
| CN | 102483837 A | 5/2012 |
| CN | 102640475 A | 8/2012 |
| CN | 102830666 A | 12/2012 |
| CN | 102927937 A | 2/2013 |
| CN | 103403753 A | 11/2013 |
| CN | 104142629 A | 11/2014 |
| CN | 104142630 A | 11/2014 |
| CN | 104142662 A | 11/2014 |
| CN | 104142664 A | 11/2014 |
| CN | 104142679 A | 11/2014 |
| CN | 104144204 A | 11/2014 |
| DE | 198 34 456 A1 | 2/2000 |
| DE | 19880479 B4 | 10/2009 |
| DE | 10 2014 102844 A1 | 9/2014 |
| EP | 1 209 558 A2 | 5/2002 |
| EP | 1 491 977 A2 | 12/2004 |
| EP | 1 531 373 A2 | 5/2005 |
| EP | 1 686 442 A1 | 8/2006 |
| EP | 1 868 152 A1 | 12/2007 |
| EP | 1 933 214 A2 | 6/2008 |
| EP | 2 189 900 A1 | 5/2010 |
| EP | 2 293 164 A1 | 3/2011 |
| EP | 2 453 326 A1 | 5/2012 |
| EP | 2 469 466 A1 | 6/2012 |
| EP | 2 509 042 A1 | 10/2012 |
| EP | 2 660 667 A2 | 11/2013 |
| EP | 2 704 401 A1 | 3/2014 |
| EP | 2 778 816 A1 | 9/2014 |
| EP | 2 790 101 A1 | 10/2014 |
| EP | 2 801 935 A1 | 11/2014 |
| EP | 2 801 936 A1 | 11/2014 |
| EP | 2 801 938 A1 | 11/2014 |
| EP | 2 801 940 A1 | 11/2014 |
| EP | 2 801 941 A1 | 11/2014 |
| EP | 3 037 901 A2 | 6/2016 |
| EP | B 070 550 B1 | 7/2018 |
| IN | 103019102 A | 4/2013 |
| JP | 2001-242931 A | 9/2001 |
| WO | 01/11586 A1 | 2/2001 |
| WO | 01/69329 A2 | 9/2001 |
| WO | 02/17131 A2 | 2/2002 |
| WO | 02/057856 A2 | 7/2002 |
| WO | 03/007097 A1 | 1/2003 |
| WO | 03/058506 A1 | 7/2003 |
| WO | 2008/133715 A2 | 11/2008 |
| WO | 2009/046095 A1 | 4/2009 |
| WO | 2011/050482 A1 | 5/2011 |
| WO | 2013/007866 A1 | 1/2013 |
| WO | 2014/090310 A1 | 6/2014 |
| WO | 2016/001718 A1 | 1/2016 |

OTHER PUBLICATIONS

Non-Final Office Action received for U.S. Appl. No. 14/658,365 dated Jul. 30, 2021, 108 pages.
Final Office Action received for U.S. Appl. No. 16/900,022 dated Dec. 30, 2021, 66 pages.
Communication pursuant to Article 94(3) EPC received for European Application Serial No. 11152520.0-1205 dated Nov. 8, 2021, 8 pages.
European Office Action for EP Patent Application Serial No. 14167708.8, dated Oct. 20, 2021, 10 pages.
Notice of Allowance received for U.S. Appl. No. 16/234,039 dated Oct. 25, 2021, 24 pages.
Final Office Action received for U.S. Appl. No. 14/658,365 dated Jan. 24, 2022, 38 pages.
Final Office Action received for U.S. Appl. No. 14/087,970 dated Apr. 12, 2017, 59 pages.
Non-Final Office Action received for U.S. Appl. No. 14/658,394 dated Apr. 21, 2017, 97 pages.
Non-Final Office Action recevied for U.S. Appl. No. 15/388,260 dated Apr. 24, 2017, 101 pages.
Non-Final Office Action received for U.S. Appl. No. 14/658,345 dated Mar. 17, 2017, 95 pages.
Non-Final Office Action received for U.S. Appl. No. 14/658,327 dated May 1, 2017, 99 pages.
Givehchi et al., "Control-as-a-Service from the Cloud: A Case Study for using Virtualized PLCs," 2014 10th IEEE Workshop on Factory Communication Systems (WFCS 2014), May 5, 2014 IEEE, 4 pages.
Non-Final Office Action received for U.S. Appl. No. 14/088,011 dated May 17, 2017, 57 Pages.
Rouse et al. "Definition Industrial Control System (ICS," whatis.techtarget.com, ed. Mar. 2016 (accessed from <<http://whatis.techtarget.com/definition/industrial-control-system-ICS>> on Jan. 11, 2017), 1 page.
Examiner Answer to Appeal Brief for U.S. Appl. No. 14/087,977, dated Jun. 5, 2017, 10 pages.
Communication pursuant to Article 94(3) EPC received for European Application Serial No. 16160604.1-1802 dated May 17, 2017, 6 pages.
Final Office Action received for U.S. Appl. No. 14/658,365 dated Sep. 8, 2017, 59 pages.
Non-Final Office Action received for U.S. Appl. No. 14/087,821 dated Sep. 7, 2017, 63 pages.
Final Office Action received for U.S. Appl. No. 14/087,730 dated Aug. 18, 2017, 72 pages.
Non-Final Office Action received for U.S. Appl. No. 15/214,583 dated Aug. 28, 2017, 80 pages.
Final Office Action received for U.S. Appl. No. 14/658,345 dated Sep. 25, 2017, 52 pages.
Final Office Action received for U.S. Appl. No. 15/388,260 dated Oct. 18, 2017, 76 pages.
Non-Final Office Action received for U.S. Appl. No. 15/206,744 dated Nov. 6, 2017, 48 pages.
Final Office Action received for U.S. Appl. No. 14/658,327 dated Oct. 30, 2017, 33 pages.
Final Office Action for U.S. Appl. No. 14/658,394 dated Nov. 16, 2017, 49 pages.
Non-Final Office Action received for U.S. Appl. No. 15/490,076 dated Dec. 20, 2017, 37 pages.
Non-Final Office Action received for U.S. Appl. No. 15/278,139 dated Jan. 11, 2018, 103 pages.
Final Office Action received for U.S. Appl. No. 14/087,821 dated Dec. 14, 2017, 37 pages.
Final Office Action received for U.S. Appl. No. 14/088,011 dated Nov. 22, 2017, 77 pages.
Non-Final Office Action received for U.S. Appl. No. 14/087,970 dated Feb. 12, 2018, 69 pages.
Chinese Fifth Office Action received for Chinese Application Serial No. 201410196114.8, dated Dec. 13, 2017, 26 pages (Including English Translation).
Non-Final Office Action received for U.S. Appl. No. 15/143,733 dated Mar. 8, 2018, 141 pages.

(56) References Cited

OTHER PUBLICATIONS

Final Office Action received for U.S. Appl. No. 15/490,076 dated Apr. 2, 2018, 23 pages.
Non-Final Office Action received for U.S. Appl. No. 14/658,327 dated Apr. 10, 2018, 43 pages.
Non-Final Office Action received for U.S. Appl. No. 14/658,345 dated Mar. 14, 2018, 56 pages.
Non-Final Office Action received for U.S. Appl. No. 14/658,365, dated Apr. 5, 2018, 64 pages.
Non-Final Office Action received for U.S. Appl. No. 14/658,394, dated Apr. 6, 2018, 40 pages.
Final Office Action received for U.S. Appl. No. 15/143,733, dated Jun. 18, 2018, 76 pages.
Non-Final Office Action received for U.S. Appl. No. 15/599,921, dated Jun. 29, 2018, 75 pages.
Final Office Action received for U.S. Appl. No. 14/087,970, dated Aug. 1, 2018, 68 pages.
Wikipedia; "PID Controller"; Jul. 20, 2018; https://en.wikipedia.org/wiki/PID_controller (Year: 2018).
Communication pursuant to Article 94(3) EPC for EP Application Serial No. 14167714.6 dated Aug. 3, 2018, 5 pages.
Communication pursuant to Article 94(3) EPC for EP Application Serial No. 14167708.8 dated Aug. 3, 2018, 5 pages.
Communication pursuant to Article 94(3) EPC for EP Application Serial No. 14167712.0 dated Aug. 3, 2018, 5 pages.
Chinese Search Report received for Chinese Application Serial No. 201610149668.1 dated Apr. 2, 2018, 1 pages (Including English Translation).
Chinese Search Report received for Chinese Application Serial No. 201610149635.7 dated Apr. 2, 2018, 1 pages (Including English Translation).
Chinese First Office Action received for Chinese Patent Application Serial No. 201610151380.8, dated Jul. 17, 2018, 65 pages (Including English Translation).
Final Office Action received for U.S. Appl. No. 14/658,345 dated Sep. 13, 2018, 49 pages.
Final Office Action received for U.S. Appl. No. 14/658,365 dated Oct. 16, 2018, 42 pages.
Notice of Allowance received for U.S. Appl. No. 15/923,127 dated Nov. 21, 2018, 85 pages.
Non-Final Office Action received for U.S. Appl. No. 14/658,327 dated Nov. 1, 2018, 58 pages.
Final Office Action received for U.S. Appl. No. 14/658,394 dated Nov. 1, 2018, 51 pages.
Chinese Second Office Action received for Chinese Application Serial No. 201610149668.1, dated Oct. 24, 2018, 18 pages (Including English Translation).
Chinese Second Office Action received for Chinese Application Serial No. 201610149635.7, dated Oct. 24, 2018, 24 pages (Including English Translation).
Chinese First Office Action received for Chinese Application Serial No. 201610151417.7, dated Sep. 18, 2018, 28 pages (Including English Translation).
Non-Final Office Action received for U.S. Appl. No. 10/234,504 dated Oct. 18, 2006, 15 pages.
Chinese First Office Action for Chinese Application No. 201703396697 dated Dec. 11, 2018, 25 pages (Including English Translation).
Non-Final Office Action received for U.S. Appl. No. 15/621,206 dated Mar. 22, 2019, 118 pages.
Non-Final Office Action received for U.S. Appl. No. 14/658,345 dated May 13, 2019, 78 pages.
Non-Final Office Action received for U.S. Appl. No. 14/658,365 dated Jun. 3, 2019, 70 pages.
Third Office Action received for Chinese Patent Application Serial No. 201610149635.7 dated Apr. 26, 2019, 23 pages (including English Translation).
Notice of Opposition received for EP Patent Application Serial No. 16160611.6 dated Apr. 11, 2019, 789 pages.

Wen et al., "Current Trends and Perspectives in Wireless Virtualization", 2013 International Conference on Selected Topics in Mobile and Wireless Networking (MoWNeT), 2013, 6 pages.
Wang et al., "The Research of Chemical Plant Monitoring Base on the Internet of Things and 3D Visualization Technology", Proceeding of the IEEE International Conference on Information and Automation, Aug. 2013, 5 pages.
Non-Final Office Action received for U.S. Appl. No. 15/714,333 dated Jul. 17, 2019, 113 pages.
Notice of Allowance received for U.S. Appl. No. 15/621,206 dated Aug. 19, 2019, 52 pages.
Non-Final Office Action received for U.S. Appl. No. 14/658,394 dated Aug. 19, 2019, 70 pages.
First Office Action received for Chinese Patent Application Serial No. 201710778822.6 dated Jun. 24, 2019, 29 pages (Including English Translation).
Second Office Action received for Chinese Patent Application Serial No. 201710339669.7 dated Jul. 2, 2019, 20 pages (Including English Translation).
Final Office Action received for U.S. Appl. No. 15/714,333 dated Oct. 25, 2019, 36 pages.
Non-Final Office Action received for U.S. Appl. No. 15/970,932 dated Nov. 14, 2019, 122 bages.
Second Office Action received for Chinese Patent Application Serial No. 201710778822.6 dated Sep. 20, 2019, 5 pages.
Final Office Action received for U.S. Appl. No. 14/658,345 dated Nov. 26, 2019, 48 pages.
Final Office Action received for U.S. Appl. No. 14/658,365 dated Nov. 29, 2019, 48 pages.
Supplementary Search Report received for Chinese Patent Application Serial No. 201710339669.7 dated Sep. 18, 2019, 2 pages.
Non-Final Office Action received for U.S. Appl. No. 14/658,394 dated Feb. 20, 2020, 67 pages.
Third Office Action received for Chinese Patent Application Serial No. 201710778822.6 dated Mar. 3, 2020, 43 pages (Including English Translation).
Communication pursuant to Article 94(3) EPC received for EP Patent Application Serial No. 14167627.0 dated Jan. 23, 2020, 6 pages.
Summons to attend oral proceedings pursuant to Rule 115(1) EPC received for EP Patent Application Serial No. 14167703.9 dated Feb. 6, 2020, 8 pages.
Notification of Grant of Patent for Invention received for Chinese Patent Application Serial No. 201710339669.7 dated Dec. 31, 2019, 7 pages (Including English Translation).
Summons to attend oral proceedings pursuant to Rule 115(1) EPC received for EP Patent Application Serial No. 16160611.6 dated Dec. 19, 2019, 26 pages.
Non-Final Office Action received for U.S. Appl. No. 16/129,116 dated Apr. 1, 2020, 142 pages.
Non-Final Office Action received for U.S. Appl. No. 15/714,333 dated Apr. 15, 2020, 44 pages.
Final Office Action received for U.S. Appl. No. 15/970,932 dated Apr. 13, 2020, 37 pages.
Non-Final Office Action received for U.S. Appl. No. 14/658,345 dated May 14, 2020, 83 pages.
Communication pursuant to Article 94(3) EPC received for EP Patent Application Serial No. 16160602.5 dated May 19, 2020, 07 pages.
Communication pursuant to Article 94(3) EPC received for EP Patent Application Serial No. 16160610.8 dated May 27, 2020, 08 pages.
Final Office Action received for U.S. Appl. No. 16/129,116 dated Jul. 2, 2020, 58 pages.
Final Office Action received for U.S. Appl. No. 15/714,333 dated Jul. 22, 2020, 40 pages.
Non-Final Office Action received for U.S. Appl. No. 14/658,365 dated Jul. 13, 2020, 72 pages.
Non-Final Office Action received for U.S. Appl. No. 14/658,394 dated Aug. 5, 2020, 59 pages.
Notice of Allowance received for U.S. Appl. No. 15/714,333 dated Dec. 17, 2020, 59 pages.

(56) References Cited

OTHER PUBLICATIONS

Summons to attend oral proceedings pursuant to Rule 115(1) EPC received for EP Patent Application Serial No. 16160611.6 dated Oct. 30, 2020, 05 pages.
Notification of Reexamination received for Chinese Application No. 201610149635.7, dated Nov. 5, 2020, 17 pages.
Notification of Reexamination received for Chinese Application No. 201610149668.1, dated Oct. 20, 2020, 3 pages.
Final Office Action received for U.S. Appl. No. 15/714,333 dated Nov. 4, 2020, 62 pages.
Non-Final Office Action received for U.S. Appl. No. 16/129,116 dated Nov. 16, 2020, 51 pages.
Final Office Action received for U.S. Appl. No. 14/658,365 dated Jan. 21, 2021, 96 pages.
Notice of Allowance received for U.S. Appl. No. 14/658,394 dated Feb. 9, 2021, 92 pages.
Advisory Office Action received for U.S. Appl. No. 14/658,365 dated Mar. 25, 2021, 09 pages.
Summons to attend oral proceedings pursuant to Rule 115(1) EPC received for European Patent Application Serial No. 14167708.8 dated Mar. 18, 2021, 09 pages.
Non-Final Office Action received for U.S. Appl. No. 16/234,039 dated May 13, 2021, 149 pages.
Non-Final Office Action received for U.S. Appl. No. 16/900,022 dated May 27, 2021, 146 pages.
Communication Pursuant to Rules 94(3) EPC received for EP Patent Application Serial No. 16160602.5 dated May 11, 2021, 07 pages.
First Office Action received for Chinese application No. 201810240055.8 dated Jun. 25, 2021, 22 pages (Including English Translation).
Communication pursuant to Article 94(3) EPC received for European application No. 16160610.8 dated May 27, 2021, 9 pages.
Final Office Action received for U.S. Appl. No. 10/234,504 dated Feb. 7, 2007, 12 pages.
Final Office Action received for U.S. Appl. No. 10/234,504 dated May 1, 2007, 12 pages.
Non-Final Office Action received for U.S. Appl. No. 10/162,314 dated Dec. 15, 2005, 17 pages.
Final Office Action received for U.S. Appl. No. 10/162,314 dated Jun. 5, 2006, 23 pages.
Non-Final Office Action received for U.S. Appl. No. 10/162,314 dated Nov. 16, 2006, 20 pages.
Final Office Action received for U.S. Appl. No. 10/162,314 dated Apr. 30, 2007, 35 pages.
Non-Final Office Action received for U.S. Appl. No. 10/162,314 dated Oct. 25, 2007, 28 pages.
Final Office Action received for U.S. Appl. No. 10/162,314 dated May 5, 2008, 31 pages.
Non-Final Office Action received for U.S. Appl. No. 10/161,848 dated Nov. 15, 2005, 15 pages.
Final Office Action received for U.S. Appl. No. 10/161,848 dated Mar. 27, 2006, 13 pages.
Non-Final Office Action received for U.S. Appl. No. 10/161,848 dated Sep. 5, 2006, 15 pages.
Final Office Action received for U.S. Appl. No. 10/161,848 dated Feb. 23, 2007, 17 pages.
Non-Final Office Action received for U.S. Appl. No. 10/161,848 dated May 7, 2007, 14 pages.
Final Office Action received for U.S. Appl. No. 10/161,848 dated Oct. 17, 2007, 15 pages.
Non-Final Office Action received for U.S. Appl. No. 10/161,848 dated Feb. 7, 2008, 14 pages.
Final Office Action received for U.S. Appl. No. 10/161,848 dated Sep. 9, 2008, 17 pages.
Non-Final Office Action received for U.S. Appl. No. 12/410,632 dated Feb. 1, 2011, 56 pages.
Final Office Action received for U.S. Appl. No. 12/410,632 dated May 17, 2011, 17 pages.
Non-Final Office Action received for U.S. Appl. No. 12/410,632 dated Sep. 2, 2011, 11 pages.

Non-Final Office Action received for U.S. Appl. No. 10/298,366 dated Apr. 20, 2006, 13 pages.
Final Office Action received for U.S. Appl. No. 10/298,366 dated Sep. 29, 2006, 16 pages.
Non-Final Office Action received for U.S. Appl. No. 10/298,366 dated Jan. 31, 2007, 12 pages.
Final Office Action received for U.S. Appl. No. 10/298,366 dated Jul. 18, 2007, 14 pages.
Non-Final Office Action received for U.S. Appl. No. 10/298,366 dated Dec. 17, 2007, 10 pages.
Non-Final Office Action received for U.S. Appl. No. 10/298,366 dated Jun. 11, 2008, 24 pages.
Final Office Action received for U.S. Appl. No. 10/298,366 dated Nov. 18, 2008, 20 pages.
Notice of Allowance received for U.S. Appl. No. 10/298,366 dated Feb. 2, 2009, 23 pages.
Non-Final Office Action received for U.S. Application Serial No. 13/615, 195, dated Aug. 19, 2014, 24 pages.
Communication pursuant to Article 96(2) EPC for EP Application Serial No. 03026339.6 dated Apr. 6, 2006, 6 pages.
Communication pursuant to Article 96(2) EPC for EP Application Serial No. 13166670.3 dated Dec. 14, 2018, 4 bages.
Chinese Third Office Action for Chinese Application No. 201410196114.8 dated Apr. 12, 2017, 25 pages (Including English Translation).
Chinese Fourth Office Action for Chinese Application No. 201410196114.8 dated Aug. 15, 2017, 24 pages (Including English Translation).
Chinese Second Office Action for Chinese Application No. 201410196198.5 dated Dec. 21, 2016, 10 pages (Including English Translation).
Chinese Third Office Action for Chinese Application No. 201410196198.5 dated Mar. 28, 2017, 10 pages (Including English Translation).
Chinese Second Office Action for Chinese Application No. 201410196525.7 dated Dec. 21, 2016, 8 pages (Including English Translation).
Chinese Second Office Action for Chinese Application No. 201410196775.0 dated Dec. 7, 2016, 8 pages (Including English Translation).
Chinese Third Office Action for CN Application Serial No. 201410196150.4, dated Nov. 29, 2017, 10 pages (Including English Translation).
Communication pursuant to Article 94(3) EPC for EP Application Serial No. 14167511.6 dated Jan. 23, 2019, 7 pages.
Communication pursuant to Article 94(3) EPC for EP Application Serial No. 14167703.9 dated Jan. 23, 2019, 6 pages.
Anonymous: "Hash function—Wikipedia", Wikipedia, Apr. 19, 2009, URL:https://en.wikipedia.org/w/index.php?title=Hash_function &oldid=284890279, 9 pages.
Communication pursuant to Article 94(3) EPC for EP Application Serial No. 16160611.6 dated Apr. 5, 2017, 5 pages.
Communication pursuant to Article 94(3) EPC for EP Application Serial No. 16160611.6 dated May 10, 2017, 5 pages.
Chinese Second Office Action received for Chinese Patent Application Serial No. 201610151417.7 dated Jan. 22, 2019, 7 pages (Including English Translation).
Communication pursuant to Article 94(3) EPC for EP Application Serial No. 16160604.1 dated Jun. 13, 2017, 6 pages.
Summons to attend oral proceedings pursuant to Rule 115(1) EPC received for EP Patent Application Serial No. 14167706.2 dated Dec. 13, 2018, 65 pages.
Chinese Second Office Action received for Chinese Patent Application Serial No. 201410196150.4 dated Aug. 3, 2017, 10 pages (Including English Translation).
Extended European Search Report received for European Application No. 16160610.8 dated Sep. 8, 2016, 9 pages.
Non-Final Office Action received for U.S. Appl. No. 13/725,543 dated Oct. 9, 2014, 10 pages.
Final Office Action received for U.S. Appl. No. 13/725,543 dated May 20, 2015, 15 pages.
Final Office Action received for U.S. Appl. No. 13/615,195 dated Jan. 20, 2015, 22 pages.

(56) References Cited

OTHER PUBLICATIONS

Notice of Allowance received for U.S. Appl. No. 17/223,385 dated Jan. 30, 2023, 37 pages.
Final Office Action received for U.S. Appl. No. 17/344,118 dated Feb. 28, 2023, 83 pages.
Summons to attend oral proceedings pursuant to Rule 115(1) EPC received for European Patent Application Serial No. 13166670.3 dated Mar. 17, 2023, 39 pages.
Non-Final Office Action received for U.S. Appl. No. 16/599,276 dated Dec. 3, 2021, 172 pages.
Non Final Office Action received for U.S. Appl. No. 17/223,385 dated Apr. 29, 2022, 295 pages.
Talha et al., "Design for an irrigation and monitoring system of an automated dam", IMECS 2012, vol. II, Mar. 14-16, 2012, Hong Kong, 4 pages.
Final Office Action received for U.S. Appl. No. 17/223,385 dated Jul. 21, 2022, 41 pages.
Notice of Allowance received for U.S. Appl. No. 14/658,365 dated Jul. 29, 2022, 86 pages.
Non-Final Office Action received for U.S. Appl. No. 17/344, 118 dated Aug. 31, 2022, 164 pages.
Second Office Action received for Chinese Patent Application Serial No. 201810240055.8 dated Dec. 16, 2021, 8 pages.
Second Office Action received for Chinese Patent Application Serial No. 201610151380.8 dated Jan. 18, 2019, 8 pages.
Third Office Action received for Chinese Patent Application Serial No. 201610149668.1 dated Apr. 26, 2019, 18 pages.
Communication Pursuant to Rules 94(3) EPC received for EP Patent Application Serial No. 16160602.5 dated Sep. 23, 2022, 08 pages.
Communication Pursuant to Article 94(3) EPC received for EP Patent Application Serial No. 16160610.8 dated Sep. 23, 2022, 10 pages.
First Office Action received for Chinese Patent Application Serial No. 201710244682.4 dated Dec. 10, 2018, 14 pages.
Non-Final Office Action received for U.S. Appl. No. 17/344,118 dated May 25, 2023, 108 pages.
Communication pursuant to Article 94(3) EPC received for European Application No. 14167707.0-1955 dated Sep. 22, 2015, 9 pages.
Extended European search report received for European Application No. 14167714.6 dated Aug. 11, 2014, 5 pages.
Extended European search report received for European Application No. 14167706.2 dated Aug. 11, 2014, 7 pages.
Extended European search report received for European Application No. 14167626.2 dated Aug. 11, 2014, 9 pages.
Extended European search report received for European Application No. 14167627.0 dated Aug. 11, 2014, 6 pages.
Extended European search report received for European Application No. 14167703.9 dated Aug. 11, 2014, 7 pages.
Extended European search report received for European Application No. 14167707.0 dated Aug. 11, 2014, 7 pages.
Extended European search report received for European Application No. 14167708.8 dated Aug. 11, 2014, 5 pages.
Extended European search report received for European Application No. 14167712.0 dated Aug. 11, 2014, 5 pages.
Extended European search report received for European Application No. 14167511.6 dated Aug. 11, 2014, 6 pages.
Non-Final Office Action received for U.S. Appl. No. 10/162,315 dated Dec. 27, 2004, 10 pages.
Final Office Action received for U.S. Appl. No. 10/162,315 dated Jun. 15, 2005, 11 pages.
Non-Final Office Action received for U.S. Appl. No. 10/162,315 dated Sep. 9, 2005, 22 pages.
Vasudevan Venu., "A Web Services Primer", http://webservices.xml.com/pub/a/ws/2001/04/04/webservices/index.html, XML.com, Apr. 4, 2001, 10 pages.
Non-Final Office Action received for U.S. Appl. No. 10/162,315 dated Mar. 6, 2006, 10 pages.
W3C, "Web Services Description Language (WSDL) 1.1", http://www.w3.org/TR/wsdl, Mar. 15, 2001, 35 pages.
European Search Report dated Apr. 6, 2004 for European Patent Application No. 03026339, 3 Pages.
Compuquest, Inc., SPM-IM-Instant Messaging Client for SpreadMsg Wireless Messaging Software, http://www.compuquestinc.com/spmim.html, Aug. 13, 2002, 4 pages.
Compuquest, Inc., SpreadMsg Lite—Data Capture, Scanning, Extraction & Rule Based Instant Messaging Software, http://web.archive.org/web/20020813080848/ http://www.compuquestinc.com/spmsgl.html, retrieved Jul. 21, 2006, 6 pages.
International Business Machines Corporation, Cross platform instant messaging using web services, Research Disclosure, Kenneth Mason Publications, Hampshire, GB, vol. 458, No. 156, Jun. 2002.
Non-Final Office Action received for U.S. Appl. No. 13/725,578 dated Jun. 18, 2014, 13 pages.
Non-Final Office Action received for U.S. Appl. No. 13/615,195 dated Aug. 19, 2014, 22 pages.
Final Office Action received for U.S. Appl. No. 13/725,578 dated Dec. 12, 2014, 24 pages.
Third Party Submission under 37 CFR 1.290 received for U.S. Appl. No. 14/087,873 dated Nov. 21, 2014, 26 pages.
Non-final Office Action received for U.S. Appl. No. 13/608,821 dated Jun. 1, 2015, 44 pages.
Non-Final Office Action recevied for U.S. Appl. No. 13/608,850 dated Jun. 1, 2015, 38 pages.
Non-Final Office Action received for U.S. Appl. No. 13/677,060 dated Apr. 24, 2015, 54 pages.
Non-Final Office Action received for U.S. Appl. No. 13/725,619, dated Jul. 17, 2015, 45 pages.
Non-Final Office Action received for U.S. Appl. No. 13/725,660 dated Aug. 18, 2015, 131 pages.
Colombo et al., "Factory of the Future: A Service-Oriented System of Modular, Dynamic Reconfigurable and Collaborative Systems," Artificial Intelligence Techniques for Networked Manufacturing Enterprises Management, Springer Series in Advanced Manufacuring 2010, pp. 459-481.
Colombo et al., "Towards the Factory of the Future: A Service-Oriented Cross-layer Infrastructure," ICT Shaping the World: A Scientific View, 2009, pp. 65-81.
Notice of Allowance received for U.S. Appl. No. 13/725,578, dated Apr. 24, 2015, 23 pages.
Final Office Action received for U.S. Appl. No. 13/677,060, dated Oct. 20, 2015, 48 pages.
Non-Final Office Action received for U.S. Appl. No. 13/615,195, dated Sep. 21, 2015, 19 pages.
Final Office Action received for U.S. Appl. No. 13/725,660, dated Oct. 26, 2015, 79 pages.
Non-Final Office Action received for U.S. Appl. No. 14/087,873 dated Nov. 25, 2015, 57 pages.
Final Office Action received for U.S. Appl. No. 13/725,619, dated Dec. 4, 2015, 21 pages.
Final Office Action recevied for U.S. Appl. No. 13/608,821, dated Dec. 7, 2015, 39 pages.
Final Office Action received for U.S. Appl. No. 13/615,195, dated Feb. 11, 2016, 19 pages.
Non-Final Office Action received for U.S. Appl. No. 13/725,543, dated Feb. 2, 2016, 15 pages.
Non-Final Office Action received for U.S. Appl. No. 13/725,660, dated Jan. 21, 2016, 72 pages.
Final Office Action received for U.S. Appl. No. 13/608,850, dated Dec. 9, 2015, 25 pages.
Communication pursuant to Article 94(3) EPC received for European Application No. 14167706.2-1955 dated Nov. 24, 2015, 8 pages.
Communication pursuant to Article 94(3) EPC received for European Application No. 14167626.2-1955 dated Nov. 24, 2015, 8 pages.
Notice of Allowance received for U.S. Appl. No. 13/725,619, dated Mar. 31, 2016, 26 pages.
Non-Final Office Action recieved for U.S. Appl. No. 13/677,060 dated Mar. 10, 2016, 66 pages.
Notice of Allowance received for U.S. Appl. No. 13/725,660 dated Feb. 3, 2016, 47 pages.

(56) References Cited

OTHER PUBLICATIONS

Non-Final Office Action for U.S. Appl. No. 14/087,730 dated Mar. 11, 2016, 81 pages.
Non-Final Office Action received for U.S. Appl. No. 14/087,821 dated Mar. 2, 2016, 86 pages.
Non-Final Office Action received for U.S. Appl. No. 14/087,977 dated Mar. 17, 2016, 83 pages.
Recursion Software, "SCADA-Aware Mobile", Frisco, TX, Aug. 29, 2012 (accessed from <<http://www.emsenergyautomation.com/brochures/scada.pdf on Feb. 11, 2016).
Ars Technica, "Windows 7 themes: how to unlock them or create your own", Nov. 12, 2009 (accessed from http://arstechnica.com/information-technology/2009/11/unlock-hidden-windows-7-themes/ on Mar. 8, 2016).
Non-Final Office Action received for U.S. Appl. No. 14/088,014 dated Mar. 22, 2016, 98 pages.
"Microsoft," "Sharing Outlook 2010 Contact\Notes/Field?", microsoft.com, Jun. 23, 2011 (accessed on Mar. 11, 2016 from http://answers.microsoft.com/en-us/office/forum/office_2010-outlook/sharing-outlook-2010-contactnotes-field/c7e74273-ff60-4da3-a3aa-ccb6cadcd25e?auth=1).
Notice of Allowance received for U.S. Appl. No. 13/608,850 dated Apr. 12, 2016, 37 pages.
Notice of Allowance received for U.S. Appl. No. 14/087,873 dated Apr. 18, 2016, 26 pages.
Chinese First Office Action received for Chinese Application No. 201410196198.5, dated Mar. 29, 2016, 18 pages (Including English Translation).
Non-Final Office Action received for U.S. Appl. No. 14/088,011 dated May 12, 2016, 96 pages.
Chinese First Office Action received for Chinese Application No. 201410198289.2, dated Apr. 5, 2016, 18 pages (Including English Translation).
Chinese First Office Action received for Chinese Application No. 201410196905.0, dated Apr. 5, 2016, 20 pages (Including English Translation).
Chinese First Office Action received for Chinese Application No. 201410196127.5, dated Apr. 7, 2016, 22 pages (Including English Translation).
Chinese Office Action for Chinese Application No. 201410196114.8 dated Apr. 25, 2016, 20 pages (Including English Translation).
Chinese First Office Action received for Chinese Application No. 201410196775.0, dated May 5, 2016, 14 pages (Including English Translation).
Chinese First Office Action received for Chinese Application No. 201410196525.7, dated May 5, 2016, 13 pages (Including English Translation).
Non-Final Office Action received for U.S. Appl. No. 13/615,195, dated Jun. 21, 2016, 29 pages.
Final Office Action received for U.S. Appl. No. 13/725,543, dated Jun. 17, 2016, 19 pages.
Non-final Office Action received for U.S. Appl. No. 14/087,970 dated Jun. 17, 2016, 36 pages.
Chinese First Office Action received for Chinese Application Serial No. 201410195780.X, dated May 26, 2016, 16 pages (Including English Translation).
Final Office Action received for U.S. Appl. No. 14/087,977 dated Jul. 13, 2016, 59 pages.
Final Office Action received for U.S. Appl. No. 14/088,014 dated Jul. 15, 2016, 65 pages.
Non-Final Office Action received for U.S. Appl. No. 14/087,922 dated Jul. 19, 2016, 120 pages.
Extended European Search Report received for European Application No. 16160604.1 dated Aug. 17, 2016, 9 pages.
Extended European Search Report received for European Application No. 16160611.6 dated Aug. 24, 2016, 10 pages.
Final Office Action received for U.S. Appl. No. 14/087,730 dated Aug. 24, 2016, 113 pages.
Extended European Search Report received for European Application No. 16160602.5 dated Sep. 2, 2016, 9 pages.
Non-Final Office Action received for U.S. Appl. No. 14/087,835 dated Sep. 23, 2016, 82 pages.
Final Office Action recieved for U.S. Appl. No. 14/087,821 dated Sep. 9, 2016, 97 pages.
Extended European Search Report received for European Application No. 13166670.3 dated Jun. 14, 2016, 10 pages.
Cloud Computing, "Whatis.com", Oct. 27, 2009, http://searchcloudcomputing.techtarget.com/sDefinition/0,,sid201_gci1287881,00.html, 2 pages.
Mell et al., "The NIST Definition of Cloud Computing," Oct. 7, 2009, http://csrc.nist.gov/groups/SNS/cloud/ computing/index.html, 2 pages.
European Office Action for EP Patent Application Serial No. 16160611.6, dated Sep. 26, 2016, 2 pages.
European Office Action for EP Patent Application Serial No. 13166670.3, dated Jul. 18, 2016, 2 pages.
European Office Action for EP Patent Application Serial No. 16160604.1, dated Sep. 26, 2016, 2 pages.
Final Office Action received for U.S. Appl. No. 13/615,195 dated Oct. 21, 2016, 44 pages.
Final Office Action received for U.S. Appl. No. 14/088,011 dated Nov. 1, 2016, 79 pages.
Communication pursuant to Rule 69 EPC received for European Application Serial No. 16160610.8 dated Oct. 17, 2016, 2 pages.
Communication pursuant to Rule 69 EPC received for European Application Serial No. 16160602.5 dated Oct. 10, 2016, 2 pages.
Non-Final Office Action received for U.S. Appl. No. 14/088,014, dated Nov. 17, 2016, 61 pages.
Chinese second Office Action received for Chinese Application Serial No. 201410196114.8, dated Nov. 9, 2016, 19 pages (Including English Translation).
Chinese Second Office Action received for Chinese Application Serial No. 201410196905.0, dated Nov. 18, 2016, 6 pages (Including English Translation).
Final Office Action received for U.S. Appl. No. 14/087,922, dated Nov. 25, 2016, 65 pages.
Non-Final Office Action for U.S. Appl. No. 14/087,730, dated Feb. 9, 2017, 78 pages.
Chinese Second Office Action received for Chinese Application Serial No. 201410198289.2, dated Dec. 15, 2016, 21 pages (Including English Translation).
Chinese Second Office Action received for Chinese Application Serial No. 201410196127.5 dated Nov. 30, 2016, 24 pages (Including English Translation).
Chinese Second Office Action received for Chinese Application Serial No. 201410195780.X, dated Feb. 3, 2017, 25 pages (Including English Translation).
Non-Final Office Action received for U.S. Appl. No. 14/658,365 dated Mar. 23, 2017, 100 pages.
Chinese First Office Action received for Chinese Application Serial No. 201410196150.4, dated Mar. 2, 2017, 20 pages (Including English Translation).
Notice of Allowance received for U.S. Appl. No. 17/648,098 dated Sep. 27, 2023, 168 pages.
Final Office Action received for U.S. Appl. No. 17/344,118 dated Sep. 6, 2023, 12 pages.
Communication pursuant to Article 94(3) EPC received for EP Patent Application Serial No. 16160602.5 dated Jul. 20, 2023, 13 pages.

\* cited by examiner

MODELING OF AN INDUSTRIAL AUTOMATION ENVIRONMENT IN THE CLOUD

CROSS-REFERENCE TO RELATED APPLICATIONS

This application is a continuation of, and claims priority to each of, U.S. patent application Ser. No. 16/599,276 (now U.S. Pat. No. 11,409,251), filed Oct. 11, 2019, and entitled "MODELING OF AN INDUSTRIAL AUTOMATION ENVIRONMENT IN THE CLOUD," which is a continuation of U.S. patent application Ser. No. 14/658,327 (now U.S. Pat. No. 10,496,061), filed Mar. 16, 2015, and entitled "MODELING OF AN INDUSTRIAL AUTOMATION ENVIRONMENT IN THE CLOUD," the entireties of which applications are hereby incorporated by reference herein.

TECHNICAL FIELD

The subject application relates generally to industrial automation, e.g., to modeling of an industrial automation environment in the cloud.

BACKGROUND

Industrial controllers and their associated input/output (I/O) devices can be useful to the operation of modern industrial automation systems. These industrial controllers can interact with field devices on the plant floor to control automated processes relating to such objectives as product manufacture, material handling, batch processing, supervisory control, and other such applications. Industrial controllers can store and execute user-defined control programs to effect decision-making in connection with the controlled process. Such programs can include, but are not limited to, ladder logic, sequential function charts, function block diagrams, structured text, or other such programming structures. In general, industrial controllers can read input data from sensors and metering devices that can provide discreet and telemetric data regarding one or more states of the controlled system, and can generate control outputs based on these inputs in accordance with the user-defined program.

In addition to industrial controllers and their associated I/O devices, some industrial automation systems also can include low-level control systems, such as vision systems, barcode marking systems, variable frequency drives, industrial robots, and the like, which can perform local control of portions of the industrial process, or which can have their own localized control systems.

During operation of a given industrial automation system, comprising a collection of industrial devices, industrial processes, other industrial assets, and network-related assets, users (e.g., operators, technicians, maintenance personnel, etc.) typically can monitor or manage operations of the industrial automation system, perform maintenance, repairs, or upgrades on the industrial automation system, or perform other tasks in connection with operation of the industrial automation system. The above-described description of today's industrial control and business systems is merely intended to provide a contextual overview of relating to conventional industrial automation systems, and is not intended to be exhaustive.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Various aspects and embodiments of the disclosed subject matter relate to the use of data analysis in a cloud platform to facilitate generating, updating, or using a model of an industrial automation system that can correspond to the industrial automation system and its respective constituent components (e.g., industrial devices, other industrial assets, network-related devices), and the respective relationships (e.g., functional relationships, geographical relationships) between the respective constituent components. A modeler component can be employed to generate (e.g., create) the model. The model can be a multi-dimensional (e.g., three-dimensional (3-D) or two-dimensional (2-D)) model that can facilitate presenting a multi-dimensional view (e.g., 3-D view or 2-D view) of the industrial automation system.

In some implementations, the industrial devices or network-related devices of the industrial automation system can be integrated with or associated with cloud gateway devices that can facilitate communication of data (e.g., industrial-automation-system-related data, network-related data) from the industrial devices or network-related devices to the cloud platform (e.g., the collection component of the cloud platform) for analysis by the modeler component and/or the virtualization component. For a given device (e.g., industrial device, network-related device), the data can comprise a pre-deployed model of an industrial device or network-related device that can be stored on such device, identifier information that can facilitate identifying the type, model, manufacturer, etc., of such device, information relating to relationships between such device and another device(s), operational data associated with such device, specification information associated with such device, or other information that can be used to facilitate modeling such device to facilitate modeling the industrial automation system. With regard to legacy devices (e.g., legacy industrial device, legacy network-related device) that may not be integrated or associated with a cloud gateway component, a communication device can be employed to facilitate inventorying the respective legacy devices. The communication device can capture (e.g., via a camera) physical information (e.g., shape, inputs, outputs, size) relating to such legacy device, identifier information regarding such legacy device (e.g., as provided on an identifier plate on the legacy device), information relating to relationships between such legacy device and another device(s), operational information associated with such legacy device, or other information that can be used to facilitate modeling such legacy device to facilitate modeling the industrial automation system.

A virtualization component can generate a virtualized industrial automation system that can correspond to the industrial automation system based at least in part on the model. The virtualized industrial automation system can be a multi-dimensional (e.g., 3-D or 2-D) virtualized industrial automation system that can present a multi-dimensional virtualized view (e.g., 3-D view or 2-D view) of an industrial automation system, or can be a virtualized dashboard view of the industrial automation system. The virtualized industrial automation system, which can be presented (e.g., displayed) on a communication device of a user, can be interfaced with the industrial automation system to facilitate interaction with (e.g., facilitate remote monitoring of, tracking of, controlling of, etc.) the industrial automation system in response to interaction with the virtualized industrial automation system using the communication device. The modeler component and virtualization component can reside on a cloud platform. The modeler component and virtualization component can employ a collection component (e.g., a cloud-based collection component) that can collect industrial-automation-system-related data from one or more industrial automation systems of one or more industrial customers for storage (e.g., in a cloud-based data store) and analysis on the cloud platform.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
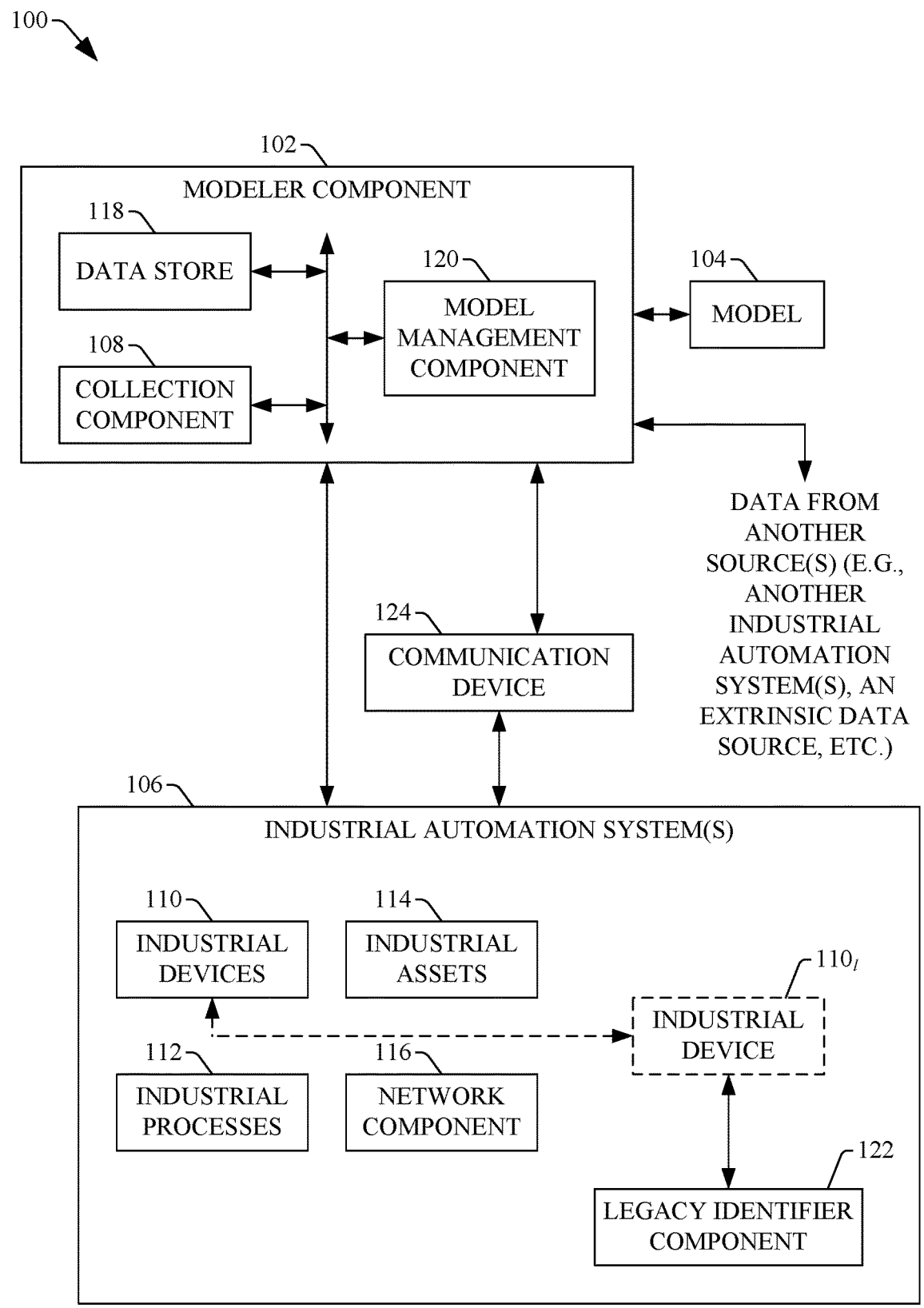
FIG. 1 illustrates a block diagram of an example system that can facilitate generation and management of a model that can correspond to an industrial automation system associated with an industrial enterprise based at least in part on cloud-based data relating to the industrial enterprise, in accordance with various implementations and embodiments of the disclosed subject matter.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

Industrial automation systems can perform various processes to produce desired products or processed materials. An industrial automation system can comprise various industrial devices, industrial processes, other industrial assets, and network-related assets (e.g., communication network devices and software). During operation of a given industrial automation system, users, such as, for example, operators, technicians, maintenance personnel, typically can monitor or manage operations of the industrial automation system, perform maintenance, repairs, or upgrades on the industrial automation system, or perform other tasks in connection with operation of the industrial automation system.

To that end, presented are various systems, methods, and techniques of the disclosed subject matter that relate to the use of data analysis (e.g., big data analysis) in a cloud platform to facilitate generating model, and/or a virtualized industrial automation system, of an industrial automation system. The model and/or virtualized industrial automation system (e.g., multi-dimensional model and/or multi-dimensional virtualized industrial automation system) can be used to facilitate interacting with (e.g., facilitate remote monitoring operation of, tracking operation of, controlling operation of, etc., via a communication device) the industrial automation system, and providing user's with an augmented reality, unique (e.g., role-centric) information overlays, and information sharing capabilities in connection with the model, associated virtualized industrial automation system, and associated industrial automation system.

The disclosed subject matter can comprise a cloud-based modeler component that can generate interactive models of industrial automation systems. An interactive model can facilitate remote viewing of, interaction with, troubleshooting of problems with, or optimization of industrial assets (e.g., industrial devices, industrial processes, or other industrial assets) and network-related devices of an industrial automation system. The modeler component can poll industrial assets and/or network-related devices via cloud gateways (e.g., integrated or otherwise associated cloud gateway components) to obtain information relating to the industrial assets and/or network-related devices to identify industrial assets and/or network-related devices of the industrial automation system and relationships with other industrial assets or network-related devices. With regard to legacy equipment of an industrial automation system, the modeler component can receive information from a communication device that can obtain information relating to legacy industrial assets to identify those legacy assets and their relationships. The modeler component can generate an interactive model of the industrial assets of the industrial automation system based at least in part on the information obtained from the industrial assets, network-related devices, and/or the communication device. The modeler component also can discover new industrial assets added to the industrial automation system, can receive a pre-deployed model of an industrial asset from the industrial asset or another source, and can incorporate the pre-deployed model in the interactive model.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or application programming interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 illustrates a block diagram of an example system 100 (e.g., a modeler system) that can facilitate generation and management of a model (e.g., a plant model) that can correspond to an industrial automation system associated with an industrial enterprise based at least in part on cloud-based data relating to the industrial enterprise, in accordance with various implementations and embodiments of the disclosed subject matter. The model generated and managed by the system 100 can be maintained and updated (e.g., automatically or dynamically, in real or near real time) to reflect any changes to the industrial automation system upon which the model is based.

The system 100 can include a modeler component 102 (e.g., a cloud-based modeler component) that can facilitate generation and management of a model 104 that can correspond to an industrial automation system 106 based at least in part on data (e.g., industrial-automation-system-related data) obtained from the industrial automation system 106, another industrial automation system(s), or from other sources (e.g., extrinsic sources), in accordance with defined modeling criteria.

The modeler component 102 can employ and provide a variety of services including a cloud-based model generation service. As part of providing cloud-based model generation service, the modeler component 102 can perform data analysis (e.g., big data analysis) in a cloud platform to facilitate generating the model 104 of the industrial automation system 106 that can be used to facilitate interacting with (e.g., remotely monitoring operation of, tracking operation of, controlling operation of, troubleshooting problems with, providing assistance relating to, etc., via a communication device) the industrial automation system 106. As more fully disclosed herein, the modeler component 102, as part of providing the cloud-based model generation service, can employ a collection component 108 (e.g., data collection component) that can collect industrial-automation-system-related data from one or more industrial automation systems (e.g., 106) of one or more industrial customers (e.g., industrial enterprises) for storage (e.g., in a cloud-based data store) and analysis (e.g., by the modeler component 102) on a cloud platform. The collection component 108 can be associated with (e.g., interfaced with and/or communicatively connected to) the industrial automation system 106 associated with an industrial enterprise.

The industrial automation system 106 can comprise one or more industrial devices 110, industrial processes 112, or other industrial assets 114 that can be distributed throughout an industrial facility(ies) in accordance with a desired industrial-automation-system configuration. The industrial automation system 106 can perform industrial processes or other actions to facilitate producing desired products, processed materials, etc., as an output.

The industrial automation system 106 also can include a network component 116 that can be associated with (e.g., integrated with, interfaced with, and/or communicatively connected to) the various industrial devices 110, industrial processes 112, and/or other industrial assets 114 of the industrial automation system 106 to facilitate communication of information (e.g., command or control information, status information, production information, etc.) between the various industrial devices 110, industrial processes 112, and/or other industrial assets 114 via the network component 116. The network component 116, and/or all or a portion of the industrial device 110 or other industrial assets 114, can be associated with (e.g., interfaced with, communicatively connected to) the collection component 108 to facilitate the communication of data between the industrial automation system 106 and the collection component 108. The network component 116 can comprise network-related devices (e.g., communication devices, routers (e.g., wireline or wireless routers), switches, etc.), wherein respective network-related devices can be connected to or interfaced with certain other network-related devices to form a communication network having a desired communication network configuration. In some implementations, one or more network-related devices of the network component 116 can be connected to or interfaced with one or more industrial devices 110, industrial processes 112, and/or other industrial assets 114 to facilitate collecting data (e.g., industrial-automation-system-related data) from the one or more industrial devices 110, industrial processes 112, and/or other industrial assets 114 or communicating information (e.g., control signals, parameter data, configuration data, etc.) to the one or more industrial devices 110, industrial processes 112, and/or other industrial assets 114.

The modeler component 102 can monitor or track the operation of the industrial automation system 106, including monitoring and tracking the respective operations of respective industrial devices 110, industrial processes 112, industrial assets 114, and/or network-related devices of the network component 116, and monitoring and tracking the configuration of the industrial automation system 106. The collection component 108 can receive, obtain, detect, or collect data relating to the operation and configuration of the industrial automation system 106, as desired (e.g., automatically, dynamically, or continuously, in real or near real time), in accordance with the defined modeling criteria. For example, the collection component 108 can receive data relating to the industrial devices 110 (e.g., operation, status, or configurations of the industrial devices, properties or characteristics of the industrial devices, maintenance records of the industrial devices, etc.), industrial processes 112 (e.g., operation, status, or configurations of the industrial processes, properties or characteristics of the industrial processes, maintenance records associated with the industrial processes, etc.), and the other industrial assets 114 (e.g., operation, status, or configurations of the industrial assets, properties or characteristics of the industrial assets, maintenance records associated with the industrial assets, etc.). The collection component 108 also can receive or collect data relating to operation of the sub-components (e.g., network-related devices) of the network component 116 (e.g., operation or status of the network devices or assets, communication conditions associated with a communication channel, total bandwidth of a communication channel, available bandwidth of a communication channel, properties or characteristics of the network devices or assets, maintenance records associated with the network devices or assets, configurations of the network devices or assets, etc.).

The modeler component 102 also can comprise a data store 118 that can be associated with (e.g., interfaced with, communicatively connected to) the collection component 108. The collection component 108 can provide (e.g., communicate, write, etc.) the data received or collected from the industrial automation system 106 and the network component 116 to the data store 118 for storage in the data store 118.

The modeler component 102 can comprise a model management component 120 that can generate an interactive model(s) 104 of one or more industrial automation systems 106 (e.g., of an industrial plant environment(s)). In some implementations, the model management component 120 can facilitate providing cloud-based services (e.g., modeling services, troubleshooting services, optimization services, remote viewing or controlling services, and/or other cloud-based services) to users and an industrial automation system(s) 106. Users (e.g., operators, technicians, maintenance personnel, supervisors, information technology (IT) personnel, or other plant personnel) can interact with a model 104 (e.g., interactive model), or a virtualized industrial automation system generated based on the model 104, of an industrial automation system(s) to perform various work tasks, functions, and/or operations, etc. For instance, a user can interact with the model 104 or the corresponding virtualized industrial automation system to facilitate remote viewing of, interaction with, troubleshooting of problems with, controlling operation of, and/or optimization of industrial assets (e.g., industrial devices 110, industrial processes 112, other assets 114) or the network component 116 of the industrial automation system(s) 106.

The industrial assets (e.g., industrial devices 110, industrial processes 112, other assets 114) and network-related components of the network component 116 of an industrial automation system(s) 106 can be equipped with or associated with components, tools, functions, etc., that can allow the model management component 120 to inventory such industrial assets (e.g., 110, 112, 114) and network-related components from the cloud and generate a model 104 of the industrial automation system(s) 106 based at least in part on such inventory. The model management component 120 can poll (e.g., request information from) industrial assets, such as industrial devices 110, industrial processes 112, or other industrial assets 114, and/or network-related components of the network component 116 via cloud gateway components (not shown in FIG. 1) to facilitate obtaining information regarding the industrial assets (e.g., 110, 112, 114) or network-related components of the network component 116 from the industrial assets (e.g., 110, 112, 114) or network-related components. For example, an industrial asset (e.g., 110, 112, 114) and/or a network-related component of the network component 116 can comprise (e.g., be integrated with) or be associated with a cloud gateway component that can enable the industrial asset (e.g., 110, 112, 114) and/or network-related component to communicate with the modeler component 102 in the cloud to facilitate the model management component 120 discovering, obtaining information from, and/or modeling the industrial asset (e.g., 110, 112, 114) and/or network-related component of the network component 116, which can provide such information to the modeler component 102 or collection component 108. The information can comprise, for example, identification information (e.g., identifiers) that can identify an industrial asset (e.g., 110, 112, 114) or network-related component and/or can identify what other industrial asset(s) is in proximity to it (e.g., within a defined distance (e.g., 1 inch, . . . , 1 foot, . . . , 1 yard, . . . , feet, . . . ) of the industrial asset) or related to it, configuration information that can identify a configuration of an industrial asset (e.g., 110, 112, 114) or network-related component, contextual information relating to an industrial asset (e.g., 110, 112, 114) or network-related component, information relating functional or geographical relationships between industrial assets (e.g., 110, 112, 114) or between an industrial asset (e.g., 110, 112, 114) and a network-related component of the network component 116, information relating to a layout (e.g., functional layout, logic layout, geographical layout) of an industrial automation system 106, communication network connections, or other information.

The model management component 120 also can determine whether a set of industrial assets (e.g., 110, 112, and/or 114) are related to each other based at least in part on determining that the set of devices were acquired by the industrial enterprise associated with the industrial automation system 106 at or near the same time (e.g., at the same time or within a defined period of time of each other (e.g., within a day, within a week, . . . ) of each other). For example, if a first industrial device, a second industrial device, and a third industrial device are acquired on a particular date, based at least in part on this acquisition information and/or other information (e.g., respective function-related information for the three industrial devices), the model management component 120 can determine or infer that the first industrial device, second industrial device, and third industrial device are related to each other (e.g., are part of a same or related industrial process 112) (unless certain information indicates that these three devices are not related to each other), and can generate or update the model 104 based at least in part on such relation between these three industrial devices.

In some implementations, an industrial automation system 106 can contain legacy industrial assets (e.g., legacy industrial devices or other legacy industrial assets) or legacy network-related components that do not comprise or are not directly associated with a cloud gateway component. A legacy identifier component 122 can be associated with (e.g., attached to, connected to, interfaced with) a legacy industrial asset (e.g., an industrial device 110, industrial process 112, or other industrial asset 114 that is a legacy industrial asset) or legacy network-related component (e.g., a network-related component (of the network component 116) that is a legacy network-related device) to facilitate maintaining and providing (e.g., communicating) information to the cloud via a cloud gateway component to facilitate modeling the legacy industrial asset or legacy network-related component with which the legacy identifier component 122 is associated. For instance, a legacy identifier component 122 can be associated with a legacy industrial device $110_l$ (as depicted). The legacy identifier component 122 can be connected to or interfaced with the legacy industrial device $110_l$, and via such connecting or interfacing, the legacy identifier component 122 can monitor, sense, determine, or measure parameters associated with operation of the legacy industrial device $110_l$ or can otherwise obtain information relating to the operation of the legacy industrial device $110_l$. The legacy identifier component 122 can communicate information (e.g., parameter information, other operation-related information) relating to the operation of the legacy industrial device $110_l$ to the cloud (e.g., the modeler component 102, the collection component 108) via the cloud gateway component associated with the legacy identifier component 122.

The legacy identifier component 122 also can provide other information regarding the legacy industrial device $110_l$. For instance, using an interface (e.g., a keyboard, a touchscreen display, a mouse) on the legacy identifier component 122, or using an interface of a communication device 124 associated with (e.g., connected via a wired or wireless connection to) the legacy identifier component 122, information (e.g., identification information) that can identify the manufacturer, model number, serial number, of the legacy industrial device $110_l$, information (e.g., specification information) regarding the specifications of the legacy industrial device $110_l$, and/or other information relating to the legacy industrial device $110_l$ can be input to and stored in a data store (not shown) of the legacy identifier component 122. The legacy identifier component 122 can communicate the identification information, specification information, and/or other information relating to the legacy industrial device $110_l$ to the cloud (e.g., the modeler component 102, the collection component 108) via the associated cloud gateway component. The model management component 120 can analyze the information relating to the operation of the legacy industrial device $110_l$, identification information relating to the legacy industrial device $110_l$, specification information relating to the legacy industrial device $110_l$, and/or other information relating to the legacy industrial device $110_l$ to facilitate modeling the legacy industrial device $110_l$ based at least in part on such information.

In certain implementations, with regard to legacy industrial assets or legacy network-related components that do not comprise or are not directly associated with a cloud gateway component, in addition to or as an alternative to employing the legacy identifier component 122, a communication device 124 (e.g., a handheld communication device), such as a computer (e.g., a laptop computer), a mobile phone (e.g., a smart phone or other type of cellular phone), an electronic tablet, electronic eyeglasses (e.g., electronic eyeglasses (e.g., smart glasses) with computing and communication functionality), or other type of communication device, can be employed to facilitate inventorying and collecting information relating to such legacy industrial assets or legacy network-related components. The communication device 124 can scan legacy industrial assets or legacy network-related components to obtain information relating to the legacy industrial assets or legacy network-related components to include in the model 104. The communication device 124 can comprise a camera that can be used to take one or more pictures of legacy industrial assets, legacy network-related components, other industrial assets or network-related components in proximity to the legacy industrial assets or legacy network-related components, and/or an area of the plant in proximity to a legacy industrial asset or legacy network-related component. For instance, the communication device 124 can take a picture of nameplate or other identifier information on a legacy industrial asset or legacy network-related component to facilitate identifying the legacy industrial asset or legacy network-related component. The communication device 124 can comprise a recognizer component (not shown in FIG. 1) that can recognize (e.g. using pattern or optical character recognition (OCR) recognition) or identify the legacy industrial asset or legacy network-related component based at least in part on information obtained via the photograph. Information relating to legacy industrial assets or legacy network-related components also can be input to the communication device 124 by a user via a keyboard, keypad, or audio interface (e.g., a microphone that receives information from the user via the user's voice).

The communication device 124 can interface with the cloud (e.g., via a wireline or wireless communication connection), including with the modeler component 102, to communicate (e.g., migrate) the information relating to legacy industrial assets or legacy network-related components to the modeler component 102. The collection component 108 can collect the information relating to the legacy industrial assets or legacy network-related components, and can facilitate storing this information in the data store 118.

The model management component 120 can model the industrial automation system 106, including modeling industrial assets (e.g., 110, 112, 114), legacy industrial assets, network-related components (e.g., of the network component 116), and/or legacy network-related components, based at least in part on the respective information obtained from the industrial assets (e.g., 110, 112, 114), network component 116, legacy identifier component 122, and/or communication device 124, to generate the interactive model 104 (e.g., a data-rich interactive model) of the industrial automation system 106. To facilitate generating a model 104 that can correspond to and be associated with (e.g., can interact or be interfaced with) the industrial automation system 106, the model management component 120 can access the data store 118 (e.g., cloud-based data store) to obtain a set of data relating to the industrial automation system 106 and/or another industrial automation system (e.g., another system comprising an industrial device(s), process(es), and/or asset(s) that can be the same or similar to an industrial device(s) 110, process(es) 112, and/or asset(s) 114 of the industrial automation system 106). The set of data can comprise information relating to, for example, the respective properties, characteristics, functions, configurations, etc., of respective industrial devices 110, industrial processes 112, other industrial assets 114, or network-related devices of the network component 116; or the configuration of industrial devices 110, industrial processes 112, and/or other industrial assets 114 in relation to each other. For example, the properties or characteristics for industrial devices 110 or industrial processes 112 can comprise mechanical or process properties or characteristics associated with industrial devices or processes (e.g., mechanical latency, process cycle times, operating schedules, etc., associated with industrial devices). As another example, the properties or characteristics for network-related devices can comprise communication properties or characteristics (e.g., wireless and/or wireline communication functionality, type(s) of network or communication protocol(s), network or communication specifications, total bandwidth, etc.) of the respective network-related devices.

The set of data also can comprise information relating to, for example, the configuration of the network-related devices in relation to each other, or the configuration of network-related devices in relation to the industrial devices 110, industrial processes 112, and/or other industrial assets 114; software, firmware, and/or operating system utilized by the industrial automation system 106 (e.g., type(s), version(s), revision(s), configuration(s), etc., of the software, firmware, and/or operating system); functional and communicative relationships between industrial devices 110, industrial processes 112, industrial assets 114, network-related devices of the network component 116, etc. (e.g., communication connections or conditions between industrial devices, types of connections between industrial devices, communication connections between industrial devices and network-related devices, etc.). The set of data further can include information relating to, for example, human behavior or interaction in connection with the industrial automation system 106 (e.g., maintenance schedules, shift-specific or operator-specific behavior or interaction of operators with the industrial automation system); production or process flows of the industrial automation system 106 at particular times or in connection with particular projects; and/or other aspects or features of the industrial automation system 106.

The model management component 120 can analyze the set of data and can generate the model 104 of the industrial automation system 106 based at least in part on the results of the analysis of the set of data. In some implementations, the model management component 120 can generate the model 104, which can be a multidimensional (e.g., two-dimensional (2-D) or three-dimensional (3-D)) model, in accordance with an International Standardization Organization (ISO) standard(s).

The model management component 120 also can facilitate generation of a multi-dimensional (e.g., 2-D or 3-D) visualization or virtualization of the industrial automation system. The multi-dimensional virtualization of the industrial automation system can be used (e.g., interacted with by a user) to facilitate remote viewing of, interaction with, troubleshooting of problems with, controlling operation of, determining and/or generating optimization recommendations for, and/or optimization of industrial assets (e.g., 110, 112, 114) or the network component 116 of the industrial automation system 106.

When there are multiple industrial plant facilities, the model management component 120 can generate a model 104 that can represent (e.g., model) the multiple industrial automation systems (e.g., 106) of the multiple industrial plant facilities and/or respective models (e.g., sub-models) of the respective industrial automation systems (e.g., 106 of the respective industrial plant facilities. The model management component 120 also can facilitate generation of a multi-dimensional visualization or virtualization of the multiple industrial automation systems (e.g., 106) that can be interacted with by users to facilitate remote viewing of, interaction with, troubleshooting of problems with, controlling operation of, determining and/or generating optimization recommendations for, and/or optimization of industrial assets (e.g., 110, 112, 114) of the multiple industrial automation systems (e.g., 106).

In some implementations, to facilitate the modeling of an industrial asset (e.g., industrial device 110, industrial process 112, other industrial asset 114) or network-related device of the network component 116, the industrial asset (e.g., 110, 112, 114) or network-related device can comprise a pre-deployed model of that industrial asset (e.g., 110, 112, 114) or network-related device that the industrial asset (e.g., 110, 112, 114) or network-related device can provide (e.g., communicate) to the modeler component 102 in the cloud via a cloud gateway component associated with the industrial asset (e.g., 110, 112, 114) or network-related device and/or the network component 116. For instance, when an industrial asset (e.g., 110) is installed into an industrial automation system 106, the model management component 120 can discover (e.g., automatically or dynamically detect the presence of) the industrial asset (e.g., 110) in the industrial automation system 106, and/or the industrial asset (e.g., 110) can make its presence known (e.g., automatically or dynamically make its presence known by communicating presence or identification information) to the model management component 120 via an associated cloud gateway component. The industrial asset (e.g., 110) can communicate its pre-deployed model (e.g., information relating to the pre-deployed model) to the modeler component 102.

In response to receiving the model (e.g., pre-deployed model) of the industrial asset (e.g., 110), the model management component 120 can integrate or incorporate the model of the industrial asset (e.g., 110) into the model 104 of the industrial automation system 106 to update the model 104 and generate a modified model 104 of the industrial automation system 106. The model management component 120 also can analyze the modified model 104 of the industrial automation system 106 to determine whether any modification(s) is to be made or recommended to be made to an industrial asset(s) (e.g., 110, 112, 114) or network-related device(s) of the network component 116 to facilitate optimizing or improving operation of the industrial automation system 106 with the new industrial asset (e.g., 110). In some implementations, the model management component 120 can communicate modification information to an industrial asset(s) (e.g., 110, 112, 114) or network-related device(s) of the network component 116 to facilitate modifying (e.g., automatically, dynamically) such industrial asset(s) (e.g., 110, 112, 114) or network-related device(s), wherein such industrial asset(s) (e.g., 110, 112, 114) or network-related device(s) can modify or reconfigure itself based at least in part on the received modification information. In other implementations, the model management component 120 can generate a recommendation that can recommend modifying or reconfiguring such industrial asset(s) (e.g., 110, 112, 114) or network-related device(s) and can present the recommendation (e.g., via an interface, such as an human machine interface (HMI) or communication device), wherein a user can review the recommendation and decide whether or not to implement the recommendation to modify or reconfigure the such industrial asset(s) (e.g., 110, 112, 114) or network-related device(s). The modification or reconfiguration can comprise, for example, modifying a parameter(s) of the industrial asset (e.g., industrial device 110, industrial process 112, other industrial asset 114), modifying a connection of the industrial asset (e.g., 110, 112, 114) to another industrial asset or network-related device, updating software or firmware for an industrial asset (e.g., 110, 112, 114) or a network-related device, generating a new load balancing scheme for the industrial automation system 106, or other desired modification or reconfiguration of an industrial asset (e.g., 110, 112, 114) or network-related device of the network component 116.

In response to any modification or reconfiguration of such industrial asset(s) (e.g., 110, 112, and/or 114) or network-related device(s) of the network component 116 (e.g., in response to modification information communicated to (and implemented by) such industrial asset(s) or network-related device(s) by the modeler component 102, or in response to implementation of a recommendation to modify or reconfigure such industrial asset(s) (e.g., 110, 112, and/or 114) or network-related device(s), the modeler component 102 can receive updated information that can reflect such modification or reconfiguration from such industrial asset(s) (e.g., 110, 112, and/or 114) or network-related device(s) of the network component 116, legacy identifier component 122, and/or the communication device 124. The model management component 120 can update or modify the model 104 (e.g., the modified model with the model of the newly installed industrial asset) to generate a new modified model 104 based at least in part on the updated information to reflect the modification or reconfiguration of such industrial asset(s) (e.g., 110, 112, and/or 114) or network-related device(s).

In some implementations, the industrial asset (e.g., industrial asset (e.g., 110, 112, or 114) with an associated (e.g., integrated) cloud gateway component) not only can identify itself to the modeler component 102 (e.g., via the cloud gateway component), but also can detect or identify other industrial assets (e.g., 110, 112, 114) or network-related devices of the network component 116 near the industrial asset (e.g., 110, 112, or 114) and/or having a relationship (e.g., functional relationship or connection, sharing a common network) with the industrial asset (e.g., 110, 112, or 114). The industrial asset (e.g., 110, 112, or 114) can communicate information relating to the detected or identified industrial assets (e.g., 110, 112, 114) or network-related devices that are near the industrial asset (e.g., 110, 112, or 114) and/or the relationships between the industrial asset (e.g., 110, 112, or 114) and the detected or identified industrial assets or network-related devices to the modeler component 102. The model management component 120 can integrate or incorporate such information into the model 104 of the industrial automation system 106 to update or modify the model 104 of the industrial automation system 106 to generate a modified model of the industrial automation system 106.

An industrial device 110 or a network-related device of the network component 116, or another device, also can comprise components, tools, functions, etc., that can allow users (e.g., original equipment manufacturers (OEMs)) who are providing a custom solution to an entity (e.g., customer) to construct (e.g., build) or design a model (e.g., sub-model) that can correspond to their sub-system (e.g., a motor control cabinet). The sub-model can be stored on one or more devices (e.g., industrial assets (e.g., controller, motor drive), network-related devices (e.g., router, transceiver)) of the sub-system. When the sub-system is installed in the industrial automation system 106, the modeler component 102 can discover (e.g., automatically detect) the addition of the sub-system to the industrial automation system 106 and/or the sub-system can make (e.g., automatically) its presence in the industrial automation system 106 known to the modeler component 102.

The one or more devices (e.g., one or more industrial assets (e.g., 110, 112, 114) or network-related devices) of the sub-system can communicate the model of the sub-system (e.g., information relating to the model) to the modeler component 102 (e.g., via the cloud gateway component). The model management component 120 can integrate or incorporate the sub-model of the sub-system with the other modeling information relating to the other industrial assets (e.g., 110, 112, 114) and components (e.g., 116) of the industrial automation system 106 to modify the model 104 of the industrial automation system 106 to generate a modified model 104 of the industrial automation system 106.

As part of a model of an industrial automation system 106, the model management component 120 can store configuration information for respective industrial assets (e.g., 110, 112, 114) or network-related devices of the industrial automation system 106 in or with the model 104 (e.g., in a model file of the model 104 that can be stored (e.g., backed up) in the data store 118 in the cloud). The model management component 120 can, for example, store such configuration information in a device-agnostic format and/or platform-agnostic format to facilitate enabling the configuration information to be used with different devices (e.g., replacement devices) and/or different platforms (e.g., used by a replacement device) in an industrial automation system 106.

In some implementations, the model management component 120 can facilitate communicating (e.g., transferring, pushing down) configuration information for respective (e.g., various) types of industrial assets (e.g., 110, 112, 114) or network-related device of the network component 116 of the industrial automation system 106 to the respective types of industrial assets (e.g., 110, 112, 114) or network-related devices to facilitate configuring the respective types of industrial assets (e.g., 110, 112, 114) or network-related devices. This can facilitate improved (e.g., easier) deployment of new industrial assets (e.g., 110, 112, 114), network-related devices, or systems, and/or can facilitate ensuring consistency of plant standards across the plant (e.g., comprising an industrial automation system) or multiple plants (e.g., comprising multiple industrial automation systems) and/or one or more entities (e.g., supplier entities) associated with the one or more plants. For example, if an old industrial device 110 (e.g., old controller) in a particular part of an industrial automation system 106 is replaced with a new industrial device 110 (e.g., new controller) for whatever reason, in response to discovering or being notified of the new industrial device 110 in the industrial automation system, the model management component 120 can retrieve configuration information that was previously used for the old industrial device 110 from the data store 118 in the cloud and can communicate desirable (e.g., suitable) configuration information to the new industrial device 110 to facilitate configuring the new industrial device 110 so that the new industrial device 110 can operate desirably (e.g., optimally, acceptably, suitably) in the industrial automation system 106, wherein the desirable configuration information can be the same as, or based at least in part on, the retrieved configuration information associated with the old industrial device 110, depending on the respective types, models, manufacturers, and/or other features of the old industrial device 110 and new industrial device 110.

The model 104 of an industrial automation system(s) 106 generated by the modeler component 102 can be agnostic with regard to the different vendors or platforms that can be associated with industrial assets (e.g., 110, 112, 114) or network-related device of the network component 116 that can be employed in the industrial automation system(s) 106. Thus, for instance, with regard to the example replacement of the old industrial device 110, the model management component 120 can, as desired (e.g., as necessary), translate configuration information in a first format relating to the old industrial device 110 (e.g., controller of a first type, of a first model, and/or from a first manufacturer) to new configuration information in a second format relating to the new industrial device 110 (e.g., controller of a second type, of a second model, and/or from a second manufacturer), and can communicate the new configuration information in the second format from the cloud to the new industrial device 110 at the plant to facilitate configuring the new industrial device 110 using the new configuration information in a format (e.g., the second format) that can be usable and understood by the new industrial device 110. That is, prior to configuration information for an industrial asset (e.g., 110, 112, 114) or a network-related device at a plant being communicated to (e.g., pushed down to) the industrial asset or network-related device, the model management component 120 can translate the configuration information relating to such industrial asset or network-related device that is stored in the cloud-based data store 118 to a format that can be compatible with the new industrial asset or network-related device to which the configuration information is being sent. This can shorten installation time for installing a new industrial device 110, industrial process 112, other type of industrial asset 114, network-related device of the network component 116, etc., and can ensure that the new industrial device 110, industrial process 112, other type of industrial asset 114, network-related device, etc., can operate according to the same parameters as the previous industrial device 110, industrial process 112, other type of industrial asset 114, network-related device, etc., regardless of the respective types, models, manufacturers, and/or other features of the previous industrial device 110, industrial process 112, other type of industrial asset 114, network-related device, etc., and the new industrial device 110, industrial process 112, other type of industrial asset 114, network-related device, etc.

The model 104 of an industrial automation system 106 of an entity (e.g., a company) can be used for other purposes as well. For instance, an entity, such as a large company, may work with various suppliers, vendors, or system integrators to obtain industrial assets (e.g., 110, 112, 114) or network-related devices, have industrial assets (e.g., 110, 112, 114) or network-related devices designed, etc., for the industrial automation system 106. The entity can have respective, relevant portions of the model 104 of its industrial automation system 106 provided to respective suppliers, vendors, or system integrators so that the respective suppliers, vendors, or system integrators can have respective, relevant information (e.g., parameters, configuration information, specification information) for the respective industrial assets (e.g., 110, 112, 114) or network-related devices they are designing and/or providing to the entity for the respective portions of the industrial automation system 106. For example, the model management component 120 can provide specifications for an industrial device 110 (e.g., controller or motor), which is designed and/or manufactured by a supplier entity and used in an industrial automation system 106 of an enterprise entity, to the supplier entity (e.g., a communication device of the supplier entity) via a relevant portion of the model 104 of the portion of the industrial automation system 106 that comprises the industrial device 110. Also, with regard to device configuration and manufacturing standards developed by the enterprise entity or another entity(ies) in connection with one or more industrial devices 110 of the industrial automation system 106 and employed at a facility (e.g., main facility) of the enterprise entity, the model management component 120 can encode or incorporate such device configuration and manufacturing standards in the model 104 of the industrial automation system 106. The model management component 120 can provide the model 104 of the industrial automation system 106, or a relevant portion thereof, to one or more other facilities (e.g., one or more communication devices of the one or more facilities) associated with the enterprise entity to provide such device configuration and manufacturing standards to the one or more other facilities to enforce operational standardization across multiple facilities and to make configuration of industrial automation systems (e.g., 106) at other (e.g., new) facilities easier through the use of such device configuration and manufacturing standards obtained from the model at the other facilities. Thus, the model 104 can be used by an enterprise entity to facilitate homogenizing industrial automation systems (e.g., 106) and/or product lines of the enterprise entity globally.

In accordance with other aspects and implementations of the disclosed subject matter, once the model 104 of an industrial automation system 106 is constructed, the model 104 can be an active part of the enterprise entity's industrial automation system 106 and can be integrated with other services (e.g., virtualization services, custom data services, remote services) and applications.

Figure 2:
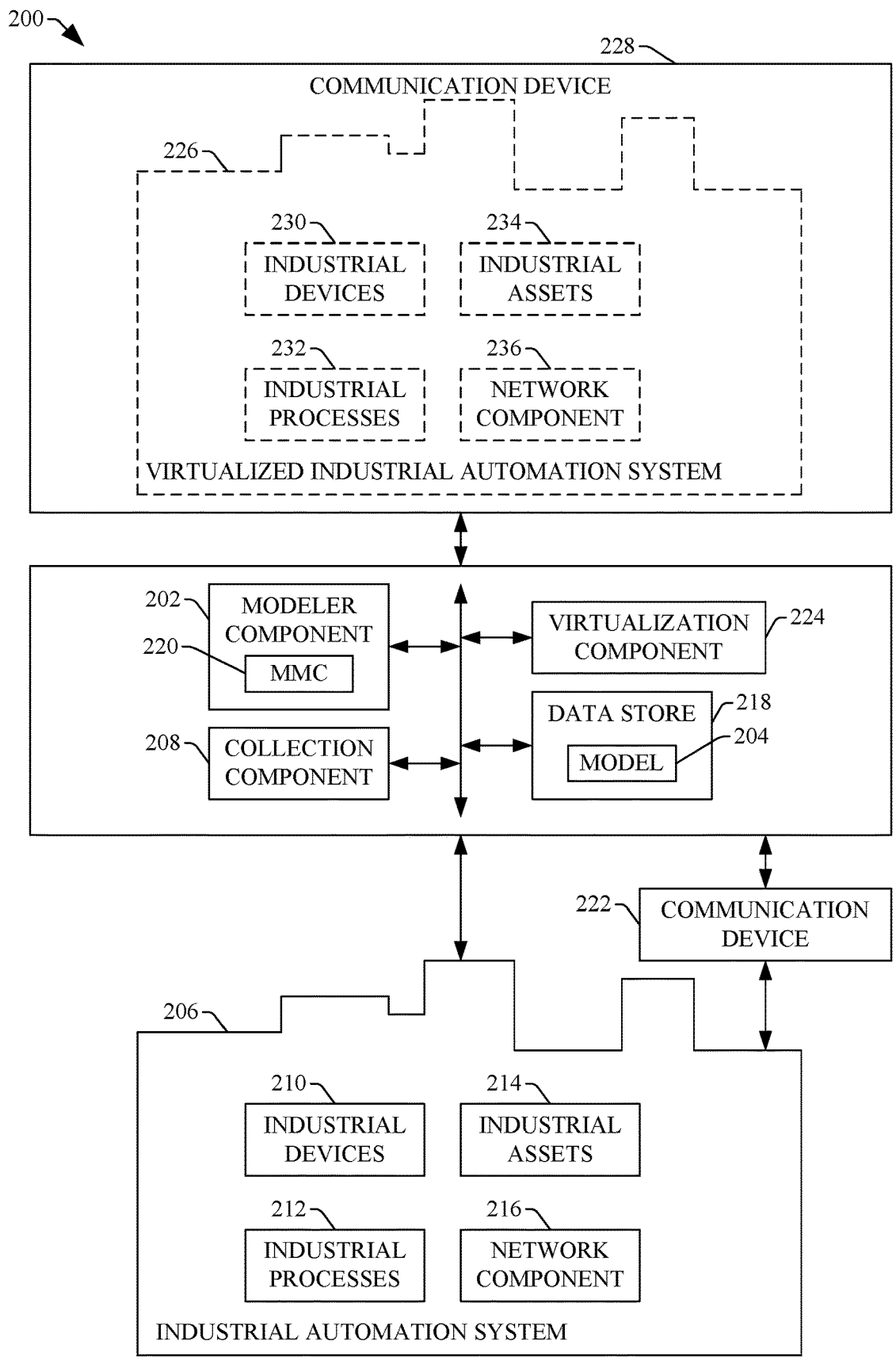
FIG. 2 depicts a block diagram of an example system that can employ a model of an industrial automation system associated with an industrial enterprise based at least in part on cloud-based data relating to the industrial enterprise to generate a virtualized industrial automation system, in accordance with various implementations and embodiments of the disclosed subject matter.

Referring to FIG. 2, FIG. 2 depicts a block diagram of an example system 200 that can employ a model of an industrial automation system associated with an industrial enterprise based at least in part on cloud-based data relating to the industrial enterprise to generate a virtualized industrial automation system, in accordance with various implementations and embodiments of the disclosed subject matter. The system 200 can comprise a modeler component 202, a model 204 of the industrial automation system 206, an industrial automation system 206, a collection component 208, industrial devices 210, industrial processes 212, other industrial assets 214, a network component 216, a data store 218, a model management component 220 (MMC 220), and a communication device 222.

The system 200 also can comprise a virtualization component 224 that can be associated with the modeler component 202, collection component 208, data store 218, and industrial automation system 206, among other components with which it can be associated. The virtualization component 224 can generate an interactive virtualized or visualized multi-dimensional (e.g., 2-D or 3-D) industrial automation system 226 of and corresponding to the industrial automation system 206 based at least in part on the model 204 of the industrial automation system 206, as more fully disclosed herein. A user (e.g., operator, technician, maintenance person, supervisor, IT person, or other plant person) can interact with and navigate the virtualized industrial automation system 226, via a communication device 228 (e.g., computer, mobile phone, electronic pad or tablet), to facilitate monitoring (e.g., remote monitoring or viewing) operation of the industrial automation system 206, controlling (e.g., remotely controlling) operation of the industrial automation system 206, troubleshooting or providing assistance with (e.g., remotely troubleshooting or assisting) a problem with operation of the industrial automation system 206, or performing other tasks relating to the industrial automation system 206, via the virtualized industrial automation system 226 presented on the communication device 228 associated with the user. The virtualization component 224 can overlay respective relevant data (e.g., overlay customized data) on a relevant portion (e.g., customized view of a portion) of the virtualized industrial automation system 226 presented (e.g., displayed) on the communication device 228, for respective industrial devices 210, industrial processes 212, other industrial assets 214, and/or network-related devices of the network component 216 in the corresponding portion of the industrial automation system 206. The virtualization component 224 can determine the relevant customized data (e.g., status data, operational data, other data) to overlay on the relevant portion of the virtualized industrial automation system 226 that can correspond to the relevant portion of the industrial automation system 206 based at least in part on the role of the user in the enterprise entity, identification or authentication information associated with the user, access rights to data granted to the user, location of the user in relation to the industrial automation system 206, preferences (e.g., user preferences, enterprise entity preferences), and/or other factors, in accordance with defined virtualization criteria.

In some implementations, the modeler component 202, collection component 208, data store 218, and virtualization component 224 can be located in a cloud platform that can be interfaced with the industrial automation system 206. In accordance with various other implementations, one or more of the modeler component 202, the collection component 208, the data store 218, the virtualization management component 224, and/or various other portions (e.g., components) of the modeler component 202, the collection component 208, the data store 218, or the virtualization management component 224, can be located at the plant or OEM level associated with the industrial automation system 206, or can be located in a different platform or level.

To facilitate generating the virtualized industrial automation system 226, the virtualization component 224 can utilize the model 204 of the industrial automation system 206 (e.g., which can be an updated model when the industrial automation system 206 has been modified) that can be stored in the data store 218 or provided by the modeler component 202. Additionally or alternatively, the virtualization component 224 can monitor or track the operation of the industrial automation system 206, including monitoring and tracking the respective operations of respective industrial devices 210, industrial processes 212, industrial assets 214, and/or network-related devices of the network component 216 based at least in part on information (e.g., industrial-automation-system-related information) collected by the collection component 208 and/or stored in the data store 218.

The virtualization component 224 can generate and manage the virtualized industrial automation system 226 that can correspond to the industrial automation system 206 based at least in part on the model 204 and/or data obtained from the industrial automation system 206, another industrial automation system(s), or from other sources (e.g., extrinsic sources), in accordance with defined virtualization criteria. The virtualization component 224 can be associated with (e.g., interfaced with, communicatively connected to) the modeler component 202, collection component 208, and/or data store 218 to facilitate obtaining the model 204 and/or the data to facilitate generating and managing the virtualized industrial automation system 226 of the industrial automation system 206.

The virtualization component 224 can analyze the model 204 and/or data (e.g., provided by the modeler component 202, collected by the collection component 208, or stored in the data store 218) and/or other data (e.g., other industrial-automation-system-related data and/or other data, such as extrinsic data), and can generate (e.g., create, build, construct, etc.) the virtualized industrial automation system 226 that can correspond to the industrial automation system 206 based at least in part on the results of the model and/or data analysis, in accordance with the defined virtualization criteria. The virtualized industrial automation system 226 also can comprise a virtualized network component that can correspond to the network component (e.g., a wireline and/or wireless communication network) that can be integrated or interfaced with the other portions (e.g., industrial devices 210, industrial processes 212, industrial assets 214, network component 216, etc.) of the industrial automation system 206. The virtualization component 224 can thereby virtualize the automation or control environment as well as the network environment (e.g., an IT view of the network environment) that can represent and be associated with (e.g., interfaced with) the industrial automation system 206. For instance, the virtualization component 224 can generate a virtualized industrial automation system 226 that can virtualize (e.g., comprise virtualized versions of) the industrial devices 210, industrial processes 212, industrial assets 214, and network-related devices of the network component 216, etc., including virtualizing the respective features and configurations (e.g., respective functions, controls, parameters, settings, etc.) of the industrial devices 210, industrial processes 212, industrial assets 214, and network-related devices of the network component 216, etc., and virtualizing respective connections, interactions, or interrelationships (e.g., functional and/or geographical interrelationships) between respective industrial devices 210, industrial processes 212, industrial assets 214, and/or network-related devices of the network component 216, etc., to virtualize the configuration of the industrial automation system 206 to generate the corresponding virtualized industrial automation system 226. The virtualized versions of the industrial devices 210, industrial processes 212, industrial assets 214, and the network component 216 generated by the virtualization component 224 can be, for example, virtualized industrial devices 230, virtualized industrial processes 232, other virtualized industrial assets 234, and virtualized network component 236. In some implementations, to facilitate analyzing the model 204 (e.g., model-related data) or data, as desired (e.g., when appropriate), the virtualization component 224 can normalize data to facilitate generating data with normalized values that can be used to facilitate generating the virtualized industrial automation system 226.

To facilitate generating a virtualized industrial automation system 226 that can correspond to and be associated with (e.g., can interact or be interfaced with) the industrial automation system 206, the virtualization component 224 can access the data store 218 (e.g., cloud-based data store), the collection component 208, or modeler component 202 to obtain the model 204 and/or a set of data relating to the industrial automation system 206 and/or another industrial automation system (e.g., another system comprising an industrial device(s), process(es), and/or asset(s) that can be the same or similar to an industrial device(s) 210, process(es) 212, and/or asset(s) 214 of the industrial automation system 206). The model 204 or the set of data can comprise information relating to, for example, the respective properties, characteristics, functions, configurations, etc., of respective industrial devices 210, industrial processes 212, other industrial assets 214, or network-related devices of the network component 216; or the configuration of industrial devices 210, industrial processes 212, or other industrial assets 214 in relation to each other. For example, the properties or characteristics for industrial devices 210 or industrial processes 212 can comprise mechanical or process properties or characteristics associated with industrial devices or processes (e.g., mechanical latency, process cycle times, operating schedules, etc., associated with industrial devices). As another example, the properties or characteristics for network-related devices of the network component 216 can comprise communication properties or characteristics (e.g., wireless and/or wireline communication functionality, type(s) of network or communication protocol(s), network or communication specifications, total bandwidth, etc.) of the respective network-related devices.

The model 204 and/or the set of data also can comprise information relating to, for example, the configuration of the network-related devices of the network component 216 in relation to each other, or the configuration of network-related devices in relation to the industrial devices 210, industrial processes 212, and/or other industrial assets 214; software, firmware, and/or operating system utilized by the industrial automation system 206 (e.g., type(s), version(s), revision(s), configuration(s), etc., of the software, firmware, and/or operating system); functional and communicative relationships between industrial devices 210, industrial processes 212, industrial assets 214, network-related devices of the network component 216, etc. (e.g., communication connections or conditions between industrial devices, types of connections between industrial devices, communication connections between industrial devices and network-related devices, etc.). The model 204 or the set of data further can include information relating to, for example, human behavior or interaction in connection with the industrial automation system 206 (e.g., maintenance schedules, shift-specific or operator-specific behavior or interaction of operators with the industrial automation system); production or process flows of the industrial automation system 206 at particular times or in connection with particular projects; and/or other aspects or features of the industrial automation system 206.

The virtualized industrial automation system 226 generated and managed by the virtualization component 224 can be or can comprise a multi-dimensional virtualized industrial automation system that can provide multi-dimensional virtualized views (e.g., 3-D views or 2-D views) of the industrial automation system 206, or a portion thereof, from various visual perspectives. In some implementations, the virtualization component 224 can generate and manage a virtualized industrial automation system 226 that can comprise a dashboard (e.g., a virtualized dashboard, a graphical representation of a dashboard) that can comprise a virtual view of all or a portion of the parameters, controls, alert indicators, etc., associated with the industrial automation system 206. For instance, the modeler component 202 and/or the virtualization component 224 can leverage the rich set of historical and live data (e.g., industrial-automation-system-related data and other data) that can be collected in the cloud (e.g., via the collection component 208) to create interactive, multi-dimensional (e.g., 3-D, 2-D) models (e.g., interactive models), virtualizations, or other interactive virtualizations (e.g., a dashboard virtualization) of a user's plant environment (e.g., the portion of the plant relevant to the user's role or job at the plant) that can facilitate remote (virtualized) viewing, interaction with, and/or control of industrial devices 210, industrial processes 212, industrial assets 214, network-related devices of the network component 216, etc., on the plant floor of the industrial automation system 206 via the communication device 228 of the user.

In some implementations, a virtualized industrial automation system 226 (e.g., 3-D virtualized industrial automation system) generated by the virtualization component 224 can comprise parallax information (e.g., horizontal and vertical parallax information) and depth information that can recreate and/or virtualize the industrial automation system 206, including recreating and/or virtualizing the relationships between objects (e.g., industrial devices, processes, assets, etc.) of the industrial automation system 206 (e.g., recreating and/or virtualizing geo-spatial relationships of objects, relative distances of objects from a user at the user's viewpoint, providing depth perception with respect to objects, etc.). The user can use the user's communication device 228 (e.g., by interacting with controls provided by the virtualization service or application) to interact with the multi-dimensional virtualized industrial automation system 226. For example, using the user's communication device 228 (e.g., computer, phone, electronic pad or tablet, electronic (e.g., smart) glasses with communication capabilities and functionality, etc.), the user can be immersed (e.g., visually and/or audially) within the multi-dimensional (e.g., 3-D) virtualized industrial automation system 226 associated with an industrial automation system 206 such that the user can experience (e.g., visually or audially) or interact with the multi-dimensional (e.g., 3-D) virtualized industrial automation system 226 in a manner similar to if the user was in the plant viewing the industrial automation system 206, wherein the user can use controls (e.g., provided by the virtualization service or application) provided on the communication device 228 to virtually walk around through and interact with the virtualized industrial automation system 226 to facilitate remotely interacting with the industrial automation system 206. Also, using the user's communication device 228, the user can view (e.g., virtually view 3-D graphics of) the respective locations of respective plant personnel (e.g., operators, technicians, and/or other personnel) who are performing work tasks in connection with the industrial automation system 206 or who are otherwise in proximity to respective portions of the industrial automation system 206 at respective locations.

The virtualized industrial automation system 226 generated by the virtualization component 224 can include graphical and/or virtualized representations of the various industrial devices 210, industrial processes 212, industrial assets 214, network-related devices of the network component 216, etc., of the industrial automation system 206 and data (e.g., industrial-automation-system-related data or other data) that can be overlaid on and/or provided in proximity to the graphical and/or virtualized representations. The graphical and/or virtualized representations (e.g., 230, 232, 234, 236) of the various industrial devices 210, industrial processes 212, industrial assets 214, network-related devices, etc., generated by the virtualization component 224 can comprise one or more respective instances (e.g., virtualized instances) of the various industrial devices 210, industrial processes 212, industrial assets 214, network-related devices of the network component 216, etc. The graphical and/or virtualized representations (e.g., 230, 232, 234, 236) of the various industrial devices 210, industrial processes 212, industrial assets 214, network-related devices, etc., also can comprise (e.g., as applicable) graphical and/or virtualized representations of controls (e.g., virtualized controls), switches (e.g., virtualized switches), conveyors (e.g., virtualized conveyors), or other parts (e.g., virtualized parts), that can correspond to the various controls, switches, conveyors, or other parts of or associated with the various industrial devices 210, industrial processes 212, industrial assets 214, network-related devices, etc., of the industrial automation system 206. When in accordance with the user's access rights to the virtualized industrial automation system 226 and associated industrial automation system 206 (e.g., via the virtualized industrial automation system 226), the user, using the user's communication device 228, can interact with the virtual industrial automation system 226 to manipulate or adjust the virtualized controls, virtualized switches (e.g., switch a virtual switch on or off), etc., of the graphical and/or virtualized representations (e.g., 230, 232, 234, 236) of the various industrial devices 210, industrial processes 212, industrial assets 214, network-related devices, etc., to facilitate remotely manipulating or adjusting the controls, switches, etc., of the various industrial devices 210, industrial processes 212, industrial assets 214, network-related devices, etc., of the industrial automation system 206.

In some implementations, the virtualization component 224 can facilitate capturing (e.g., via one or more capture components (e.g., one or more video cameras directed at various parts of the industrial automation system 206)) or obtaining video images of the industrial automation system 206, or a desired portion(s) thereof. The video images can be collected by the collection component 208 and stored in the data store 218. The virtualization component 224 can overlay and/or integrate the video images (e.g., real time or near real time video images) of the industrial automation system 206 on and/or with the virtualized industrial automation system 226 to augment the virtualized industrial automation system 226 (e.g., to generate an augmented virtualized industrial automation system), wherein the video images of the industrial automation system 206 can provide visual data with the virtualized industrial automation system 226 that may not be available via the virtualized industrial automation system 226 by itself.

The virtualization component 224 can store the virtualized industrial automation system 226 in the data store 218 (e.g., cloud-based data store). The virtualization component 224 also can provide (e.g., communicate) the virtualized industrial automation system 226, or a portion thereof, to the communication device(s) 228 of a user(s) (e.g., operator, technician, engineer, manager, maintenance or repair person, etc.) associated with the industrial automation system 206, wherein the communication device(s) 228 of the user(s) can present (e.g., display) the virtualized industrial automation system 226, or portion thereof, to the user(s) (e.g., for remote display of the virtualized industrial automation system 226 on such communication device 228 for viewing by the user). For instance, the virtualization component 224 can provide (e.g., communicate, present, etc.) one or more virtual interfaces comprising all or a portion of the virtualized industrial automation system 226 of the industrial automation system 206 (e.g., comprising all of the virtualized industrial automation system 226 or only the part(s) (e.g., only certain industrial device 210, processes 212, assets 214, or network-related devices) of the virtualized industrial automation system 226 that the user desires or is permitted to access). The communication device 228 can be, for example, a computer (e.g., desktop computer, laptop computer), a mobile phone (e.g., smart phone, cellular phone), an electronic pad or tablet, electronic glasses (e.g., smart glasses) with communication functionality, an electronic watch with communication functionality, an Internet Protocol (IP) television (IPTV), or other type of suitable communication device.

In some implementations, the virtualization component 224 can monitor the user's location (e.g., in relation to the industrial automation system 206), and interactions and behavior of the user in relation to the industrial automation system 206 or associated virtualized industrial automation system 226, to facilitate remote interaction with and/or control of (e.g., gesture-based interaction with and/or control of) the industrial devices 210, industrial processes 212, industrial assets 214, and/or network-related devices of the network component 216, etc., of the industrial automation system 206 via the communication device 228 of the user and the cloud platform. In some implementations, a user can interact with the virtual industrial automation system 226 associated with (e.g., interfaced with) the corresponding industrial automation system 206 via the user's communication device 228 to facilitate interacting with and/or controlling (e.g., remotely interacting with and/or controlling) the industrial automation system 206 based at least in part on the user's interactions with the virtual industrial automation system 226 via the communication device 228 of the user.

For instance, the user can view (e.g., monitor and/or track virtualized operation of) the virtual industrial automation system 226 on the user's communication device 228, and can desire to adjust a control on the industrial automation system 206 to facilitate adjusting or controlling the operation of the industrial automation system 206. The virtual industrial automation system 226 can comprise a virtualized control that can correspond to and/or be interfaced with the control of the industrial automation system 206. The user can input information (e.g., user input, such as gestures (e.g., gestures on a touch screen), keystrokes, mouse clicks, selections, voice commands, etc., of the user) to the user's communication device 228 to facilitate manipulating the virtualized control of the virtualized industrial automation system 226 presented by (e.g., displayed on) the user's communication device 228 to facilitate adjusting the virtualized control, which can facilitate adjusting the corresponding control of the industrial automation system 206. The virtualization component 224 can receive the input information, or corresponding control information (e.g., as generated by the communication device 228 based at least in part on the input information), relating to the user interactions with the virtualized industrial automation system 226 via the communication device 228 of the user and communication network. The input information, or corresponding control information, can facilitate controlling the operation of the industrial automation system 206.

In response to the input information, or corresponding control information, the virtualization component 224 can generate control signals that can be based at least in part on (e.g., that can correspond to) the user interactions with the virtualized industrial automation system 226. The virtualization component 224 can transmit (e.g., in real or near real time) the control signals to the industrial automation system 206 to facilitate controlling (e.g., in real or near real time) operation of (e.g., adjusting the control of) the industrial automation system 206 in response to, and based at least in part on (e.g., in correspondence with), the user interactions with the virtualized industrial automation system 226.

To facilitate desirable (e.g., accurate, efficient, etc.) control of the operation of the industrial automation system 206 using the virtualized industrial automation system 226, the virtualization component 224 can obtain (e.g., automatically, dynamically, or continuously obtain, in real or at least near real time) an updated model 204 of the industrial automation system 206 and/or data relating to the operation of the industrial automation system 206, user interactions with the industrial automation system 206 (e.g., either direct user interactions with the industrial automation system 206, or indirect or virtual user interactions with the industrial automation system 206 via user interactions with the virtual industrial automation system 226), and/or other data. For example, the virtualization component 224 can monitor and track the operational response of the industrial control system 206 in response to the control signals. The collection component 108 can obtain data, which can relate to the operational response of the industrial automation system 206 in response to the control signals, from the industrial automation system 206.

The modeler component 202 can update the model 204 in response to the user interactions with the virtualized industrial automation system 226 and in response to the data relating to the operational response of the industrial automation system 206 based at least in part on the user interactions with the virtualized industrial automation system 226. Additionally or alternatively, the virtualization component 224 can update the virtualized industrial automation system 226 in response to the model 204 being updated, and/or in response to the user interactions with the virtualized industrial automation system 226 and in response to the data relating to the operational response of the industrial automation system 206 based at least in part on the user interactions with the virtualized industrial automation system 226. For instance, the modeler component 202 can update (e.g., automatically, dynamically, or continuously update, in real or at least near real time) the model 204, and/or the virtualization component 224 can update (e.g., automatically, dynamically, or continuously update, in real or at least near real time) the virtualized industrial automation system 226, based at least in part on collected data relating to the operation of the industrial automation system 206, the user interactions with the industrial automation system 206, and/or other data. The modeler component 202 also can update (e.g., automatically or dynamically update, in real or at least near real time) the model 204 based at least in part on any modification to the industrial automation system 206, to generate a modified model that can model or represent any modification made to the industrial automation system 206. Additionally or alternatively, the virtualization component 224 also can update (e.g., automatically or dynamically update, in real or at least near real time) the virtualized industrial automation system 226, based at least in part on any update to the model 204 and/or any modification to the industrial automation system 206, to generate a modified virtualized industrial automation system that can virtualize any modification made to the industrial automation system 206.

As an exemplary scenario, in the industrial automation system 206, a motor short may have caused a fluid spill. The modeler component 202 or virtualization component 224 can detect the motor short and the fluid spill in the industrial automation system 206, and can collect data (e.g., via the collection component 208) relating to the motor short and fluid spill. The modeler component 202 can analyze the data and can update the model 204 to reflect or represent the motor short and fluid spill in the industrial automation system 206, based at least in part on the analysis results. Additionally or alternatively, the virtualization component 224 can analyze the updated model 204 and/or the data, and can update the virtualized industrial automation system 226 to present a graphical representation(s) and/or overlaid data associated with the industrial automation system 206 illustrating and/or relating to the motor short and fluid spill, based at least in part on the analysis results.

The virtualization component 224 can provide (e.g., communicate, present, etc.) the updated virtualized industrial automation system 226, or desired portion thereof, to the communication device 228 of a user. Using the communication device 228, the user can remotely observe and interact with the virtualized industrial automation system 226, which can include a 3-D graphical representation of the motor, associated drive, and the portion of the industrial automation system 206 affected by the spill. The modeler component 202 can continue to update the model 204 in response to, and to reflect (e.g., to incorporate), changes to the industrial automation system 206 as they occur. The virtualization component 224 also can continue to update the virtualized industrial automation system 226 in response to, and to reflect (e.g., to incorporate), changes to the industrial automation system 206 as they occur.

The user can interact with the updated virtualized industrial automation system 226 presented on the communication device 228 to facilitate turning off the motor. For example, the user can make a gesture(s) (e.g., select a button, touch or swipe a control displayed on a touch screen, speak a voice command, type a command, etc.) in relation to the updated virtualized industrial automation system 226 that indicates that the user is turning off the virtualized motor that corresponds to the motor of the industrial automation system 206 to facilitate turning off the motor. The communication device 228 can receive the gesture(s), and can communicate information (e.g., control or command related information) relating to the gesture(s) to the virtualization component 224.

In response to the information received from the communication device 228, the virtualization component 224 can detect that the user has performed a gesture(s) that, given the user's current view of the updated virtualized industrial automation system 226, indicates or corresponds to a command to turn off the motor of the industrial automation system 206. In response, the virtualization component 224 can further update the virtualized industrial automation system 226 to reflect (e.g., to graphically represent or display data illustrating) that the virtualized motor is being turned off. Further, in response, the virtualization component 224 can generate and transmit a command (e.g., via the cloud platform) that can instruct a controller (e.g., of the industrial automation system 206) associated with the motor to transmit a stop or shut off command to the motor to facilitate turning off the motor and stopping or mitigating the spill. In response to the command received from the virtualization component 224, the controller can transmit the stop or shut off command to the motor and the motor can be switched off in response to the stop or shut off command In this way, the immediate effects of the malfunctioning motor can be curtailed before maintenance personnel are sent to the spill site. The modeler component 202 also can update the model 204 to reflect the switching off of the motor in the industrial automation system 206.

As another example, in some implementations, the virtualization component 224 can generate a virtualized view of the inner components, configuration of the inner components, operation of the inner components, faults of the inner components (e.g., when they occur), etc., of the industrial devices 210, industrial processes 212, industrial assets 214, and/or network-related devices of the network component 216, based at least in part on the model 204 and/or the data (e.g., industrial-automation-system-related data), in accordance with the defined virtualization criteria. The virtualization component 224 can provide (e.g., communicate, present) the inner virtualized view of an industrial device 210, an industrial process 212, an industrial asset 214, and/or a network-related device to the communication device 228 of a user, as desired. For example, if there is a problem with an industrial device 210 of the industrial automation system 206 detected, the user, using the communication device 228, can interact with the corresponding virtualized industrial device (e.g., 230) of the virtualized industrial automation system 226 to access the virtualized inner components, configuration, operation, and/or fault, etc., of the virtualized industrial device (e.g., 230). For instance, the user, using the communication device 228, can interact with the virtualized industrial device (e.g., 230) on the display screen of the communication device 228 to remove a virtualized panel of the virtualized industrial device (e.g., 230) to expose (e.g., display, present) the virtualized inner components, configuration, operation, and/or fault, etc., of the virtualized industrial device (e.g., 230) to the user via the communication device 228. In response to user interaction with the communication device 228, the user can navigate the inside of the virtualized industrial device (e.g., 230) to facilitate determining and/or rectifying the problem with the industrial device 210.

In some implementations, the virtualization component 224 can employ or provide virtualization customization and/or data filtering services or applications. Via such virtualization customization and/or data filtering services or applications, the virtualization component 224 can customize a user's view of the virtualized industrial automation system 226 on the user's communication device 228 or filter data associated with the virtualized industrial automation system 226 (and associated industrial automation system 206) presented on the user's communication device 228 to the user based at least in part on the role (e.g., operator, technician, manager, engineer, or other role) of the user in connection with the industrial automation system 206, the identity of the user or the user's communication device 228 or radio-frequency identification (RFID) tag, the authorization or access rights of a user to access the virtualized industrial automation system 226 or the industrial automation system 206, authentication information (e.g., username, password, biometric information (e.g., voice information, fingerprint information, biometric information relating to the user's eye), etc.) presented by the user, the location of the user (e.g., the location of the user's communication device 228 or RFID tag of the user) in relation to the industrial automation system 206 (e.g., the location of the user within (or outside) the facility (e.g., plant) that comprises the industrial automation system 206), context of the data, preferences of a user (e.g., view customization preferences of the user), or other defined virtualization criteria. For example, the virtualization component 224 can customize the user's view of the virtualized industrial automation system 226 on the user's communication device 228 or filter data associated with the virtualized industrial automation system 226 presented on the user's communication device 228 to present, on the user's communication device 228, the portion of the virtualized industrial automation system 226 and the portion of the overlaid data (e.g., industrial-automation-system-related data) desired by (e.g., of interest to) or permitted for viewing by the user. The virtualization component 224 can generate and provide different views of the virtualized industrial automation system 226, which can comprise different data overlays (e.g., role-centric and/or user-preference based data overlays), for presentation on different communication devices 228 of different users, wherein the respective users can view and interact with the virtualized industrial automation system 226 (e.g., virtualized plant) through their respective communication devices 228 to facilitate performing their respective work tasks to respectively remotely control the industrial automation system 206 via the respective customized views of the virtualized industrial automation system 226 presented on their respective communication devices 228.

For example, the virtualization component 224 can analyze data associated with a first user, a second user, and a third user, wherein the data can be data stored in the data store 218, data obtained from the first, second, and third users (e.g., via the users' communication devices 228), and/or data obtained from another data source(s), such as the model 204 or an extrinsic data source(s). The data can specify or indicate the respective roles of the first, second, and third users with respect to the industrial automation system 206. For instance, first data associated with the first user can specify or indicate that the first user is a maintenance engineer, second data associated with the second user can specify or indicate that the second user is a shift supervisor, and third data associated with the third user can specify or indicate that the third user is a network engineer. Based at least in part on the results of the data analysis, the virtualization component 224 can determine that the first user is a maintenance engineer, the second user is a shift supervisor, and the third user is a network engineer.

The virtualization component 224 can generate different customized views of the virtualized industrial automation system 226 and different customized data overlays for each of the first, second, and third users based at least in part on their respective roles with respect to the industrial automation system 206. For instance, the virtualization component 224 (and/or modeler component 202) can determine and generate a first customized view of the virtualized industrial automation system 226 based at least in part on the role of the first user being determined to be a maintenance engineer and/or one or more other customization factors (e.g., location of the first user with respect to the industrial automation system 206, a customization preference(s) of the first user, etc.), in accordance with the defined virtualization criteria. The virtualization component 224 (and/or modeler component 202) also can determine a first subset of operational data that can be relevant to the first user in the first user's role as maintenance engineer, wherein the first subset of operational data can comprise data obtained from the data store 218 (e.g., as collected from the industrial automation system 206) and/or data being obtained from the industrial automation system 206 (e.g., automatically or dynamically, in real or near real time). The virtualization component 224 can overlay the first subset of operational data on the first customized view of the virtualized industrial automation system 226. For example, the virtualization component 224 can overlay the first subset of operational data (e.g., respective status information of respective industrial devices 210, industrial processes 212, and/or industrial assets 214, network-related devices of the network component 216) on or in proximity (e.g., near) to the corresponding virtualized industrial devices 230, virtualized industrial processes 232, virtualized industrial assets 234, and/or virtualized network-related devices of the virtualized network component 236 presented in the first customized view of the virtualized industrial automation system 226.

The virtualization component 224 (and/or modeler component 202) also can determine and generate a second customized view of the virtualized industrial automation system 226 based at least in part on the role of the second user being determined to be a shift supervisor and/or one or more other customization factors (e.g., location of the second user with respect to the industrial automation system 206, a customization preference(s) of the second user, etc.), in accordance with the defined virtualization criteria. The virtualization component 224 (and/or modeler component 202) also can determine a second subset of operational data that can be relevant to the second user in the second user's role as shift supervisor, wherein the second subset of operational data can comprise data obtained from the data store 218 (e.g., as collected from the industrial automation system 206) and/or data being obtained from the industrial automation system 206 (e.g., automatically or dynamically, in real or near real time). The virtualization component 224 can overlay the second subset of operational data on the second customized view of the virtualized industrial automation system 226. For example, the virtualization component 224 can overlay the second subset of operational data (e.g., respective production statistics associated with respective industrial devices 210, industrial processes 212, and/or industrial assets 214) on or in proximity to the corresponding virtualized industrial devices 230, virtualized industrial processes 232, and/or virtualized industrial assets 234 presented in the second customized view of the virtualized industrial automation system 226.

The virtualization component 224 (and/or modeler component 202) further can determine and generate a third customized view of the virtualized industrial automation system 226 based at least in part on the role of the third user being determined to be a network engineer and/or one or more other customization factors (e.g., location of the third user with respect to the industrial automation system 206, a customization preference(s) of the third user, etc.), in accordance with the defined virtualization criteria. The virtualization component 224 (and/or modeler component 202) also can determine a third subset of operational data that can be relevant to the third user in the second user's role as network engineer, wherein the third subset of operational data can comprise data obtained from the data store 218 (e.g., as collected from the industrial automation system 206) and/or data being obtained from the industrial automation system 206 (e.g., automatically or dynamically, in real or near real time). The virtualization component 224 can overlay the third subset of operational data on the third customized view (e.g., IT view) of the virtualized industrial automation system. For example, the virtualization component 224 can overlay the third subset of operational data (e.g., respective data usage information associated with respective network-related devices of the network component 216) on or in proximity to the corresponding virtualized network-related devices of the virtualized network component 236 presented in the third customized view of the virtualized industrial automation system 226.

The virtualization component 224 also can facilitate enabling a user, via the user's communication device 228, to apply a desired filter(s) to filter data associated with the user's view (e.g., customized view) of the virtualized industrial automation system 226, for example, to present a subset of the data that is relevant to a work task that the user is performing at the time, present more detailed data and/or a drilled-down view regarding a certain portion of the virtualized industrial automation system 226 and associated industrial automation system 206, or for other reasons, as desired by the user. The virtualization component 224 can provide a number of different types of filters to the communication devices 228 of users to enable the users to customize, augment, and/or filter data overlays for a user's personalized view of the virtualized industrial automation system. For example, the respective filters can be employed to facilitate filtering data to present a data overlay that can provide a summary or high-level abstract data regarding a particular portion of the industrial automation system 206; filtering data to present a data overlay relating to a particular industrial device 210, industrial process 212, industrial asset 214, or network-related device of the network component 216; filtering data to present a data overlay comprising more detailed information (e.g., drilled-down information) relating to a particular industrial device 210, industrial process 212, industrial asset 214, or network-related device than is presented with a current data overlay; filtering data for a data overlay based at least in part on type of data; filtering data for a data overlay based at least in part on a role of a user; filtering data based at least in part on a location of the user; filtering data based at least in part on a time associated with the data; filtering data based at least in part on a work shift (e.g., work-shift time period) associated with the data; and/or filtering data for a data overlay using another desired type of filter.

As an example of data filtering, the virtualization component 224 can generate, and provide to the communication device 228 of a user, such as a network engineer, a customized view (e.g., an IT view) of the virtualized industrial automation system 226 associated with the industrial automation system 206 and a data overlay associated with the customized view, based at least in part on the role (e.g., network engineer) of the user and/or preferences of the user, in accordance with the defined virtualization criteria. For instance, the data overlay for the customized view of the virtualized industrial automation system 226 can comprise bandwidth usage information that can be displayed over all or a desired portion of the virtualized network-related devices of the virtualized network component 236 presented in the customized view of the virtualized industrial automation system 226, wherein the virtualized network-related devices can correspond to respective network-related devices of the network component 216 of the industrial automation system 206. In this example, as part of the original data overlay (e.g., original customized data overlay), the display screen of the user's communication device 228 can display an alarm (e.g., a graphical representation of an alarm) on or in proximity to a particular virtualized network-related device, wherein the alarm can indicate (e.g., can be known to indicate or can display data indicating) that bandwidth usage is reaching a slowdown level. If desired, the user (e.g., network engineer) can use the communication device 228 to select a filter (e.g., data filter) that can be placed on or used in connection with the user's customized view of the virtualized industrial automation system 226. The virtualization component 224 can receive information relating to the selection of the filter from the communication device 228. In response, the virtualization component 224 can modify (e.g., augment) the customized view of the virtualized industrial automation system 226 (e.g., modify or augment the data overlay of the customized view of the virtualized industrial automation system 226) to overlay more detailed information relating to the respective bandwidth usage associated with respective network-related devices on or in proximity to respective virtualized network-related devices. For example, while the original data overlay presented an alarm indicator, on or in proximity to a particular network-related device, that indicates bandwidth usage is reaching a slowdown level, the augmented data overlay can present respective data overlay portions on or in proximity to the respective network-related devices presented on the display screen of the communication device 228, wherein the respective data overlay portions can comprise respective data that can indicate, e.g., which network-related devices are utilizing any of the bandwidth and how much bandwidth each of these network-related devices is using.

Data overlays also can be based at least in part on a current context (e.g., the user's location in relation to the industrial automation system 206; a current operating condition associated with an industrial device 210, an industrial process 212, an industrial asset 214, or a network-related device of the network component 216; etc.). As a location-based example, the virtualization component 224 can update, augment, filter, or customize the view (e.g., customized view), and/or data overlay, of the virtualized industrial automation system 224 presented on the communication device 228 of a user based at least in part on the location of the user (e.g., the location of the user's communication device 228 or RFID tag of the user) with respect to the industrial automation system 206. For example, if the user is located in a first location in relation to the industrial automation system 206, the virtualization component 224 can customize, augment, or filter a user's view of, and/or the data overlay associated with, the virtualized industrial automation system 226 as presented on the user's communication device 228 so that the user can view a first view of, and/or a first data overlay associated with, the virtualized industrial automation system 226 (e.g., presenting a first portion of the virtualized industrial automation system 226) that can correspond to the first location (e.g., wherein the first view can comprise an area of the industrial automation system 206 within a defined distance of the first location), in accordance with the access rights to the user, based at least in part on the defined virtualization criteria. If the user is located in a second location in relation to the industrial automation system 206 (or moves from the first location to the second location), the virtualization component 224 can update, augment, filter, or customize the user's view of the virtualized industrial automation system 226 as presented on the user's communication device 228 so that the user can view the second view of, and/or a second data overlay associated with, the virtualized industrial automation system 226 (e.g., presenting a second portion of the virtualized industrial automation system 226) that can correspond to the second location (e.g., wherein the second view can comprise an area of the industrial automation system 206 within a defined distance of the second location), in accordance with the access rights to the user, based at least in part on the defined virtualization criteria.

The virtualization component 224 also can share a customized view (e.g., personalized view) of, and/or customized data overlay associated with, a virtualized industrial automation system 226 displayed on the communication device 228 of a user with a communication device(s) 120 of another user(s), in accordance with the defined virtualization criteria (e.g., when another user is authorized to access such customized view or customized data overlay on that other user's communication device, and/or based in part on the role of that other user in connection with the industrial automation system 206, etc.). For example, a first user (e.g., first operator) can desire to share the first user's first customized view of, and/or first customized data overlay associated with, the virtualized industrial automation system 226 with a second user (e.g., second operator, shift supervisor, maintenance engineer, etc.) via the second user's communication device 228. Alternatively, the second user can desire to view the first user's first customized view of, and/or first customized data overlay associated with, the virtualized industrial automation system 226. The first user, using the first user's communication device 228, can select a share control, or alternatively, the second user, using the second user's communication device 228, can select a share control (e.g., share request control), and information relating to selection of the share control can be sent from the communication device 228 to the virtualization component 224.

In response, if the applicable virtualization criteria have been satisfied (e.g., when it is determined that the second user is authorized to view the first user's first customized view of, and/or first customized data overlay associated with, the virtualized industrial automation system 226), the virtualization component 224 can facilitate communicating the first user's first customized view of, and/or first customized data overlay associated with, the virtualized industrial automation system 226 to the second user's communication device 228 for presentation to the second user. In some implementations, the first user's communication device 228 can directly communicate the first user's first customized view of, and/or first customized data overlay associated with, the virtualized industrial automation system 226 to the second user's communication device 228 without the virtualization component 224 having to be involved in the sharing process or the virtualization component 224 can manage the authorization process to facilitate determining whether such sharing is permitted, while allowing the first user's communication device 228 to manage the communication of the first customized view and first data overlay to the second user's communication device 228, if such sharing is authorized by the virtualization component 224.

In some implementations, in addition to or as an alternative to sharing a first user's customized view of, and/or customized data overlay associated with, the virtualized industrial automation system 226 with another user, the virtualization component 224 can facilitate enabling the first user, using the first user's communication device 228, to share, with another user, a filter, a set of filters, or filter settings, that the first user applied to facilitate generating the first user's customized view of, and/or customized data overlay associated with, the virtualized industrial automation system 226. The other user, via interacting with that other user's communication device 228, can apply the filter, the set of filters, or the filter settings obtained from the first user to the data overlay and/or the virtualized industrial automation system 226 to facilitate generating the first user's customized view of, and/or customized data overlay associated with, the virtualized industrial automation system 226. In response, the virtualization component 224 can facilitate generating and providing the first user's customized view of, and/or customized data overlay associated with, the virtualized industrial automation system 226 to the communication device 228 of the other user for presentation to the user.

The system 200 also can facilitate enabling users to interact with the virtualized industrial automation system 226 (e.g., to interact with the augmented reality representation of the system) to add desired information associated with and/or displayed with the virtualized industrial automation system 226 to facilitate sharing user-generated information relating to the industrial automation system 206 or other user-generated information with other users who can view the virtualized industrial automation system 226 via communication devices 228. For instance, the virtualization component 224 (e.g., via provision of a virtual note generation service or application) can facilitate enabling a user to use the communication device 228 to generate a virtual note, that can comprise desired information (e.g., information relating to a portion (e.g., an industrial device 210, an industrial process 212, an industrial asset 214, or a network-related device of the network component 216, etc.) of the industrial automation system 206 represented by the virtualized portion (e.g., a virtualized industrial device 230, virtualized industrial process 232, virtualized industrial asset 234, or virtualized network-related device of the virtualized network component 236, etc.) of the virtualized industrial automation system 226. A virtual note can be employed, for example, to tag a problem or abnormal operating condition associated with the portion of the industrial automation system 206, for use as a shift report (e.g., from a user on one work shift to another user on the next work shift to facilitate providing desired information to the other user on the next shift), to remind the user (or another user(s)) of something in connection with that portion of the industrial automation system 206, to notify another user(s) that some work task (e.g., maintenance, repair, or replacement task, etc.) is to be performed in connection with that portion of the industrial automation system 206 (e.g., provide a "breadcrumb" trail for maintenance personnel, e.g., by using a virtual note(s) to flag which machine requires repair, replacement, or installation of replacement part), to facilitate remote monitoring or support for an industrial automation system 206 (e.g., by the entity operating the industrial automation system 206 or by a $3^{rd}$-party entity providing such remote monitoring or support), or for another desired reason.

The virtualization component 224 can facilitate enabling the user to use the communication device 228 to apply the virtual note to (e.g., attach, link, associate, place, etc., the virtual note to, with, or on) the virtualized portion of the virtualized industrial automation system 226. For instance, the user, using the communication device 228, can interact (e.g., via user gestures (e.g., on a touch screen), selections, keystrokes, mouse movements or commands, etc.) with the virtual note and/or the virtualized portion of the virtualized industrial automation system 226, wherein the interaction can indicate that the user is attempting to apply the virtual note on or in proximity to the virtualized portion of the virtualized industrial automation system 226. For example, the user can interact with the virtual note via the communication device 228 to drag-and-drop the virtual note on or in proximity to the virtualized portion of the virtualized industrial automation system 226. The virtualization component 224 can receive information relating to the user's interactions with the virtual note and/or the virtualized portion of the virtualized industrial automation system 226 from the communication device 228. In response, the virtualization component 224 can facilitate applying the virtual note on or in proximity to the virtualized portion of the virtualized industrial automation system 226.

In some implementations, the modeler component 202 can access the virtual note. The model management component 220 can analyze the information (e.g., industrial-automation-system-related data) contained in the virtual note and can accordingly update the model 204 based at least in part on the information contained in the virtual note. The updated model 204 can be stored in the data store 218 and/or can be provided to the virtualization component 224, wherein the virtualization component 224 can accordingly update the virtualized industrial automation system 226 (as appropriate) based at least in part on the updated model 204.

The virtualization component 224 further can facilitate enabling a user, using the communication device 228, to control the scope of the virtual note to control the viewability of the virtual note on or associated with (e.g., in proximity to) the virtualized portion of the virtualized industrial automation system 226 by another user(s), e.g., on the communication device(s) 228 of the other user(s), in accordance with the defined virtualization criteria (e.g., when the other user is authorized to access or view the virtual note on that other user's communication device 228, and/or based in part on the role of that other user in connection with the industrial automation system 206, etc.). For instance, the user, using the communication device 228, can select a scope control associated with the virtual note, and can input information that can indicate the viewability scope of the virtual note to facilitate controlling which users can view the virtual note. Alternatively or additionally, the virtualization component 224 can set the viewability scope or specify a minimum or maximum viewability scope for the virtual note, in accordance with the defined virtualization criteria.

The scope for a virtual note can range, for example, from allowing anyone (e.g., regardless of role) to view the virtual note on the virtualized portion of the virtualized industrial automation system 226, to allowing only users (e.g., regardless of role) who are logged in and authenticated with the virtualization component 224 to view the virtual note on the virtualized portion of the virtualized industrial automation system 226, to allowing only users who provide authentication credentials that indicate they satisfy defined security criteria to view the virtual note on the virtualized portion of the virtualized industrial automation system 226, to allowing only users who have a particular role(s) to view the virtual note on the virtualized portion of the virtualized industrial automation system 226, to allowing only a certain user(s) specified by the user who created the virtual note to view the virtual note on the virtualized portion of the virtualized industrial automation system 226, to virtually any other desired viewability scope, in accordance with the defined virtualization criteria.

As an example of using a virtual note, a user, using the user's communication device 228, can interact with the user's personalized view of the virtualized industrial automation system 226 (e.g., the virtualized plant) to generate a virtual note and place the virtual note (e.g., a virtualized post-it note) on or near one of the virtual machine representations (e.g., on or near a virtualized industrial device 230) of the virtualized industrial automation system 226. The virtual note can comprise information from the user (e.g., a maintenance engineer) that can warn other users of an abnormal operating condition observed for a particular industrial device 210 associated with the virtualized industrial device 230. The user, using the communication device 228, also can interact with the scope control to set the viewability scope of the virtual note to facilitate controlling who is able to view the virtual note in connection with the virtualized industrial automation system 226. For instance, the user may desire that any user, who performs work tasks (e.g., as an operator, supervisor, engineer, etc.) in connection with any portion of the industrial automation system 206 that can be affected by the abnormal operating condition for the particular industrial device 210, should be able to view the virtual note. The user, using the communication device 228, can interact with the scope control and/or enter information that can indicate that such users are permitted to view the virtual note in connection with viewing the virtualized industrial automation system 226 (e.g., viewing the virtualized industrial device 230). The virtualization component 224 can receive information relating to the interaction with the scope control and/or associated information, and, in response, the virtualization component 224 can set and enforce the viewability scope to allow such users to view the virtual note via their communication devices 228 and to not allow other users to view the virtual note via their communication devices 228.

By enabling users to generate and share user-generated information relating to the industrial automation system 206, the virtualization component 224 can facilitate further augmenting the data-driven plant virtualizations (e.g., virtualized industrial automation system) to present users with user-provided data to facilitate the sharing of knowledge or observations relating to the industrial automation system 206 with other users. This can enable users to work more efficiently and the industrial automation system 206 to operate more efficiently.

In some implementations, the virtualization component 224 can facilitate securing or controlling access to the virtualized industrial automation system 226 and the industrial automation system 206, in accordance with the defined virtualization criteria, to facilitate mitigating security risks associated with presenting the virtualized industrial automation system 226 to communication devices of users and/or the execution of control commands via the system 200 (e.g., the cloud-based system). The virtualization component 224 can control access to the virtualized industrial automation system 226 and the industrial automation system 206 (e.g., via the virtualized industrial automation system 226), control access to a particular customized view or customized data overlay associated with the virtualized industrial automation system 226, and/or control access to user-generated information (e.g., contained in a virtual note), based at least in part on identity of a user, authentication information (e.g., username, password, passphrase, personal identification number (PIN), biometric information, or other unique identification information) associated with of a user, location of the user (or location of the user's communication device 228 or RFID tag) in relation to the industrial automation system 206, a viewability scope setting, preferences of a user, or other defined virtualization criteria.

For example, if a user attempts to use the user's communication device 228 to access the virtualized industrial automation system 226 to facilitate controlling the associated industrial automation system 206, the virtualization component 224 can request that the user provide valid authentication information to the virtualization component 224 that indicates the user is authorized to gain such access to the virtualized industrial automation system 226 and/or authorized to perform an action (e.g., adjust a virtualized control or switch) with respect to the virtualized industrial automation system 226 or industrial automation system 206. In some implementations, the virtualization component 224 can grant respective types of access rights to the virtualized industrial automation system 226 and the industrial automation system 206 (e.g., via the virtualized industrial automation system 226) to respective users based at least in part on respective access permissions of the respective users and respective authentication information of the respective users, wherein the respective access permissions or rights can be associated with (e.g., mapped or linked to) the respective authentication information of the respective users. The access permissions or rights to the virtualized industrial automation system 226 and the industrial automation system 206 (e.g., via the virtualized industrial automation system 226) can relate to the portion(s) of the virtualized industrial automation system 226 that can be accessed by a user, the commands that can be issued by the user or the portion(s) of the virtualized industrial automation system 226 (and corresponding portion(s) of the industrial automation system 206) that can be controlled by a user, etc. The virtualization component 224 can grant, to respective users, respective (e.g., different) access permissions or rights the virtualized industrial automation system 226 and the industrial automation system 206 (e.g., via the virtualized industrial automation system 226) based at least in part on the respective roles of the respective users in connection with the industrial automation system 206 or associated industrial enterprise, a location of a user in relation to the industrial automation system 206, or other defined virtualization criteria.

If a user does not provide acceptable (e.g., valid) authentication information, or is not within a defined distance of a portion (e.g., an industrial device 210, industrial process 212, industrial asset 214, network-related device of the network component 216, etc.) of the industrial automation system 206 that the user is attempting to control via a command, the virtualization component 224 can deny the user access to the virtualized industrial automation system 226 and the industrial automation system 206 (e.g., via the virtualized industrial automation system 226) or can limit the access rights of the user to the virtualized industrial automation system 226 and the industrial automation system 206 (e.g., via the virtualized industrial automation system 226) to allow the user to only issue a certain limited subset of commands to facilitate controlling the virtualized industrial automation system 226 and the industrial automation system 206 (e.g., via the virtualized industrial automation system 226).

In some implementations, the virtualization component 224 can employ different levels of authentication to a user to facilitate determining access permissions or rights that are to be granted to the user to allow access to the virtualized industrial automation system 226 and the industrial automation system 206 (e.g., via the virtualized industrial automation system 226) based at least in part on the location (e.g., detected location) of the user (or the user's communication device 228 or identification tag (e.g., RFID tag)) in relation to the industrial automation system 206, in accordance with the defined virtualization criteria. For instance, if the user (or the user's communication device 228 or identification tag) is within a defined distance of the portion of the industrial automation system 206 that the user is attempting to control via the virtualized industrial automation system 226 presented by the communication device 228 (e.g., within the facility that contains the portion of the industrial automation system 206), the virtualization component 224 can control access to the portion of the industrial automation system 206 via the virtualized industrial automation system 226 presented by the communication device 228 based at least in part on a first level of authentication (and a corresponding first type of authentication information (e.g., authentication credentials)) that can be lower (e.g., less stringent) than a second level of authentication (and a corresponding second type (e.g., higher or more strict type) of authentication information) associated with a second location of the user (or the user's communication device 228 or identification tag) that is not within a defined distance of the portion of the industrial automation system 206 that the user is attempting to control via the virtualized industrial automation system 226 presented by the communication device 228. If the user (or the user's communication device 228 or identification tag) is in the second location (or is not detected as being located within the defined distance of the portion of the industrial automation system 206), the virtualization component 224 can control access to the portion of the industrial automation system 206 via the virtualized industrial automation system 226 presented by the communication device 228 based at least in part on the second level of authentication (and a corresponding second type of authentication information).

The virtualization component 224 can control access to the portion of the industrial automation system 206 to grant a first (e.g., lower) level of access rights to the user in response to receiving the first type of authentication information, and can grant a second (e.g., higher) level of access rights to the user in response to receiving the second type of authentication information, wherein the second level access rights can allow the user to use the communication device 228 to have more access to the virtualized industrial automation system and the industrial automation system 206 (e.g., via the virtualized industrial automation system 226) or more rights to issue commands in connection with the virtualized industrial automation system 226 and the industrial automation system 206 (e.g., via the virtualized industrial automation system 226) than the first level of access rights associated with the first type of authentication information. As an example, the first type of authentication information can comprise detection (e.g., by the virtualization component 224) of a device identifier of the communication device 228 or RFID tag of the user within the defined distance of the portion of the industrial automation system 206 that the user is attempting to control via the virtualized industrial automation system 226 presented by the communication device 228, and the second type of authentication information can comprise a valid username, password, and/or biometric information associated with the user when the user (or the user's communication device 228 or identification tag) is located in the second location (or is not detected as being located within the defined distance of the portion of the industrial automation system 206), e.g., as detected by the virtualization component 224. It is to be appreciated and understood that, in accordance with various other implementations, additionally or alternatively, the virtualization component 224 can implement and enforce various other authentication policies in connection with controlling access to the virtualized industrial automation system 226 and the industrial automation system 206 (e.g., via the virtualized industrial automation system 226) by users, in accordance with the defined virtualization criteria. For example, the virtualization component 224 can implement and enforce various different authentication policies based at least in part on the role of the user with respect to the industrial automation system 206, the type of action or task the user is attempting to perform on the virtualized industrial automation system 226 and the industrial automation system 206 (e.g., via the virtualized industrial automation system 226), identification of the communication device 228 (e.g., based at least in part on the device identifier associated with the device (e.g., mobile subscriber integrated services digital network-number (MSISDN), media access control (MAC) address, etc.)) associated with the user, and/or another authentication policy or criterion, in accordance with the defined virtualization criteria.

In some implementations, to facilitate desirable (e.g., favorable, beneficial, efficient, etc.) performance of the industrial automation system 206, the virtualization component 224 or modeler component 202 (e.g., employing or comprising a simulation component) can facilitate generating simulation models of the industrial automation system 206 for a number of desired purposes. For example, prior to adjusting a virtualized control or virtualized switch associated with a virtualized industrial device 230 of the virtualized industrial automation system 226 in connection with a corresponding industrial device 210 of the industrial automation system 206, the simulation component (e.g., in response to a request from a user via a communication device 228) can simulate operation of the industrial automation system 206 in response to the adjusting of the virtualized control or the virtualized switch associated with the virtualized industrial device 230 of the virtualized industrial automation system 226, based at least in part on the simulation model of the industrial automation system 206 (e.g., generated by the modeler component 202), to facilitate determining whether the industrial automation system 206 will operate desirably (e.g., adequately, properly, optimally, etc.) in response to the adjusting of the virtualized control or the virtualized switch associated with the virtualized industrial device 230 of the virtualized industrial automation system 226. Based at least in part on a result of the simulated operation of the industrial automation system 206, the virtualization component 224 or the user can determine whether to adjust the virtualized control or the virtualized switch associated with the virtualized industrial device 230 of the virtualized industrial automation system 226 to remotely control the operation of the industrial automation system 206, in accordance with the set of defined operation criteria (which can be part of the set of defined virtualization criteria).

To facilitate generating a simulation model of the industrial automation system 206, the simulation component can analyze the set of data relating to the industrial automation system 206 and/or the other industrial automation system to facilitate simulating or emulating the industrial automation system 206 and its constituent industrial devices 210, industrial processes 212, other industrial assets 214, and/or network-related devices of the network component 216. Based at least in part on the results of the analysis of the set of data, the simulation component can simulate or emulate (e.g., determine and/or generate a simulation or an emulation for) the industrial automation system 206, including determining respectively simulating or emulating the respective industrial devices 210, industrial processes 212, other industrial assets 214, and network-related devices of the network component 216, simulating or emulating the interrelationships (e.g., system configuration, connections, etc.) between the respective industrial devices 210, industrial processes 212, other industrial assets 214, and network-related devices of the network component 216, and/or simulating or emulating the properties, characteristics, functions, etc., of the respective devices, processes, and/or assets of the industrial automation system 206, etc.

The simulation component can generate a simulation model of the industrial automation system 206 based at least in part on the simulation or emulation of the industrial automation system 206, including the respective simulations or emulations of the respective industrial devices 210, industrial processes 212, other industrial assets 214, and network-related devices of the network component 216, simulations or emulations of the interrelationships (e.g., system configuration, connections, etc.) between the respective industrial devices 210, industrial processes 212, other industrial assets 214, and network-related devices of the network component 216, etc.

When a set of operation data is applied to the simulation model (e.g., model 204 employed and/or modified for use in a simulation), a response or behavior of the simulation model can be generated. The modeler component 202 or virtualization component 224 can utilize the response or behavior produced by the simulation model in response to the application of the set of operation data to the simulation model to facilitate determining or predicting how the industrial automation system 206 will respond (or is expected to respond) when the set of operation data is applied to the industrial automation system 206, and to facilitate determining whether an action (e.g., modification of the industrial automation system 206, adjusting a virtualized control or switch associated with the virtualized industrial automation system 226 or corresponding control or switch associated with the industrial automation system 206, etc.) is to be performed in connection with the virtualized industrial automation system 226 or the industrial automation system 206. The modeler component 202 or virtualization component 224 can store the simulation model of the industrial automation system 206, and/or response information relating to determined or predicted responses based on the simulation model, in the data store 218.

It is to be appreciated and understood that, while the modeler component 202 and/or virtualization component 224 can generate graphical representations and/or virtualizations of the various industrial devices 210, industrial processes 212, industrial assets 214, network-related devices of the network component 216, etc., or one or more respective instances (e.g., virtualized instances) of the various industrial devices 210, industrial processes 212, industrial assets 214, network-related devices, etc., (as represented in the various virtualized industrial devices 230, virtualized industrial processes 232, virtualized industrial assets 234, virtualized network-related devices of the virtualized network component 236) the disclosed subject matter is not so limited. In some implementations, another modeler component and/or another virtualization component, for example, associated with a third-party vendor, can generate all or some of the models, graphical representations, and/or virtualizations of the various industrial devices 210, industrial processes 212, industrial assets 214, network-related devices of the network component 216, etc., or one or more respective instances (e.g., virtualized instances) of the various industrial devices 210, industrial processes 212, industrial assets 214, network-related devices, etc. The modeler component 202 and/or virtualization component 224 can receive information relating to the models, graphical representations, and/or virtualizations of the various industrial devices 210, industrial processes 212, industrial assets 214, network-related devices, etc., or one or more respective instances (e.g., virtualized instances) of the various industrial devices 210, industrial processes 212, industrial assets 214, network-related devices, etc., generated by the other modeler component or other virtualization component. Regardless of the source of the models, graphical representations, or virtualizations associated with the industrial automation system 204, the modeler component 202 (e.g., via the model management component 220) and/or virtualization component 224 can facilitate managing the models, graphical representations, and/or virtualizations of the various industrial devices 210, industrial processes 212, industrial assets 214, network-related devices, etc., or one or more respective instances (e.g., virtualized instances) of the various industrial devices 210, industrial processes 212, industrial assets 214, network-related devices, etc., and can facilitate managing (e.g., controlling) the various industrial devices 210, industrial processes 212, industrial assets 214, network-related devices, etc., of the industrial automation system 206.

Figure 3:
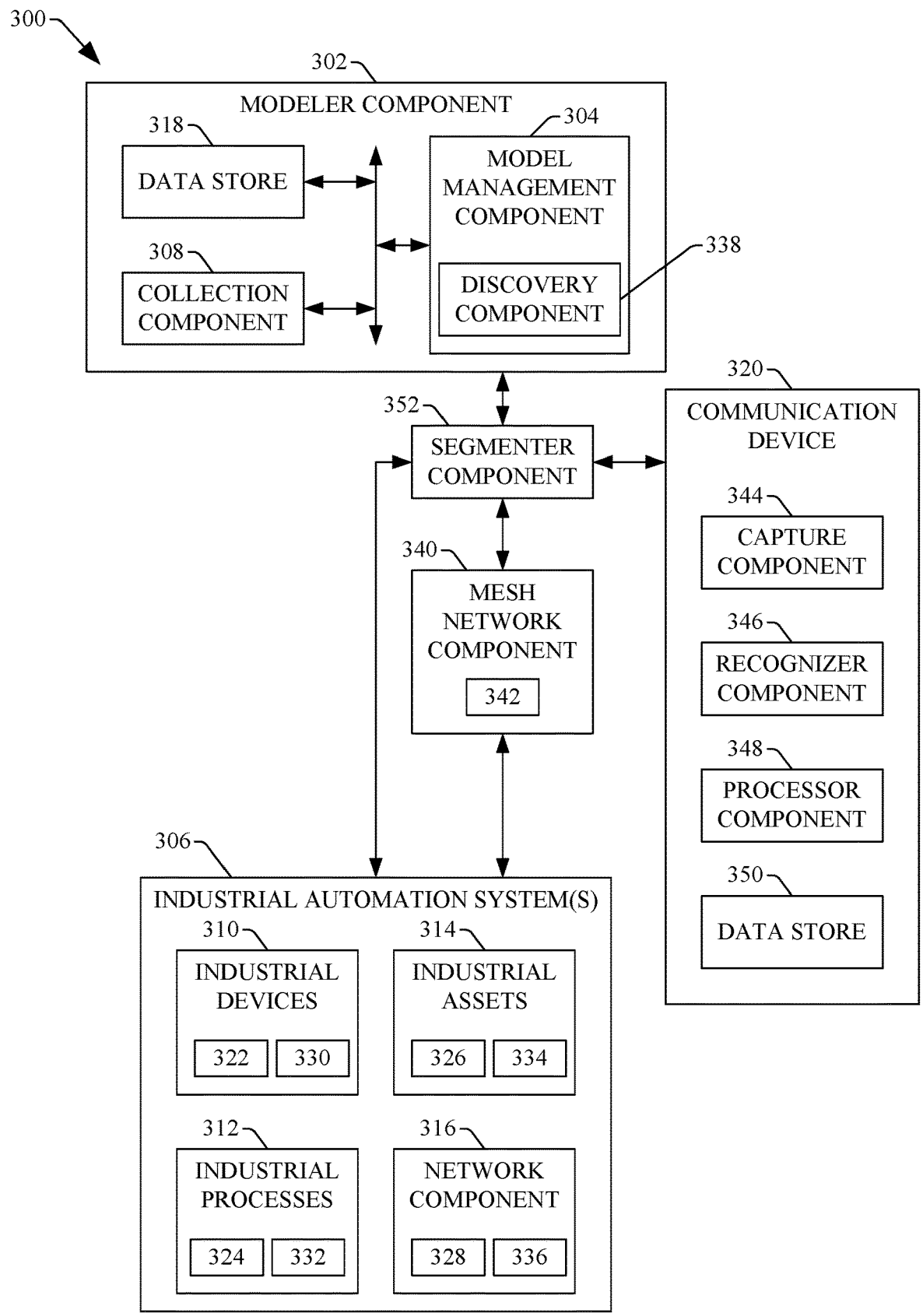
FIG. 3 illustrates a block diagram of an example system that can facilitate performing an inventory of assets of an industrial automation system to facilitate modeling and virtualization of the industrial automation system, in accordance with various aspects and embodiments of the disclosed subject matter.

FIG. 3 illustrates a block diagram of an example system 300 that can facilitate performing an inventory of assets of an industrial automation system to facilitate modeling and virtualization of the industrial automation system, in accordance with various aspects and embodiments of the disclosed subject matter. The system 300 can comprise a modeler component 302, a model management component 304, an industrial automation system 306, a collection component 308, industrial devices 310, industrial processes 312, other industrial assets 314, a network component 316, a data store 318, and a communication device 320.

In some implementations, some or all of the industrial devices 310, industrial processes 312, other assets 314 and network-related devices of the network component 316 of an industrial automation system(s) 306 can comprise respective information provider components, such as information provider components 322, 324, 326, and 328, wherein the respective information provider components 322, 324, 326, and 328 can comprise and provide (e.g., communicate, present) respective information regarding the respective industrial devices 310, industrial processes 312, other assets 314 and network-related devices of the network component 316 of the industrial automation system(s) 306 to the modeler component 302, for example, via respective cloud gateway components or via the communication device 320. Some or all of the industrial devices 310, industrial processes 312, other assets 314 and network-related devices of the network component 316 can comprise respective cloud gateway components, such as cloud gateway components 330, 332, 334, and 336. The respective cloud gateway components 330, 332, 334, and 336 can facilitate communication of information between the cloud platform, including the modeler component 302 (and/or virtualization component) in the cloud platform, and the respective industrial devices 310, industrial processes 312, other assets 314 and network-related devices of the network component 316 of the industrial automation system 306.

The respective information provider components 322, 324, 326, and 328 can be equipped with or associated with components, tools, functions, etc., that can allow the model management component 304 to inventory the respective industrial devices 310, industrial processes 312, other assets 314 and network-related devices of the network component 316 to obtain information regarding the respective industrial devices 310, industrial processes 312, other assets 314 and network-related devices of the network component 316 from them. The model management component 304 can utilize such information to facilitate generating a model of the industrial automation system(s) 306 based at least in part on such inventory of the respective industrial devices 310, industrial processes 312, other assets 314 and network-related devices of the network component 316.

The model management component 304 can comprise a discovery component 338 that can poll (e.g., transmit queries, request information from) the respective industrial devices 310, industrial processes 312, other industrial assets 314, and/or network-related devices of the network component 316 via the respective cloud gateway components 330, 332, 334, 336 to facilitate obtaining the information regarding the respective industrial devices 310, industrial processes 312, other industrial assets 314, and/or network-related devices of the network component 316 from the respective information provider components 322, 324, 326, and 328. In accordance with various implementations, the respective cloud gateway components 330, 332, 334, 336 can be associated with (e.g., communicatively connected to) and/or integrated with the respective industrial devices 310, industrial processes 312, other industrial assets 314, and/or network-related devices of the network component 316, wherein the respective cloud gateway components 330, 332, 334, 336 can enable the respective information provider components 322, 324, 326, and 328 to communicate with the modeler component 302 in the cloud to facilitate the discovery component 338 detecting, discovering, obtaining information from, the respective industrial devices 310, industrial processes 312, other industrial assets 314, and/or network-related devices of the network component 316 of the industrial automation system(s) 306.

With regard to the respective industrial devices 310, industrial processes 312, other industrial assets 314, and/or network-related devices of the network component 316, the information can comprise, for example, respective pre-deployed models of the respective industrial devices 310, industrial processes 312, other industrial assets 314, and/or network-related devices of the network component 316, respective identification information (e.g., respective identifiers) that can respectively identify the respective industrial devices 310, industrial processes 312, other industrial assets 314, and/or network-related devices of the network component 316, respective configuration information that can respectively identify a configuration of the respective industrial devices 310, industrial processes 312, other industrial assets 314, and/or network-related devices of the network component 316, respective contextual information relating to respective industrial assets (e.g., 310, 312, 314) or network-related devices, information relating functional or geographical relationships between respective industrial assets (e.g., 310, 312, 314) or between an industrial asset (e.g., 310, 312, or 314) and a network-related device of the network component 316, information relating to a layout (e.g., functional layout, logic layout, geographical layout) of the industrial automation system 306, communication network connections, or other information.

In some implementations, the discovery component 338 can employ one or more detection or discovery techniques, tools, functions, etc., to facilitate detecting, discovering, and/or identifying industrial devices 310, industrial processes 312, other industrial assets 314, and/or network-related devices of the network component 316 (e.g., newly added industrial devices 310, industrial processes 312, other industrial assets 314, and/or network-related devices) of the industrial automation system 306. For example, the discovery component 338, and/or the respective information provider components 322, 324, 326, and 328, can use WHO techniques combined with ping techniques to facilitate detecting, discovering, and/or identifying industrial devices 310, industrial processes 312, other industrial assets 314, and/or network-related devices of the network component 316 of the industrial automation system 306.

In still other implementations, the system 300 can comprise a mesh network component 340 that can be associated with the modeler component 302 in the cloud platform via a cloud gateway component 342 associated with (e.g., integrated with (as depicted), communicatively connected to) the mesh network component 340. The mesh network component 340 can be or can comprise a wireless mesh network appliance, for example. The mesh network component 340 can obtain and gather respective information relating to the respective industrial devices 310, industrial processes 312, other industrial assets 314, and/or network-related devices of the network component 316 of the industrial automation system 306, for example, via the respective information provider components 322, 324, 326, and 328, or via the communication device 320. The mesh network component 340 can provide (e.g., communicate) such information to the modeler component 302 in the cloud via the cloud gateway component 342.

In some implementations, an industrial automation system 306 can contain legacy industrial assets (e.g., legacy industrial devices or other legacy industrial assets) or legacy network-related devices that do not comprise or are not directly associated with a cloud gateway component. The communication device 320 (e.g., a laptop computer, a mobile phone, an electronic tablet, electronic eyeglasses, or other type of communication device) can be employed to facilitate inventorying (e.g., locally inventorying) and collecting information relating to such legacy industrial assets or legacy network-related devices.

The communication device 320 can comprise a capture component 344 that can comprise a camera that can be used to take one or more pictures, or video, of legacy industrial assets, legacy network-related devices, other industrial assets or network-related devices in proximity to the legacy industrial assets or legacy network-related devices, and/or an area of the plant in proximity to a legacy industrial asset or legacy network-related device. For example, the capture component 344 can take a picture or video of a nameplate or other identifier information on a legacy industrial asset or legacy network-related device to facilitate identifying the legacy industrial asset or legacy network-related device. The capture component 344 also can take a picture or video of a relationship (e.g., functional relationship (e.g., connection(s)), geographical relationship), for example, between a first industrial asset and another industrial asset(s).

In some implementations, the communication device 320 can comprise a recognizer component 346 that can analyze a photograph or video of one or more industrial assets and/or network-related devices, and can recognize (e.g. using pattern or OCR recognition) or identify a legacy industrial asset or legacy network-related device, a relationship between industrial assets, and/or a relationship between an industrial asset and a network-related device, based at least in part on information obtained via the photograph or video. In other implementations, the recognizer component can reside in the cloud (e.g., in the modeler component 302), wherein the photograph or video can be received by the recognizer component in the cloud and analyzed by the recognizer component to facilitate recognizing or identifying a legacy industrial asset or legacy network-related device, a relationship between industrial assets, and/or a relationship between an industrial asset and a network-related device. Information relating to legacy industrial assets or legacy network-related devices also can be input to the communication device 320 by a user via a keyboard, keypad, or audio interface (e.g., a microphone) and communicated to the discovery component 338 or collection component 308 by the communication device 320.

The communication device 320 also can comprise a processor component 348 that can operate in conjunction with the other components (e.g., capture component 344) to facilitate performing the various functions and operations of the communication device 320. The processor component 348 can employ one or more processors (e.g., central processing units (CPUs), graphical processing units (GPUs), field-programmable gate arrays (FPGAs), etc.), microprocessors, or controllers that can process data, such as industrial-automation-system-related data (e.g., device data, process data, asset data, system data, etc.) associated with industrial automation systems, customer or client related data, data relating to parameters associated with an industrial automation system, etc., to facilitate communicating respective information relating to respective industrial assets or network-related devices to the modeler component 302 or other component (e.g., in the cloud platform), or performing other discovery or identification related operations; and can control data flow between the communication device 320 and other components associated with the communication device 320.

In yet another aspect, the communication device 320 can contain a data store 350 that can store data structures (e.g., user data, metadata); code structure(s) (e.g., modules, objects, classes, procedures), commands, or instructions; industrial-automation-system-related data (e.g., including pictures or video) or other data associated with industrial automation systems or industrial enterprises; customer or client related information; parameter data; algorithms (e.g., algorithm(s) relating to recognizing or identifying respective industrial devices, industrial processes, industrial assets, network-related devices, interrelationships between such devices, processes, or assets); and so on. In an aspect, the processor component 348 can be functionally coupled (e.g., through a memory bus) to the data store 350 in order to store and retrieve data desired to operate and/or confer functionality, at least in part, to the capture component 344, recognizer component 346, etc., of the communication device 320 and/or substantially any other operational aspects of the communication device 320. It is to be appreciated and understood that the various components of the communication device 320 can communicate data, instructions, or signals between each other and/or between other components associated with the communication device 320 as desired to carry out operations of the communication device 320. It is to be further appreciated and understood that respective components (e.g., capture component 344, recognizer component 346, etc.) of the communication device 320 each can be a stand-alone unit, can be included within the communication device 320 (as depicted), can be incorporated within another component of the communication device 320 or a component separate from the communication device 320, and/or virtually any suitable combination thereof, as desired.

In certain implementations, the system 300 can comprise a segmenter component 352 that can be located at the local (e.g., plant) level or in the cloud platform. The segmenter component 352 can be associated with the industrial automation system 306, communication device 320, and/or mesh network component 340. The segmenter component 352 can classify, determine, filter, and/or segment respective data with regard to data that can be provided to the cloud platform (e.g., to the modeler component 302 in the cloud) and data that is not to be provided to the cloud (e.g., to the modeler component 302 in the cloud) based at least in part on one or more preferences (e.g., enterprise entity preference(s), user preference(s)). The one or more preferences can be determined or selected based at least in part on the respective levels of data sensitivity of respective items of data associated with the industrial automation system 306, as such respective levels of data sensitivity are determined or assigned to the respective data by the enterprise entity or other user. In certain implementations, the segmenter component 352 can have a slider component (e.g., a graphical slider component) or other control that can be manipulated (e.g., moved) by a user to facilitate setting the respective levels of data sensitivity for respective types of data associated with the industrial automation system 306.

Figure 4:
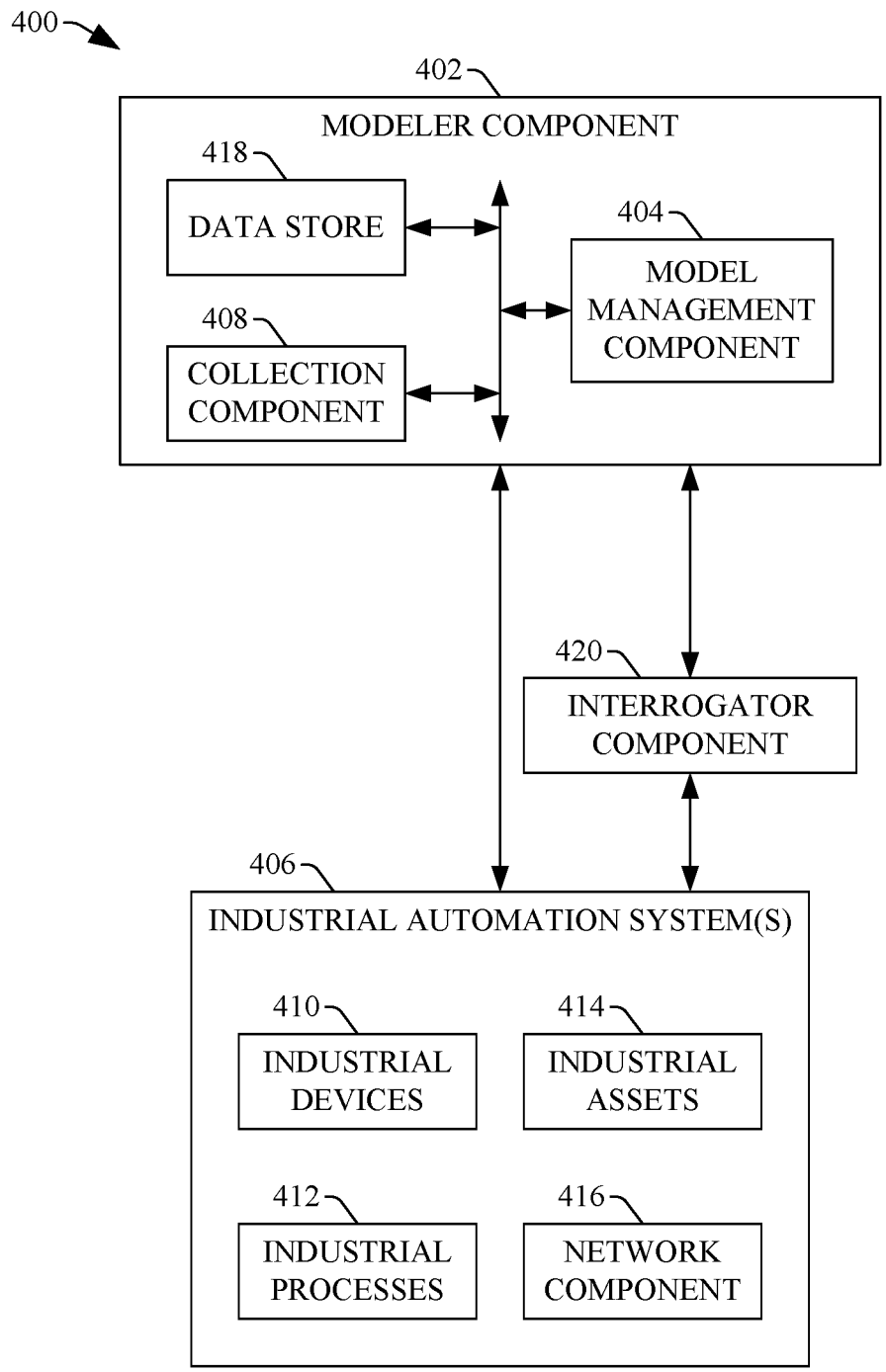
FIG. 4 depicts a block diagram of an example system that can facilitate identifying a user or device that is attempting to obtain an Internet Protocol (IP) address associated with an industrial automation system, in accordance with various aspects and embodiments of the disclosed subject matter.

FIG. 4 depicts a block diagram of an example system 400 that can facilitate identifying a user or device that is attempting to obtain an IP address associated with an industrial automation system, in accordance with various aspects and embodiments of the disclosed subject matter. The system 400 can comprise a modeler component 402, a model management component 404, an industrial automation system 406, a collection component 408, industrial devices 410, industrial processes 412, other industrial assets 414, a network component 416, and a data store 418.

The system 400 also can comprise an interrogator component 420 that can facilitate identifying a user or device that is attempting to obtain an IP address associated with the industrial automation system 406. For instance, at any given time, the interrogator component 420 can identify what devices (e.g., computer, mobile phone, electronic pad or table, industrial device, or other device) are on the network associated with the industrial automation system 406. The interrogator component 420 can employ one or more tools or techniques (e.g., troubleshooting or assistance tools or techniques) to facilitate identifying what user or device is trying to obtain an IP address in connection with the industrial automation system 406 (e.g., the network component 416 of the industrial automation system 406). In accordance with various implementations, the interrogator component 420 can be located at the local or plant level, or can be located in the cloud platform. For example, the interrogator component 420 can reside between the machine network and plant network, and can report (e.g., communicate) data, such as network-related or architecture data, to the modeler component 402 in the cloud for use by the modeler component 402 in generating or updating the model of the industrial automation system 406.

With further regard to FIGS. 1-4, the model management component 120 or virtualization component 224 can generate, manage, update, or control the type of virtualized view, size of a virtualized view, shape of a virtualized view, size, shape, or color of an item presented in a modeled view or a virtualized view, etc., of the model (e.g., 104) or virtualized industrial automation system (e.g., 206) based at least in part on user preferences or user interaction with the model or the virtualized industrial automation system via the communication device (e.g., 228), or automatically or dynamically in response to an occurrence of an event(s) associated with the industrial automation system (e.g., 106, 206), in accordance with the defined modeling criteria or defined virtualization criteria. For example, the model management component 120 or virtualization component 224 can generate a hybrid modeled or virtualized view that can be can be a picture-in-picture (PIP) view, wherein the first modeled or virtualized view can cover a larger portion of the display screen of the communication device (e.g., 228) and the second modeled or virtualized view can cover a relatively smaller portion of the display screen of the communication device. If an event (e.g., fluid spill, motor problem, etc.) occurs in the second portion of the industrial automation system (e.g., 106, 206), the model management component 120 or virtualization component 224 can modify (e.g., dynamically or automatically modify or adjust) the hybrid modeled or virtualized view to increase the size of the second modeled or virtualized view and/or decrease the size of the first modeled or virtualized view as displayed on the display screen of the communication device, reverse (e.g., dynamically or automatically reverse) the display of the first modeled or virtualized view and second modeled or virtualized view so that the second modeled or virtualized view covers the larger portion of the display screen and the first modeled or virtualized view covers the smaller portion of the display screen, or can send a prompt, notification, or alert to the communication device to notify the user that an event has occurred in the second portion of the industrial automation system (e.g., 106, 206) and recommending that the second modeled or virtualized view be modified (e.g., in response to the user interacting with the hybrid modeled or virtualized view of the model or virtualized industrial automation system via the communication device).

The model management component 120, virtualization component 224, and/or the communication device (e.g., 228) also can facilitate enabling a user to adjust the size of a modeled view or virtualized view of the industrial automation system. For example, in response to user interaction (e.g., a gesture or command) with the model or virtualized industrial automation system via the communication device that indicates that the user is attempting to increase the size of a portion of the view of the model or the virtualized industrial automation system, the model management component 120, virtualization component 224, and/or the communication device (e.g., 228) can zoom in or drill down to that portion of the view to increase or magnify the size of that portion of the view on the display screen of the communication device. If the size of the modeled or virtualized view is greater than the size of the display screen of the communication device, the model management component 120, virtualization component 224, and/or the communication device (e.g., 228) can facilitate providing a scroll bar or other function that can allow a user to maintain the relatively larger size of the modeled or virtualized view, while enabling the user to interact with the model or virtualized industrial automation system to view different areas of the model or virtualized industrial automation system (e.g., by moving a different area of the model or virtualized industrial automation system that is outside the display screen so that it is displayed on the display screen). The model management component 120, virtualization component 224, and/or the communication device (e.g., 228) also can facilitate presenting a keyboard (e.g., a pop-up touchscreen keyboard) and/or mouse (e.g., virtual or touchscreen mouse) on the display screen of the communication device to facilitate enabling a user to interact with the display screen to input data, select, move, or modify items, and/or interact with the model or virtualized industrial automation system, etc.

Figure 5:
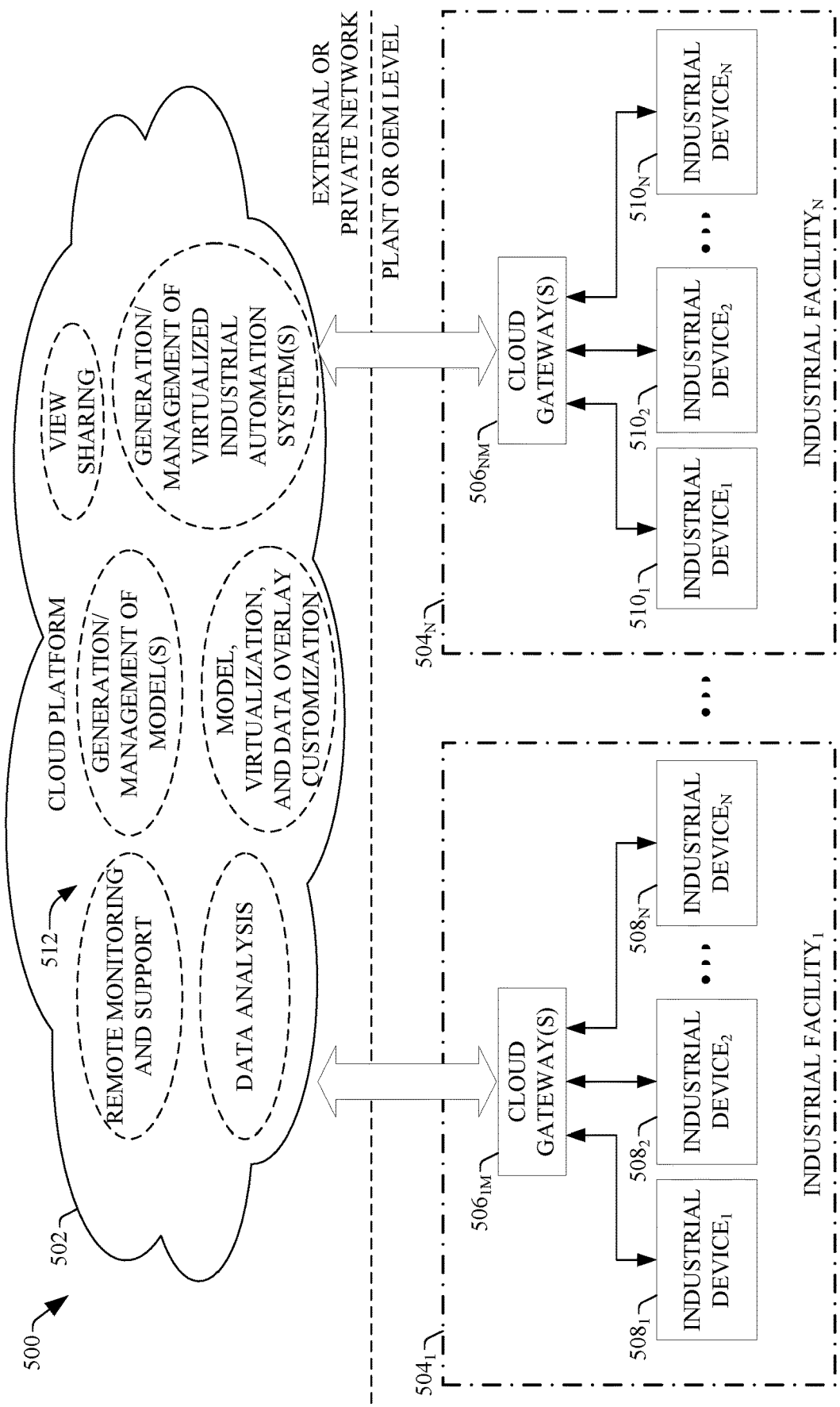
FIG. 5 illustrates a block diagram of a high-level overview of an example industrial enterprise that can leverage cloud-based services, including modeling and virtualization services, data collection services, and data storage services, in accordance with various aspects and embodiments of the disclosed subject matter.

As disclosed herein, the modeler system (e.g., 100, 300) and/or virtualization system (e.g., comprising the virtualization component of the system 200), or respective portions thereof, can be located in a cloud platform. To provide a general context for the cloud-based modeler system, cloud-based virtualization system, and services described herein, FIG. 5 illustrates a block diagram of a high-level overview of an example industrial enterprise 500 that can leverage cloud-based services, including modeling and virtualization services, data collection services, and data storage services, in accordance with various aspects and embodiments of the disclosed subject matter. The industrial enterprise 500 can comprise one or more industrial facilities, such as industrial facility$_1$ 504$_1$ up through industrial facility$_N$ 504$_N$, wherein each industrial facilitate can include a number of industrial devices in use. For example, industrial facility$_1$ 504$_1$ can comprise industrial device$_1$ 508$_1$ up through industrial device$_N$ 508$_N$, and industrial facility$_N$ 504$_N$ can comprise industrial device$_1$ 510$_1$ up through industrial device$_N$ 510$_N$. The industrial devices (e.g., 508$_1$, 508$_N$, 510$_1$, 510$_N$, etc.) can make up one or more industrial automation systems that can operate within the respective industrial facilities (e.g., industrial facility$_1$ 504$_1$ up through industrial facility$_N$ 504$_N$). Exemplary industrial automation systems can include, but are not limited to, batch control systems (e.g., mixing systems), continuous control systems (e.g., proportional-integral-derivative (PID) control systems), or discrete control systems. Industrial devices (e.g., 508$_1$, 508$_N$, 510$_1$, 510$_N$, etc.) can include such industrial devices as industrial controllers (e.g., programmable logic controllers or other types of programmable automation controllers); field devices such as sensors and meters; motor drives; HMIs; industrial robots, barcode markers, and readers; vision system devices (e.g., vision cameras); smart welders; or other types of industrial devices.

Exemplary industrial automation systems can include one or more industrial controllers that can facilitate monitoring and controlling of their respective industrial processes. The industrial controllers can exchange data with the field devices using native hardwired input/output (I/O) or via a plant network, such as Ethernet/Internet Protocol (IP), Data Highway Plus, ControlNet, Devicenet, or the like. A given industrial controller typically can receive any combination of digital or analog signals from the field devices that can indicate a current state of the industrial devices and/or their associated industrial processes (e.g., temperature, position, part presence or absence, fluid level, etc.), and can execute a user-defined control program that can perform automated decision-making for the controlled industrial processes based on the received signals. The industrial controller can output appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code that can be used to process input signals read into the controller and to control output signals generated by the industrial controller, including, but not limited to, ladder logic, sequential function charts, function block diagrams, structured text, or other such platforms.

Although the exemplary overview illustrated in FIG. 5 depicts the industrial devices (e.g., 508$_1$, 508$_N$, 510$_1$, 510$_N$) as residing in fixed-location industrial facilities (e.g., industrial facility$_1$ 504$_1$ up through industrial facility$_N$ 504$_N$, respectively), in some implementations, the industrial devices (e.g., 508$_1$, 508$_N$, 510$_1$, and/or 510$_N$) also can be part of a mobile control and/or monitoring application, such as a system contained in a truck or other service vehicle.

According to one or more embodiments of the disclosed subject matter, industrial devices (e.g., 508$_1$, 508$_N$, 510$_1$, 510$_N$, etc.) can be coupled to a cloud platform 502 to facilitate leveraging cloud-based applications and services (e.g., data collection services, data storage services, modeling services, virtualization services, etc.) associated with the cloud platform 502. That is, the industrial devices (e.g., 508$_1$, 508$_N$, 510$_1$, 510$_N$, etc.) can be configured to discover and interact with cloud-based computing services 512 that can be hosted by the cloud platform 502. The cloud platform 502 can be any infrastructure that can allow cloud services 512 (e.g., cloud-based computing services, shared computing services) to be accessed and utilized by cloud-capable devices. The cloud platform 502 can be a public cloud that can be accessible via a public network, such as the Internet, by devices having public network connectivity (e.g., Internet connectivity) and appropriate authorizations to utilize the cloud services 512. In some scenarios, the cloud platform 502 can be provided by a cloud provider as a platform-as-a-service (PaaS) and/or reliability-as-a-service (RaaS), and the cloud services 512 can reside and execute on the cloud platform 502 as a cloud-based service. In some such configurations, access to the cloud platform 502 and associated cloud services 512 can be provided to customers as a subscription service by an owner of the cloud services 512. Additionally and/or alternatively, the cloud platform 502 can be a private cloud that can be operated internally by the industrial enterprise 500 or an associated enterprise associated with a third-party entity. An exemplary private cloud platform can comprise a set of servers that can host the cloud services 512 and can reside on a private network (e.g., an intranet, a corporate network, etc.) that can be protected by a firewall.

The cloud services 512 can include, but are not limited to, data collection, data storage, data analysis, control applications (e.g., applications that can generate and deliver control instructions to industrial devices (e.g., 508$_1$, 508$_N$, 510$_1$, 510$_N$, etc.) based at least in part on analysis of real-time or near real-time system data or other factors), remote monitoring and support, generation and management of a model (s) of an industrial automation system(s) that can correspond to the industrial automation system(s), generation and management of a virtualized industrial automation system(s) that can correspond to an industrial automation system(s), remote control of an industrial automation system(s) via a model(s) or virtualized industrial automation system(s), customization of a model(s) or virtualized industrial automation system and/or a data overlay on the virtualized industrial automation system, generation of virtual notes, view sharing (e.g., sharing of customized view of, customized data overlay associated with, and/or a virtual note associated with, a virtualized industrial automation system), provision of security in connection with a model or virtualized industrial automation system and an associated industrial automation system, or provision of other applications or services relating to industrial automation. If the cloud platform 502 is a web-based cloud, industrial devices (e.g., $508_1$, $508_N$, $510_1$, $510_N$, etc.) at the respective industrial facilities 504 can interact with cloud services 512 via the public network (e.g., the Internet). In an exemplary configuration, the industrial devices (e.g., $508_1$, $508_N$, $510_1$, $510_N$, etc.) can access the cloud services 512 through separate cloud gateways (e.g., cloud gateway component $506_{1M}$ up through cloud gateway component $506_{NM}$) at the respective industrial facilities (e.g., industrial facility$_1$ $504_1$ up through industrial facility$_N$ $504_N$, respectively), wherein the industrial devices (e.g., $508_1$, $508_N$, $510_1$, $510_N$, etc.) can connect to the respective cloud gateway components (e.g., cloud gateway component $506_{1M}$ up through cloud gateway component $506_{NM}$) through a physical (e.g., wireline) or wireless local area network or radio link. In another exemplary configuration, the industrial devices (e.g., $508_1$, $508_N$, $510_1$, $510_N$, etc.) can access the cloud platform 502 directly using an integrated cloud gateway service. Cloud gateway components (e.g., cloud gateway component $506_{1M}$ up through cloud gateway component $506_{NM}$) also can comprise an integrated component of a network infrastructure device, such as a firewall box, router, or switch.

Providing industrial devices with cloud capability via the cloud gateway components (e.g., cloud gateway component $506_{1M}$ up through cloud gateway component $506_{NM}$) can offer a number of advantages particular to industrial automation. For instance, cloud-based storage (e.g., cloud-based data store) offered by the cloud platform 502 can be easily scaled to accommodate the large quantities of data that can be generated daily by an industrial enterprise. Further, multiple industrial facilities (e.g., industrial facility$_1$ $504_1$ up through industrial facility$_N$ $504_N$) at different geographical locations can migrate (e.g., communicate) their respective industrial automation data to the cloud platform 502 (e.g., via the collection component) for aggregation, collation, collective big data analysis, and enterprise-level reporting without the need to establish a private network between the respective industrial facilities. Industrial devices (e.g., $508_1$, $508_N$, $510_1$, $510_N$, etc.) and/or cloud gateway components (e.g., cloud gateway component $506_{1M}$ up through cloud gateway component $506_{NM}$) having smart configuration capability can be configured to automatically detect and communicate with the cloud platform 502 upon installation at any facility, which can thereby simplify integration with existing cloud-based data storage, analysis, or reporting applications used by the industrial enterprise 500. In another exemplary application, cloud-based modeling applications (e.g., employed by the modeler system comprising the modeler component) can access the data relating to an industrial automation system(s) stored in the cloud-based data store, can generate and/or update a model(s) of an industrial automation system(s), wherein the model(s) can accurately depict or represent the layout and device make-up, and operation, of the industrial automation system(s) to facilitate desirable (e.g., optimal, suitable) operation of the industrial automation system(s) and remote interaction with the industrial automation system(s) by users (e.g., via a communication device) to facilitate remote performance of tasks in connection with the industrial automation system(s). In still another exemplary application, cloud-based virtualization applications (e.g., utilized by the virtualization system comprising the virtualization component) can access the data (e.g., model data or other relevant data) relating to an industrial automation system(s) stored in the cloud-based data store, can generate and/or update a virtualized industrial automation system that can present a virtualized view of an industrial automation system and its operation, remotely control the industrial automation system in response to interaction with (e.g., user interaction to virtually control) a corresponding virtualized industrial automation system, customize a virtualized view of the industrial automation system(s) for a user (e.g., based at least in part on one or more customization factors associated with the user), provide security comprising controlling access to the virtualized industrial automation system and corresponding industrial automation system (e.g., based at least in part on authentication credentials of users and access rights of users), as more fully disclosed herein. These industrial cloud-computing applications are only intended to be exemplary, and the systems and methods described herein are not limited to these particular applications. As these examples demonstrate, the cloud platform 502, working with cloud gateway components (e.g., cloud gateway component $506_{1M}$ up through cloud gateway component $506_{NM}$), can allow builders of industrial applications to provide scalable solutions as a service, removing the burden of maintenance, upgrading, and backup of the underlying infrastructure and framework.

Figure 6:
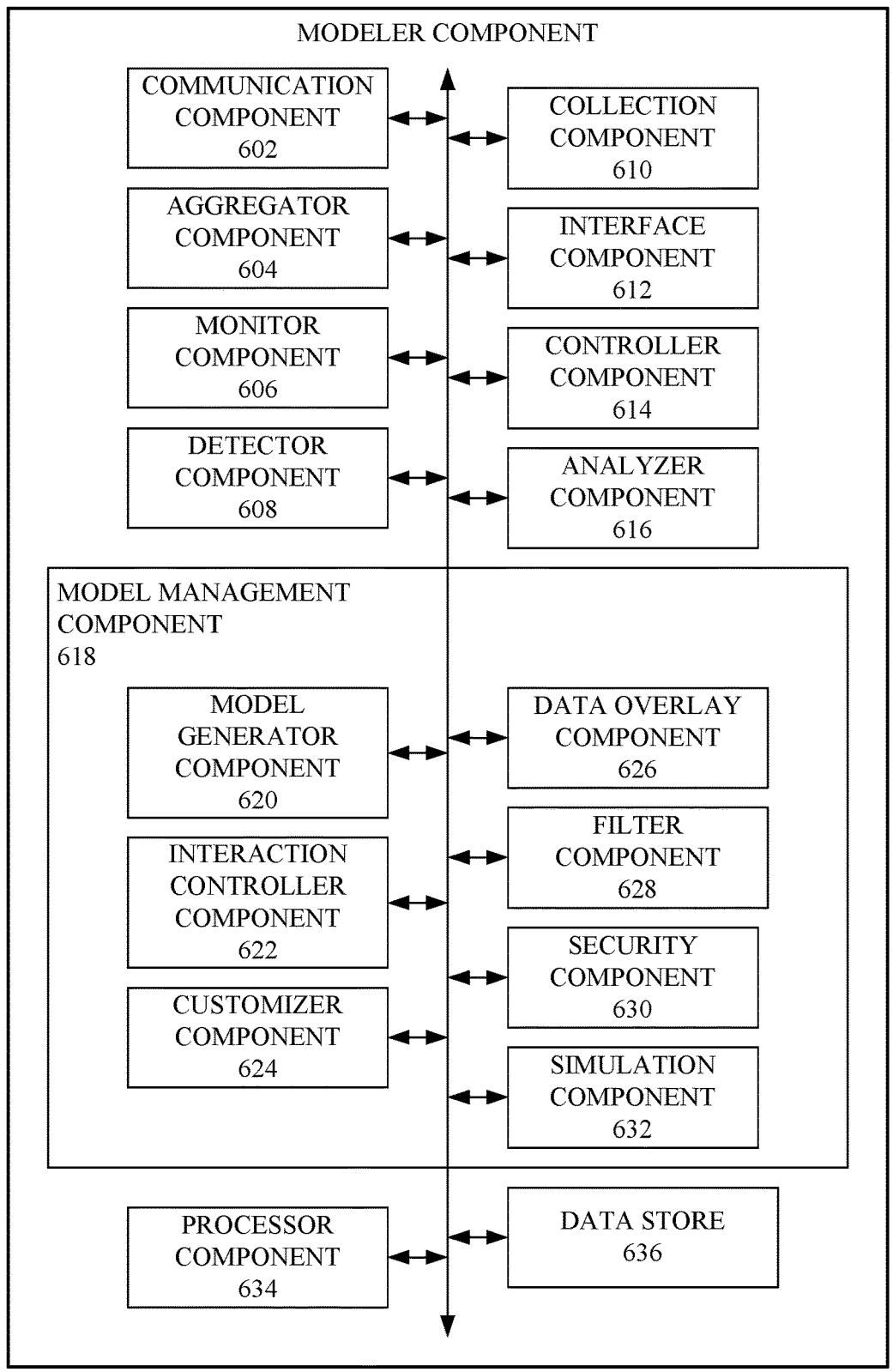
FIG. 6 presents a block diagram of an exemplary modeler component (e.g., cloud-based, or partially cloud-based, modeler component) according to various implementations and embodiments of the disclosed subject matter.

FIG. 6 presents a block diagram of an exemplary modeler component 600 (e.g., cloud-based, or partially cloud-based, modeler component) according to various implementations and embodiments of the disclosed subject matter. The modeler component 600 can be part of a modeler system (e.g., a cloud-based modeler system). Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

The modeler component 600 can comprise a communication component 602 that can be used to communicate (e.g., transmit, receive) information between the modeler component 600 and other components (e.g., communication devices, network-related devices, industrial devices, other types of industrial assets that have communication functionality, other devices with communication functionality that are associated with industrial enterprises, cloud gateways, etc.). The information can include, for example, data relating to industrial automation systems, data relating to specifications, properties, or characteristics of industrial devices or other industrial assets, customer-related data, work-order-related data relating to work orders that will or may be handled by an industrial automation system, etc.

The modeler component 600 can comprise an aggregator component 604 that can aggregate data received (e.g., obtained, collected, detected, etc.) from various entities (e.g., communication devices, industrial devices, industrial assets, network-related devices, cloud gateway components, virtualization component, other devices with communication functionality that are associated with industrial enterprises, processor component(s), user interface(s), data store(s), etc.). The aggregator component 604 can correlate respective items of data based at least in part on type of data, source of the data, time or date the data was generated or received, type of device or asset associated with the data, identifier associated with a device or asset, customer associated with the data, user (e.g., operator, supervisor or manager, engineer, technician, etc.) associated with the data, industrial automation system associated with the data, industrial enterprise associated with the system, etc., to facilitate processing of the data (e.g., analyzing of the data, generating models, etc.).

The modeler component 600 also can include a monitor component 606 that can monitor device data, process data, asset data, system data, customer data, and/or other data in connection with the industrial automation systems. For instance, the monitor component 606 can monitor information (e.g., signals, device or process statuses, network communication of information, process flows, updates, modifications, etc.) associated with industrial automation systems, virtualized industrial automation systems, industrial enterprises, and/or systems or devices of customers associated with the industrial enterprises to facilitate detecting information associated with industrial automation systems that can facilitate generating and updating models of industrial automation systems, generating and updating virtualized industrial automation systems, remotely tracking operation of or controlling operation of an industrial automation system via an associated model or associated virtualized industrial automation system, remotely tracking respective use of respective industrial assets (e.g., maintenance, wear and tear, repair, etc., of respective industrial assets) to facilitate determining when the respective industrial assets are to be replaced or repurchased in connection with an industrial automation system at an industrial facility, customizing a view of and/or a data overlay associated with a model or a virtualized industrial automation system for a user, sharing a view (e.g., a customized view) of and/or a data overlay (e.g., a customized data overlay) associated with a model or a virtualized industrial automation system with a communication device of another user, generating virtual notes in connection with a virtualized industrial automation system, controlling and/or enforcing the viewability scope associated with a virtual note, and/or performing other model-related or virtualization-related services. The monitor component 606 can be associated with sensors, meters, HMIs, communication monitoring components, or other components associated with industrial automation systems, industrial enterprises, and/or systems or devices of the customers to facilitate the monitoring of the industrial automation systems, industrial enterprises, and/or systems or devices of the customers.

The modeler component 600 can comprise a detector component 608 that can detect desired information associated with industrial automation systems that can facilitate performing model-related services and virtualization-related services in connection with an industrial automation system (e.g., generating or updating a model, generating or updating a virtualized industrial automation system, remotely interacting with (e.g., monitoring, tracking, and/or controlling, etc., operation of) an industrial automation system via interacting with a model or a virtualized industrial automation system, etc.), in accordance with the defined modeling criteria, the defined virtualization criteria, or other operation criteria. For instance, the detector component 608 can detect desired device data, process data, asset data, system data, and/or customer data in connection with the industrial automation systems that can facilitate generating a model or a virtualized industrial automation system that can accurately represent and/or interface with an industrial automation system, remotely interacting with and/or controlling an industrial automation system via an associated model or virtualized industrial automation system, and/or performing other model-related or virtualization-related services or functions. In some implementations, the detector component 608 can be or can comprise the discovery component (e.g., as described herein with regard to the system 300 of FIG. 3).

As another example, the detector component 608 can track and detect operation of the industrial automation system, including tracking use of industrial assets (e.g., maintenance, wear and tear, repair, etc., of respective industrial assets) of the industrial automation system. This can facilitate determining when the respective industrial assets are to be replaced or repurchased in connection with an industrial automation system at an industrial facility. When the detected information indicates that an industrial asset should be replaced, the modeler component 600 (via, e.g., the model management component 618) can generate a notification or recommendation that can indicate the industrial asset should be replaced, and can communicate the notification or recommendation to a user, for example, via a communication device associated with the user, for further action by the user (e.g., user can take action to replace the industrial asset), or can facilitate procuring or purchasing (e.g., automatically procuring or purchasing) another industrial asset to replace the industrial asset.

The modeler component 600 also can include a collection component 610 that can receive, collect, or obtain data (e.g., desired device data, process data, asset data, system data, and/or customer data) from industrial automation systems, communication devices, models, virtualized industrial automation systems, extrinsic sources, etc., to facilitate performing model-related and virtualization-related services, as more fully disclosed herein. The data collected by the collection component 610 can be stored in the data store 636, and/or can be made available to other components (e.g., analyzer component 616, model management component 618, etc.) to facilitate generating and updating models of industrial automation systems, generating and updating virtualized industrial automation systems, remotely interacting with (e.g., monitoring, tracking, and/or controlling, etc.) an industrial automation system via an associated model or virtualized industrial automation system, and/or performing other model-related or virtualization-related services or functions.

The modeler component 600 can comprise an interface component 612 that can be employed to facilitate interfacing the modeler component 600 (or interfacing an associated virtualization component), including model of an industrial automation system generated by the modeler component 600 (or an associated virtualized industrial automation system generated by the virtualization component), with industrial automation systems and their constituent components (e.g., industrial devices or assets, network-related devices or assets, etc.) or processes, systems or devices associated with customers, systems or devices associated with device manufacturers, etc. For instance, the interface component 612 can be configured to receive industrial data (e.g., device data, process data, asset data, system data, configuration data, status data, process variable data, etc.) sent by one or more cloud-capable industrial devices, cloud gateway components, communication devices, or other sources of industrial data. The interface component 612 also can be configured to receive network-related data (e.g., data relating to communication conditions, network-status data, data identifying network-related devices, etc.) communicated by one or more network-related devices of the network component of an industrial automation system. The interface component 612 also can be configured to interface a model (or an virtualized industrial automation system) with a corresponding industrial automation system to facilitate remotely interacting with (e.g., monitoring, tracking, and/or controlling, etc., operation of) the industrial automation system via interactions (e.g., user interactions) with the model (or the virtualized industrial automation system (e.g., via virtualized control of the virtualized operation of the virtualized industrial automation system)). The interface component 612 further can be configured to exchange data with one or more client or customer devices via an Internet connection. For example, the interface component 612 can receive customer profile data, requests for firmware upgrades, customer service selections, information relating to work orders for products, customer preferences or requirements with regard to a work order, or other such information from a client device (e.g., an Internet-capable client device, such as a phone, a computer, an electronic tablet or pad, or other suitable Internet-capable device). The interface component 612 also can deliver upgrade notifications, firmware upgrades, reports or notifications regarding the evaluation of and determinations regarding proposed modifications to an industrial automation system, notifications of impending device failures, identification of asset or system inefficiencies, configuration recommendations, or other such data to the client device.

The modeler component 600 also can contain a controller component 614 that can control operations relating to processing data, generate or update model of an industrial automation system, facilitate generating or updating a virtualized industrial automation system that can represent an industrial automation system, remotely control an industrial automation system (e.g., using an associated model or virtualized industrial automation system), facilitate customizing a view of a virtualized industrial automation system for a user, perform simulation operations using a model (e.g., simulation model) in connection with an industrial automation system, and/or perform other operations in connection with the industrial automation system. The controller component 614 can facilitate controlling operations being performed by various components of the modeler component 600, controlling data flow between various components of the modeler component 600, controlling data flow between the modeler component 600 and other components or systems associated with the modeler component 600, etc.

The analyzer component 616 can analyze data (e.g., device data, process data, asset data, system data, customer data, user-generated or user-provided data, and/or other data) to facilitate generating or updating a model of an industrial automation system, generating or updating a virtualized industrial automation system of an industrial automation system, customizing a view of and/or a data overlay associated with model or a virtualized industrial automation system, sharing a customized view of and/or a customized data overlay associated with a virtualized industrial automation system, performing simulation of operation of an industrial automation system using a model, processing virtual notes, etc. The analyzer component 616 can parse data to facilitate identifying data that is relevant to performing an operation (e.g., generating a model, generating a virtualized industrial automation system, customizing a view of and/or a data overlay associated with a model or virtualized industrial automation system, etc.) by the modeler component 600. Based at least in part on the analysis of the data, the analyzer component 616 can generate analysis results that can be provided to another component (e.g., model management component 618, processor component 634, etc.) to facilitate the performance of various operations by the modeler component 600.

The modeler component 600 also can comprise a model management component 618 that can generate and/or update a model that can represent an industrial automation system, facilitate remotely interacting with and/or controlling an industrial automation system using an associated model or virtualized industrial automation system, customize a view of and/or a data overlay associated with a model or virtualized industrial automation system for a user, share a customized view of and/or a customized data overlay associated with a model or virtualized industrial automation system, process virtual notes, perform simulation operations using a model of an industrial automation system, and/or performing other operations. For instance, the model management component 618 can include a model generator component 620 that can generate and/or update a model that can represent an industrial automation system, including generating and/or updating modeled versions or instances of the constituent components (e.g., industrial devices, industrial processes, industrial assets, network-related devices or assets, etc.) of the industrial control system, the interrelationships between respective constituent components, configurations of respective constituent components, etc., in accordance with the set of defined modeling criteria, as more fully disclosed herein.

The model management component 618 can comprise an interaction controller component 622 that can facilitate remotely interacting and/or controlling an industrial automation system, by a user, using an associated model or virtualized industrial automation system. For instance, the interaction controller component 622 can receive information relating to user interactions with the model or virtualized industrial automation system from a communication device of the user, and can facilitate remotely interacting with and/or controlling the industrial automation system in response to the information relating to the user interactions with the model or virtualized industrial automation system, as more fully disclosed herein.

The model management component 618 can include a customizer component 624 that can customize a view of, and/or a data overlay associated with, a model or virtualized industrial automation system that can correspond to and be interfaced with an industrial automation system, for example, based at least in part on one or more customization factors (e.g., associated with a user). The model management component 618 can facilitate providing (e.g., communicating, presenting, etc.) data relating to the customized view of, and/or a customized data overlay associated with, the model or virtualized industrial automation system to a communication device of a user to facilitate displaying the customized view of and/or a customized data overlay associated with, the model or virtualized industrial automation system to the user via the communication device.

The model management component 618 also can comprise a data overlay component 626 that can facilitate overlaying a set of data on or in connection with a model, and/or on a virtualized industrial automation system, wherein the set of data can relate to operation of the industrial automation system associated with the model or virtualized industrial automation system. The data overlay component 626 can facilitate overlaying a summary or synthesis of data associated with the industrial automation system, or a portion thereof, on or in connection with the model or on the virtualized industrial automation system, or a portion thereof. The data overlay component 626 can facilitate overlaying respective subsets of data on or in proximity to respective modeled or virtualized objects (e.g., modeled or virtualized industrial device(s), modeled or virtualized industrial process(es), modeled or virtualized industrial asset(s), modeled or virtualized network-related device(s), etc.) presented in the model or the virtualized industrial automation system, wherein the respective modeled or virtualized objects (e.g., modeled or industrial device(s), modeled or industrial process(es), modeled or industrial asset(s), modeled or network-related device(s), etc.) can correspond to respective objects of the industrial automation system. In some implementations, the data overlay component 626 can facilitate overlaying a customized set of data on or in connection with a model or on a virtualized industrial automation system, or customized subsets of data on or in proximity to respective modeled or virtualized objects presented in the model or the virtualized industrial automation system, based at least in part on the role of a user, location of the user in relation to the industrial automation system, preferences of the user, and/or other factors, in accordance with the modeling criteria or virtualization criteria.

The model management component 618 also can include a filter component 628 that can facilitate filtering data overlaid on the model or the virtualization industrial automation system, wherein the data can relate to the operation of the industrial automation system and/or a user associated therewith. The filter component 628 can facilitate providing one or more filters to a communication device of a user to enable the user to filter the data, or the view of the data, overlaid on the model or the virtualized industrial automation system (e.g., the user's customized view of the model or virtualized industrial automation system). The user, via the communication device, can manipulate or select a filter control and/or input filter-related information to facilitate setting or selecting a desired filter(s) that can be used to filter the data associated with the industrial automation system. The model management component 618 can receive the information relating to setting or selection of the filter(s) and/or other filter-related information from the communication device for processing. The filter component 628 can facilitate setting or implementing the filter(s) based at least in part on the information relating to setting or selection of the filter(s) and/or other filter-related information. The filter component 628 (and/or the analyzer component 616) can analyze data relating to the industrial automation system, and can filter such data to generate a set of filtered data relating to the industrial automation system. The data overlay component 626 can facilitate overlaying the set of filtered data on the model or the virtualized industrial automation system, or a portion thereof (e.g., facilitate overlaying the set of filtered data on or in proximity to a modeled or virtualized object(s) of the model or virtualized industrial automation system).

For instance, the filter component 628 can facilitate enabling a user, via the user's communication device, to select and apply a desired filter(s) to filter data associated with the user's view (e.g., customized view) of the model or virtualized industrial automation system, for example, to present (on the model or virtualized industrial automation system) a subset of the data that is relevant to a work task that the user is performing at the time, present (on the model or virtualized industrial automation system) more detailed data and/or a drilled-down view regarding a certain portion of the model or virtualized industrial automation system and associated industrial automation system, as desired by the user. The filter component 628 can facilitate providing a number of different types of filters to the communication devices of users to enable the users to customize, augment, and/or filter data overlays for a user's personalized view of the model or virtualized industrial automation system, as more fully disclosed herein.

The model management component 618 also can contain a security component 630 that can facilitate securing a model, an associated virtualized industrial automation system, and associated industrial automation system. The security component 630 can facilitate controlling access to a model (or a particular (e.g., customized) view of a model), a virtualized industrial automation system (or a particular (e.g., customized) view of a virtualized industrial automation system), and/or an associated industrial automation system (e.g., via the model or virtualized industrial automation system), based at least in part on respective authentication credentials of user, respective access rights of users, respective locations of users, etc., as more fully disclosed herein.

The model management component 618 also can comprise a simulation component 632 that can generate or augment a model of the industrial automation system for use as a simulation model of the industrial automation system based at least in part on the simulation or emulation of the industrial control system, in accordance with the set of defined modeling criteria. The simulation component 632 can integrate the respective simulations or emulations of the constituent components of the industrial automation system, the interrelationships between respective constituent components, configurations of respective constituent components, etc., to facilitate generating the simulation model that can simulate or emulate the industrial automation system. The simulation component 632 also can use the simulation model to facilitate simulating operation of the industrial automation system under (e.g., in response to) a given set of conditions (e.g., under a set of conditions associated with a modification (e.g., adjustment to a modeled control, adjustment to a modeled switch, addition of a modeled industrial device, replacement of a modeled industrial device with a new modeled industrial device, change of a parameter on a modeled industrial device, etc.) to the model (or associated virtualized industrial control system) that is under consideration). The model management component 618 or a user can analyze the results of the simulated operation of the industrial automation system, and can determine whether the modification to the model (or associated virtualized industrial control system) that is under consideration is to be performed, and determine whether the corresponding modification to the industrial automation system is to be performed, based at least in part on the analysis results.

The modeler component 600 also can comprise a processor component 634 that can operate in conjunction with the other components (e.g., communication component 602, aggregator component 604, monitor component 606, etc.) to facilitate performing the various functions and operations of the modeler component 600. The processor component 634 can employ one or more processors (e.g., CPUs, GPUs, FPGAs, etc.), microprocessors, or controllers that can process data, such as industrial data (e.g., device data, process data, asset data, system data, etc.) associated with industrial control systems, customer or client related data, data relating to parameters associated with the modeler component 600 and associated components, etc., to facilitate generating or updating a model or a virtualized industrial automation system that can represent an industrial automation system, remotely interacting with and/or controlling an industrial automation system using an associated model or virtualized industrial automation system, customizing a view of and/or a data overly associated with a model or virtualized industrial automation system for a user, filter data relating to the industrial automation system in connection with a data overlay, share a customized view and/or a customized data overlay associated with a user with a communication device of another user, generate or post a virtual note, generating a simulation model of an industrial automation system, performing simulation operations using simulation models to facilitate determining whether to perform a particular action in connection with a model, a virtualized industrial automation system, or associated industrial automation system, performing other model-related or virtualization-related operations, etc.; and can control data flow between the modeler component 600 and other components associated with the modeler component 600.

In yet another aspect, the modeler component 600 can contain a data store 636 that can store data structures (e.g., user data, metadata); code structure(s) (e.g., modules, objects, classes, procedures), commands, or instructions; industrial data or other data associated with industrial automation systems or industrial enterprises; customer or client related information; data relating to model-related or virtualization-related services in connection with industrial automation systems; parameter data; algorithms (e.g., algorithm(s) relating to generating or updating model or a virtualized industrial automation system that can represent an industrial automation system, including its industrial devices, industrial processes, industrial assets, network-related devices, interrelationships between such devices, processes, or assets, etc.); algorithm(s) relating to remotely interacting with (e.g., monitoring, tracking, controlling, etc.) an industrial automation system using an associated model or virtualized industrial automation system, algorithm(s) relating to customizing a view of and/or a data overlay associated with a model or a virtualized industrial automation system, filtering data, sharing a customized view of and/or a customized data overlay associated with a model or a virtualized industrial automation system, generating or posting a virtual note, etc.); a set of defined modeling criteria; a set of virtualization criteria; other criteria; and so on. In an aspect, the processor component 634 can be functionally coupled (e.g., through a memory bus) to the data store 636 in order to store and retrieve data desired to operate and/or confer functionality, at least in part, to the communication component 602, aggregator component 604, monitor component 606, etc., of the modeler component 600 and/or substantially any other operational aspects of the modeler component 600. It is to be appreciated and understood that the various components of the modeler component 600 can communicate data, instructions, or signals between each other and/or between other components associated with the modeler component 600 as desired to carry out operations of the modeler component 600. It is to be further appreciated and understood that respective components (e.g., communication component 602, aggregator component 604, monitor component 606, etc.) of the modeler component 600 each can be a stand-alone unit, can be included within the modeler component 600 (as depicted), can be incorporated within another component of the modeler component 600 (e.g., within the model management component 618) or a component separate from the modeler component 600, and/or virtually any suitable combination thereof, as desired. It also is to be appreciated and understood that respective components (e.g., communication component 602, aggregator component 604, monitor component 606, . . . processor component 634, data store 636) of the modeler component 600 can be shared with and used by another component(s) (e.g., virtualization component) or system(s) (e.g., virtualization system) or such other component(s) or system(s) can comprise components that can be the same as or similar to that of the modeler component 600.

In accordance with various embodiments, one or more of the various components of the modeler component 600 (e.g., communication component 602, aggregator component 604, monitor component 606, etc.) can be electrically and/or communicatively coupled to one another to perform one or more of the functions of the modeler component 600. In some implementations, one or more components of the modeler component 600 (e.g., communication component 602, aggregator component 604, monitor component 606, . . . , model management component 618) can comprise software instructions that can be stored in the data store 636 and executed by the processor component 634. The modeler component 600 also can interact with other hardware and/or software components not depicted in FIG. 6. For example, the processor component 634 can interact with one or more external user interface devices, such as a keyboard, a mouse, a display monitor, a touchscreen, or other such interface devices.

Figure 7:
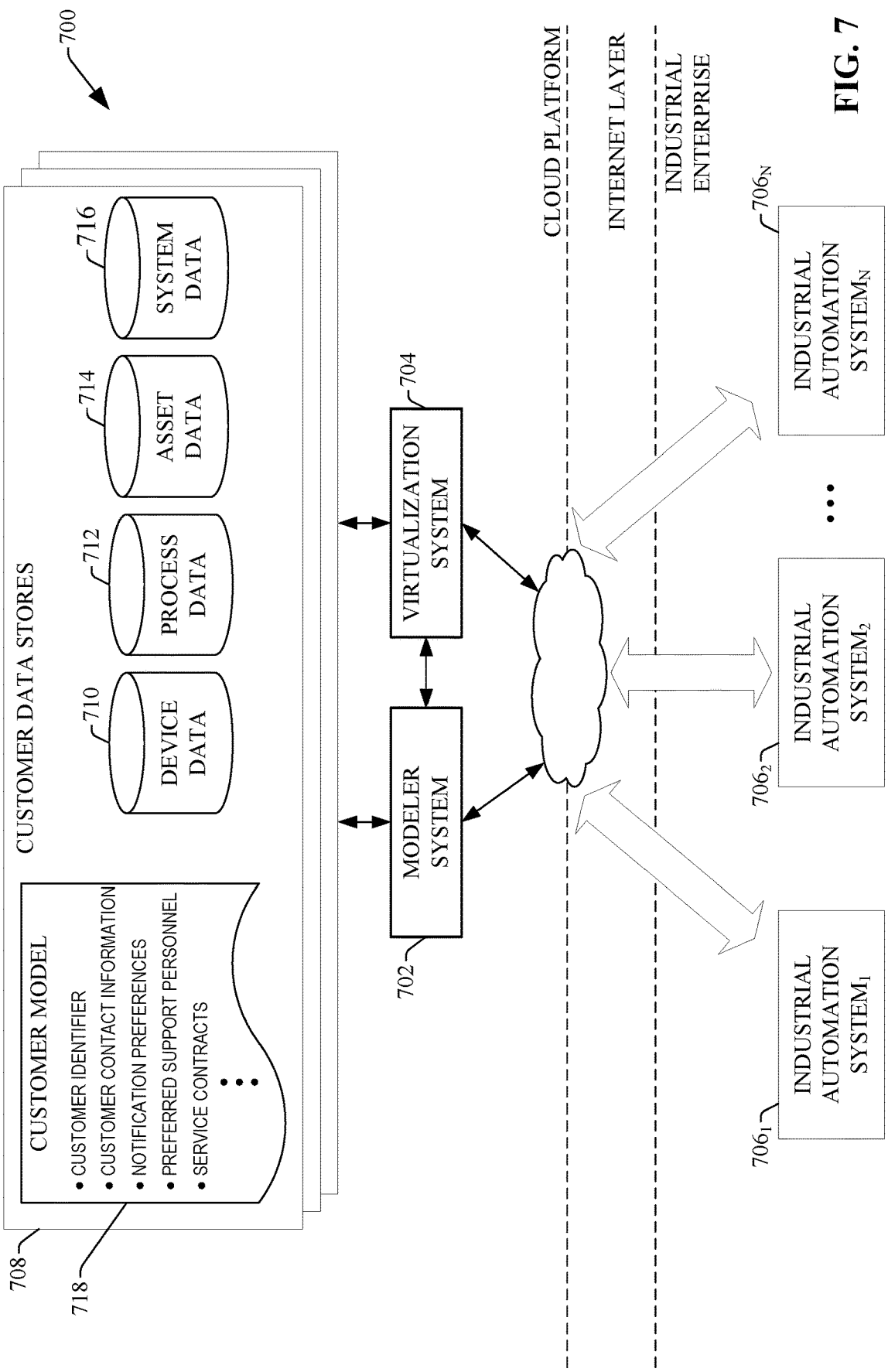
FIG. 7 illustrates a diagram of an example system that can facilitate generation of a model of an industrial automation system or a virtualized industrial automation system that can be representative of the industrial automation system, and the performance of other model-related or virtualization-related services based at least in part collection of customer-specific industrial data by a cloud-based model system or virtualization system, in accordance with various aspects and embodiments of the disclosed subject matter.

FIG. 7 illustrates a diagram of an example system 700 that can facilitate generation of a model of an industrial automation system or a virtualized industrial automation system that can be representative of the industrial automation system, and the performance of other model-related or virtualization-related services based at least in part collection of customer-specific industrial data by a cloud-based model system or virtualization system, in accordance with various aspects and embodiments of the disclosed subject matter. The system 700 can include a modeler system 702 and a virtualization system 704 that respectively can execute as cloud-based services on a cloud platform (e.g., cloud platform 502 of FIG. 5), and can collect data from multiple industrial automation systems, such as industrial automation systems $706_1$, industrial automation system$_2$ $706_2$, and/or (up through) industrial automation system$_N$ $706_N$. The industrial automation systems (e.g., $706_1$, $706_2$, $706_N$) can comprise different industrial automation systems within a given facility and/or different industrial facilities at diverse geographical locations. Industrial automation systems (e.g., $706_1$, $706_2$, $706_N$) also can correspond to different business entities (e.g., different industrial enterprises or customers), wherein the modeler system 702 or virtualization system 704 can collect and maintain a distinct customer data store 708 for each customer or business entity.

The modeler system 702 or virtualization system 704 can organize manufacturing data collected from the industrial automation systems (e.g., $706_1$, $706_2$, $706_N$) according to various classes. In the illustrated example, manufacturing data can be classified according to device data 710, process data 712, asset data 714, and system data 716.

Figure 8:
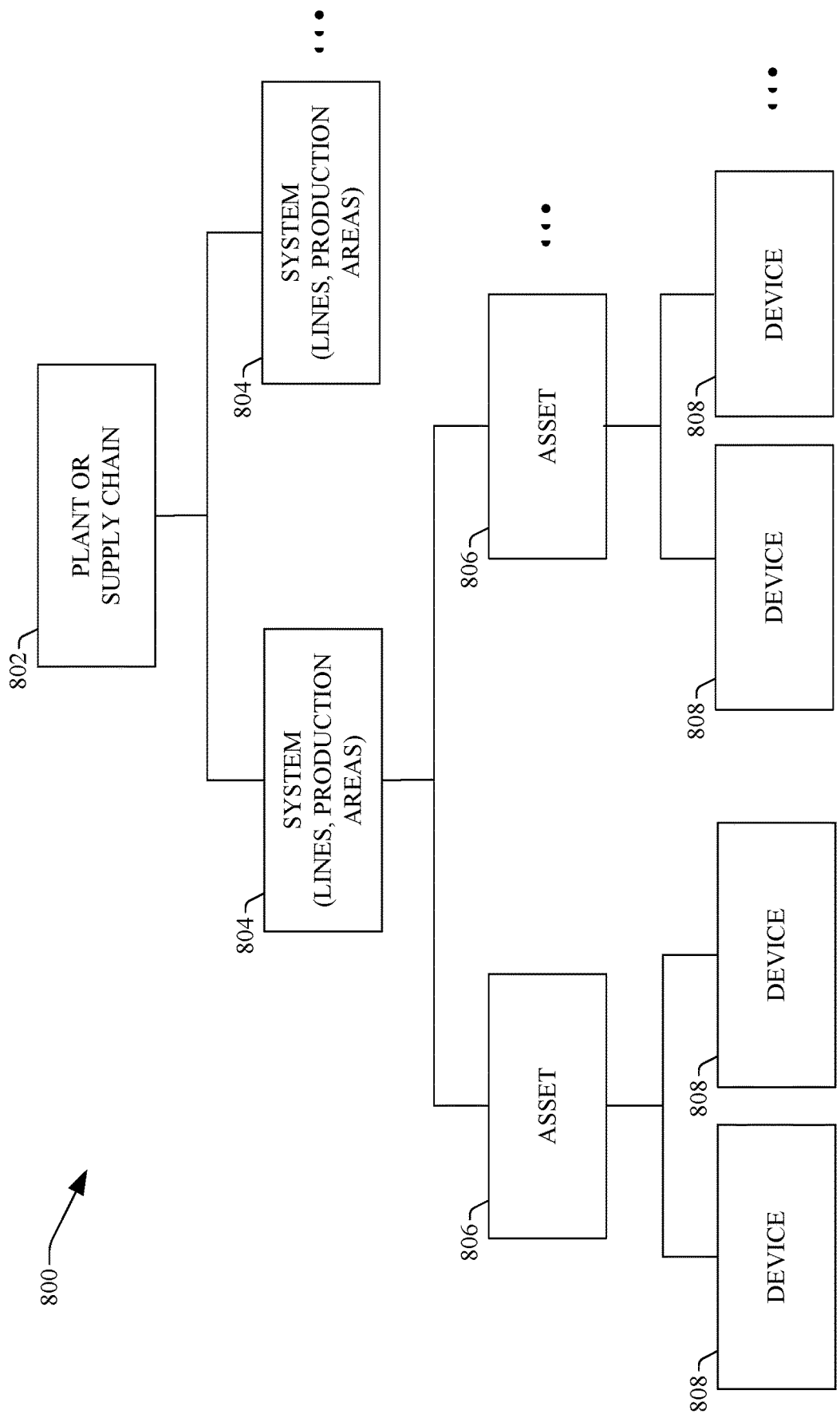
FIG. 8 illustrates a diagram of an example hierarchical relationship between these example data classes.

Referring briefly to FIG. 8, FIG. 8 illustrates a diagram of an example hierarchical relationship 800 between these example data classes. A given plant or supply chain 802 can comprise one or more industrial automation systems 804. The industrial automation systems 804 can represent the production lines or productions areas within a given plant facility or across multiple facilities of a supply chain. Each industrial automation system 804 can comprise a number of assets 806 that can represent the machines and equipment that make up the industrial automation system (e.g., the various stages of a production line). In general, each asset 806 can comprise one or more industrial devices 808, which can include, for example, the programmable controllers, motor drives, HMIs, sensors, meters, etc. comprising the asset 806. The various data classes depicted in FIGS. 7 and 8 are only intended to be exemplary, and it is to be appreciated that any organization of industrial data classes maintained by the modeler system 702 or virtualization system 704 is within the scope of one or more embodiments of the disclosed subject matter.

Returning again to FIG. 7 (along with FIG. 8), the modeler system 702 or virtualization system 704 can collect and maintain data from the various devices and assets that make up the industrial automation systems 804 and can classify the data according to the aforementioned classes for the purposes of facilitating analysis of the data, generation of models of the industrial automation systems (e.g., $706_1$, $706_2$, $706_N$), and/or performing other operations by the modeler system 702 or virtualization system 704. Device data 710 can comprise device-level information relating to the identity, configuration, and status of the respective devices comprising the industrial automation systems (e.g., $706_1$, $706_2$, $706_N$), including but not limited to device identifiers, device statuses, current firmware versions, health and diagnostic data, device documentation, identification and relationship of neighboring devices that interact with the device, etc.

The process data 712 can comprise information relating to one or more processes or other automation operations carried out by the devices; e.g., device-level and process-level faults and alarms, process variable values (speeds, temperatures, pressures, etc.), and the like.

The asset data 714 can comprise information generated, collected, determined, or inferred based on data that can be aggregated from various (e.g., multiple) industrial devices over time, which can yield higher asset-level views of the industrial automation systems (e.g., $706_1$, $706_2$, $706_N$). Example asset data 714 can include performance indicators (KPIs) for the respective assets, asset-level process variables, faults, alarms, etc. Since the asset data 714 can yield a relatively longer term view of asset characteristics relative to the device and process data, the modeler system 702 or virtualization system 704 can leverage the asset data 714 to facilitate identifying operational patterns and correlations unique to each asset, among other types of analysis, and this can facilitate generating respective modeling assets or virtualization assets that can correspond to the respective assets, and generating, updating, using, customizing, etc., of model or a virtualized industrial automation system of the industrial control system based at least in part on the respective models or virtualizations of the respective assets associated with the industrial control system.

The system data 716 can comprise collected, determined, or inferred information that can be generated based on data that can be aggregated from various (e.g., multiple) assets over time. The system data 716 can characterize system behavior within a large system of assets, yielding a system-level view of each of the industrial automation systems (e.g., $706_1$, $706_2$, $706_N$). The system data 716 also can document the particular system configurations in use and industrial operations performed at each of the industrial automation systems (e.g., $706_1$, $706_2$, $706_N$). For example, the system data 716 can document the arrangement of assets, interconnections between devices, the product being manufactured at a given facility, an industrial process performed by the assets, a category of industry of each industrial system (e.g., automotive, oil and gas, food and drug, marine, textiles, etc.), or other relevant information. Among other functions, this data can be accessed by technical support personnel during a support session so that particulars of the customer's unique system and device configurations can be obtained without reliance on the customer to possess complete knowledge of their assets.

As an example, a given industrial facility can include a packaging line (e.g., the system), which in turn can comprise a number of individual assets (e.g., a filler, a labeler, a capper, a palletizer, etc.). Each asset can comprise a number of devices (e.g., controllers, variable frequency drives, HMIs, etc.). Using an architecture similar to that depicted in FIG. 5, the modeler system 702 or virtualization system 704 can collect industrial data from the individual devices during operation and can classify the data in the customer data store 708 according to the aforementioned classifications. Note that some data may be duplicated across more than one class. For example, a process variable classified under process data 712 also can be relevant to the asset-level view of the system represented by the asset data 714. Accordingly, such process variables can be classified under both classes. Moreover, subsets of data in one classification can be derived, determined, or inferred based on data under another classification. For example, subsets of system data 716 that can characterize certain system behaviors can be derived, determined, or inferred based on a long-term analysis of data in the lower-level classifications.

In addition to maintaining the data classes (e.g., 710, 712, 714, 716), each customer data store also can maintain a customer model 718 that can contain data specific to a given industrial entity or customer. The customer model 718 can contain customer-specific information and preferences, which can be leveraged by (e.g., used by) the modeler system 702 or virtualization system 704 to facilitate generating or updating a model of an industrial automation system, generating or updating a virtualized industrial automation system that can represent an industrial automation system, remotely interacting with (e.g., monitoring, tracking, controlling, etc.) an industrial automation system using an associated virtualized industrial automation system, customizing a view of and/or a data overlay associated with a virtualized industrial automation system for a user, sharing a customized view of and/or a customized data overlay associated with a virtualized industrial automation system for a user, processing virtual notes, generating a simulation model of an industrial automation system, performing simulation operations using simulation models, and/or performing other operations in connection with the industrial automation system, etc. Example information that can be maintained in the customer model 718 can include a client identifier, client preferences or requirements with regard to production or work orders associated with an industrial automation system, client contact information specifying which plant personnel are to be notified in response to results of a response of the industrial automation system to a user interaction with an associated model or virtualized industrial automation system, notification preferences that can specify how plant personnel are to be notified (e.g., email, mobile phone, text message, etc.), service contracts that are active between the customer and the technical support entity, and other such information. The modeler system 702 or virtualization system 704 can marry (e.g., associate, link, unite, map, etc.) data collected for each customer with the corresponding customer model 718 for identification and event handling purposes.

As noted above, industrial data can be migrated (e.g., communicated) from industrial devices to the cloud platform (e.g., comprising the modeler system 702 and virtualization system 704) using cloud gateway components. To this end, some devices can include integrated cloud gateways that can directly interface each device to the cloud platform. Additionally or alternatively, some configurations can utilize a cloud proxy device that can collect industrial data from multiple devices associated with the industrial automation systems (e.g., 706₁, 706₂, 706_N) and can send (e.g., transmit) the data to the cloud platform. Such a cloud proxy can comprise a dedicated data collection device, such as a proxy server that can share a network (e.g., communication network) with the industrial devices. Additionally or alternatively, the cloud proxy can be a peer industrial device that can collect data from other industrial devices.

Figure 9:
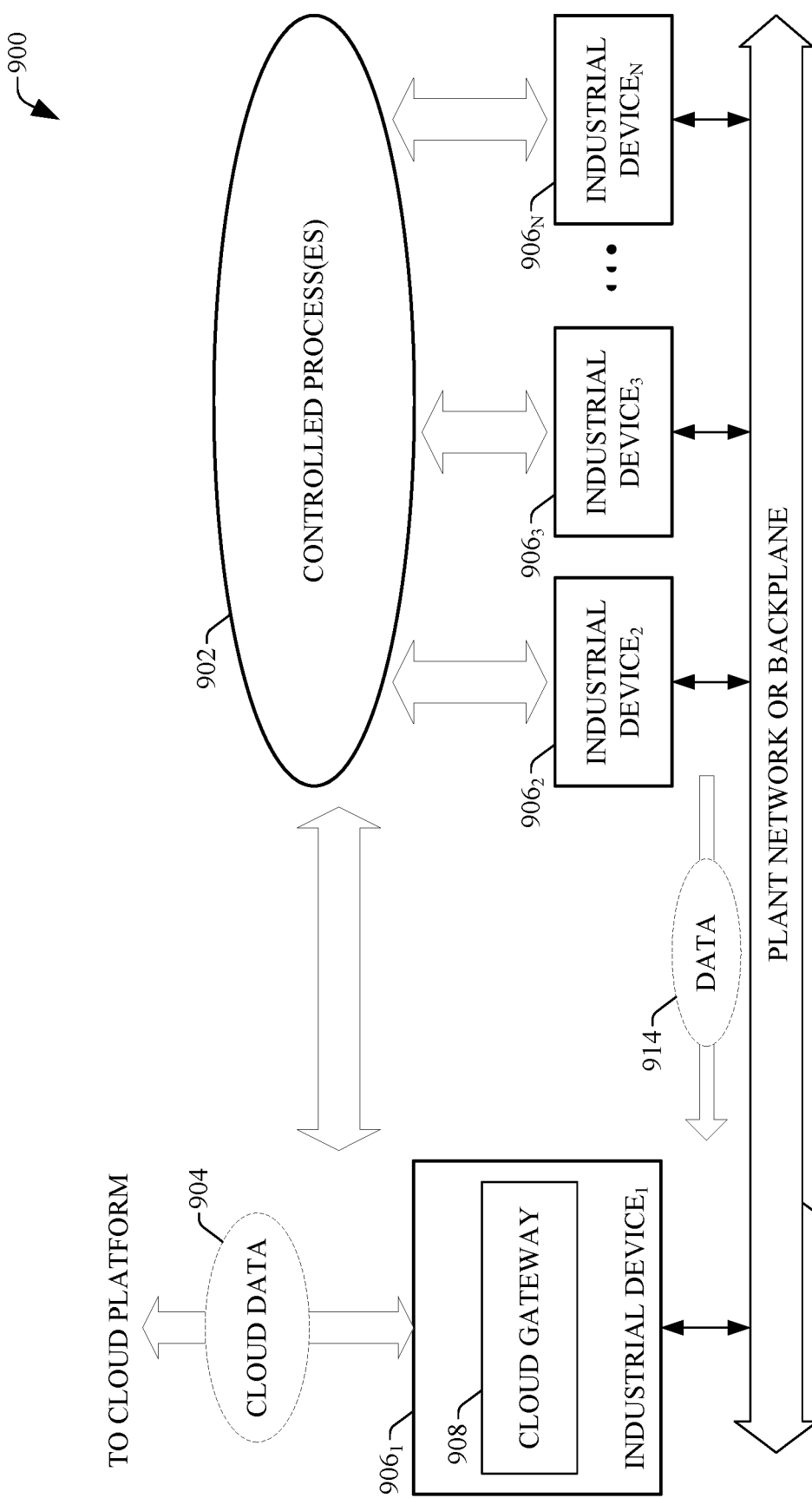
FIG. 9 depicts a block diagram of an example system that can be configured to comprise an industrial device that can act or operate as a cloud proxy for other industrial devices of an industrial automation system to facilitate migrating industrial data to the cloud platform for classification and analysis by a modeler system and a virtualization system, in accordance with various aspects and implementations of the disclosed subject matter.
Figure 10:
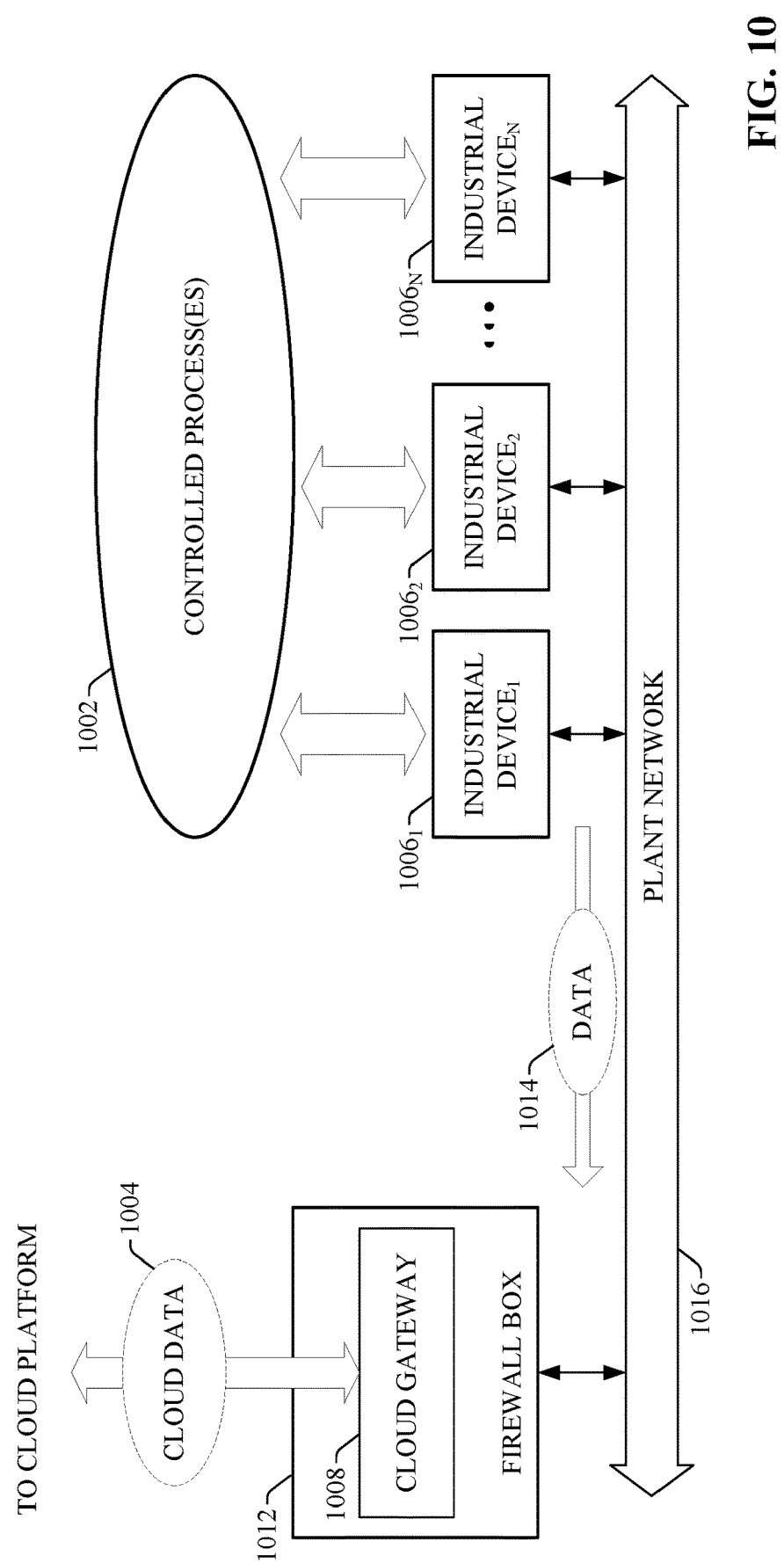
FIG. 10 illustrates a block diagram of an example system that can employ a firewall box that can serve as a cloud proxy for a set of industrial devices to facilitate migrating industrial data to the cloud platform for classification and analysis by a modeler system and a virtualization system, in accordance with various aspects and implementations of the disclosed subject matter.

FIGS. 9 and 10 depict block diagrams of example systems 900 and 1000, respectively, illustrating respective techniques that can facilitate migrating industrial data to the cloud platform via proxy devices for classification and analysis by a modeler system (e.g., comprising a modeler component) and a virtualization system (e.g., comprising a virtualization component), in accordance with various aspects and implementations of the disclosed subject matter. FIG. 9 depicts the system 900 that can be configured to comprise an industrial device that can act or operate as a cloud proxy for other industrial devices of an industrial automation system. The industrial automation system can comprise a plurality of industrial devices, including industrial device₁ 906₁, industrial device₂ 906₂, industrial device₃ 906₃, and/or (up through) industrial device_N 906_N, that collectively can monitor and/or control one or more controlled processes 902. The industrial devices 906₁, 906₂, 906₃, and/or (up through) 906_N respectively can generate and/or collect process data relating to control of the controlled process(es) 902. For industrial controllers such as PLCs or other automation controllers, this can include collecting data from telemetry devices connected to an industrial controller's I/O, generating data internally based on measured process values, etc.

In the configuration depicted in FIG. 9, industrial device₁ 906₁ can act, operate, or function as a proxy for industrial devices 906₂, 906₃, and/or (up through) 906_N, whereby the data 914 from devices 906₂, 906₃, and/or (up through) 906_N can be sent (e.g., transmitted) to the cloud via proxy industrial device₁ 906₁. Industrial devices 906₂, 906₃, and/or (up through) 906_N can deliver their respective data 914 to the proxy industrial device₁ 906₁ over the plant network or backplane 912 (e.g., a Common Industrial Protocol (CIP) network or other suitable network protocol). Using such a configuration, as desired, one industrial device can be interfaced to the cloud platform (via cloud gateway component 908). In some embodiments, the cloud gateway component 908 can perform preprocessing on the gathered data prior to migrating the data to the cloud platform (e.g., time stamping, filtering, formatting, normalizing, summarizing, compressing, etc.). The collected and processed data can be pushed (e.g., transmitted) to the cloud platform as cloud data 904 via cloud gateway component 908. Once migrated to the cloud platform, the cloud-based modeler system or virtualization system can classify the data according to the example classifications described herein and/or can utilize the data to facilitate performing various operations relating to generating or updating models of industrial automation systems, generating or updating virtualized industrial automation systems and using virtualized industrial automation systems (e.g., to facilitate remotely interacting with and/or controlling operation of associated industrial automation systems).

While the proxy device illustrated in FIG. 9 is depicted as an industrial device that itself can perform monitoring, tracking, and/or controlling of a portion of controlled process(es) 902, other types of devices also can be configured to serve as cloud proxies for multiple industrial devices according to one or more implementations of the disclosed subject matter. For example, FIG. 10 illustrates an example system 1000 that can comprise a firewall box 1012 that can serve as a cloud proxy for a set of industrial devices 1006₁, 1006₂, and/or (up through) 1006_N. The firewall box 1012 can act as a network infrastructure device that can allow the plant network 1016 to access an outside network such as the Internet, while also providing firewall protection that can prevent unauthorized access to the plant network 1016 from the Internet. In addition to these firewall functions, the firewall box 1012 can include a cloud gateway component 1008 that can interface the firewall box 1012 with one or more cloud-based services (e.g., model-related services, virtualization-related services, data collection services, data storage services, etc.). In a similar manner to the proxy industrial device 906₁ of FIG. 9, the firewall box 1012 of FIG. 10 can collect industrial data 1014 from including industrial devices 1006₁, industrial device₂ 1006₂, and/or (up through) industrial device_N 1006_N, which can monitor and control respective portions of controlled process(es) 1002. Firewall box 1012 can include a cloud gateway component 1008 that can apply appropriate pre-processing to the gathered industrial data 1014 prior to pushing (e.g., communicating) the data to the cloud-based modeler system or virtualization system as cloud data 1004. Firewall box 1012 can allow industrial devices 1006₁, 1006₂, and/or (up through) 1006_N to interact with the cloud platform without directly exposing the industrial devices to the Internet.

In some embodiments, the cloud gateway 908 of FIG. 9 or cloud gateway 1008 of FIG. 10 can tag the collected industrial data (e.g., 914 or 1014) with contextual metadata prior to pushing the data as cloud data (e.g., 904 or 1004) to the cloud platform. Such contextual metadata can include, for example, a time stamp, a location of the device at the time the data was generated, or other contextual information. In another example, some cloud-aware devices can comprise smart devices capable of determining their own context within the plant or enterprise environment. Such devices can determine their location within a hierarchical plant context or device topology. Data generated by such devices can adhere to a hierarchical plant model that can define multiple hierarchical levels of an industrial enterprise (e.g., a workcell level, a line level, an area level, a site level, an enterprise level, etc.), such that the data can be identified (e.g., by the modeler system or virtualization system) in terms of these hierarchical levels. This can allow a common terminology to be used across an entire industrial enterprise to identify devices and their associated data. Cloud-based applications and services that model an enterprise according to such an organizational hierarchy can represent industrial controllers, devices, machines, or processes as data structures (e.g., type instances) within this organizational hierarchy to provide context for data generated by respective devices within the enterprise relative to the enterprise as a whole. Such a convention can replace the flat name structure that is employed by some industrial applications.

In some embodiments, the cloud gateway 908 of FIG. 9 or cloud gateway component 1008 of FIG. 10 can comprise uni-directional "data only" gateways that can be configured only to move data from the premises (e.g., industrial facility)

to the cloud platform. Alternatively, the cloud gateway components 908 and 1008 can comprise bi-directional "data and configuration" gateways that additionally can be configured to receive configuration or instruction data from services running on the cloud platform. Some cloud gateways can utilize store-and-forward technology that can allow the gathered industrial data (e.g., 914 or 1014) to be temporarily stored locally on storage associated with the cloud gateway component (e.g., 908 or 1008) in the event that communication between a gateway and the cloud platform is disrupted. In such events, the cloud gateway component (e.g., 908 or 1008) can forward (e.g., communicate) the stored data to the cloud platform when the communication link is re-established.

To ensure a rich and descriptive set of data for analysis purposes, the cloud-based modeler system or virtualization system can collect device data in accordance with one or more standardized device models. To this end, a standardized device model can be developed for each industrial device. Device models can profile the device data that is available to be collected and maintained by the modeler system or virtualization system.

Figure 11:
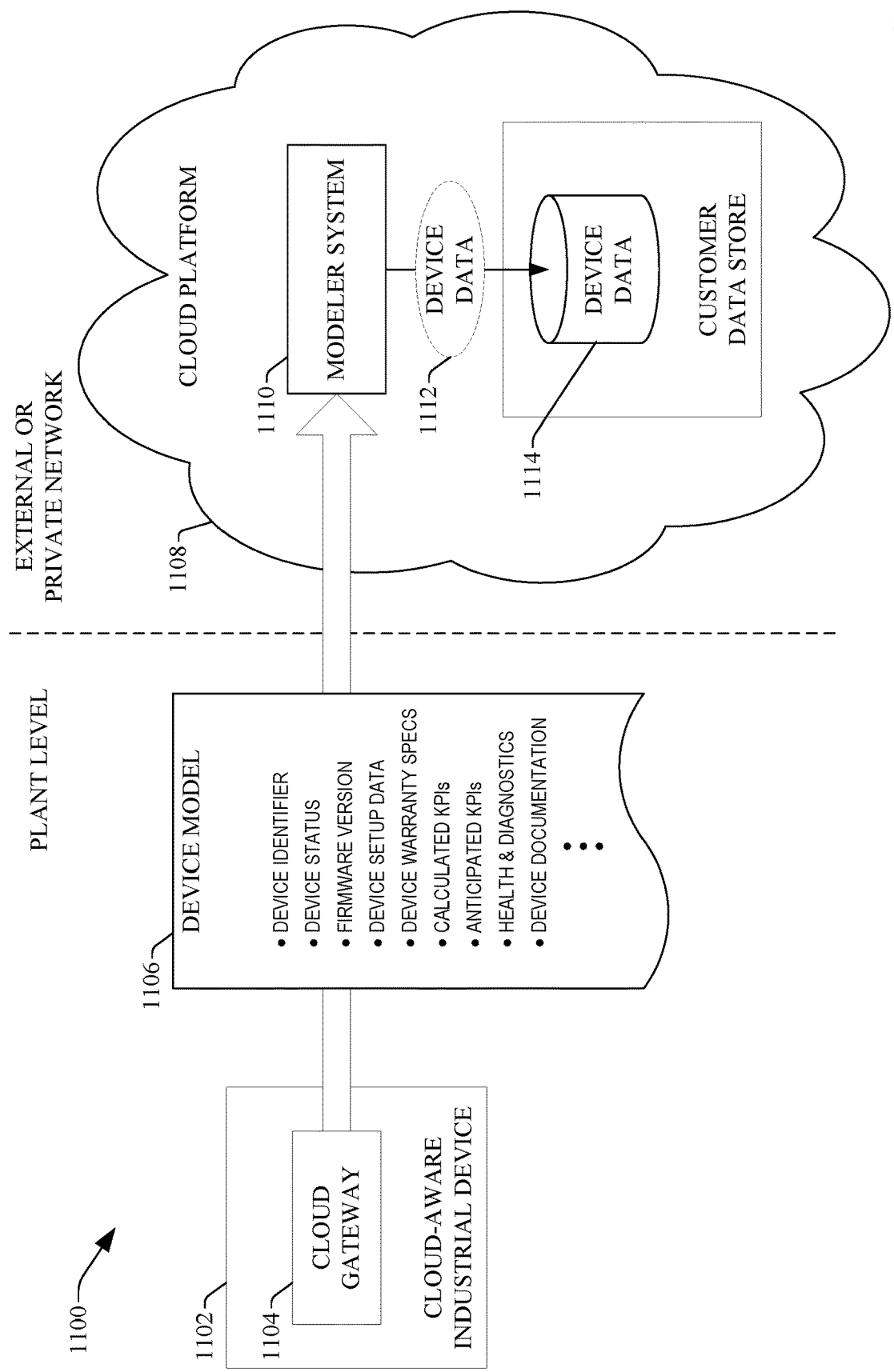
FIG. 11 illustrates a block diagram of an example device model according to various aspects and implementations of the disclosed subject matter.

FIG. 11 illustrates a block diagram of an example device model 1100 according to various aspects and implementations of the disclosed subject matter. In the illustrated example model 1100, the device model 1106 can be associated with a cloud-aware industrial device 1102 (e.g., a programmable logic controller, a variable frequency drive, an HMI, a vision camera, a barcode marking system, etc.). As a cloud-aware device, the industrial device 1102 can be configured to automatically detect and communicate with the cloud platform 1108 upon installation at a plant facility, simplifying integration with existing cloud-based data storage, analysis, and applications (e.g., as performed by the virtualization system described herein). When added to an existing industrial automation system, the industrial device 1102 can communicate with the cloud platform and can send identification and configuration information in the form of the device model 1106 to the cloud platform 1108. The device model 1106 can be received by the modeler system 1110 (or virtualization system (not shown in FIG. 11)), which can update the customer's device data 1114 based on the device model 1106. In this way, the modeler system 1110 (or virtualization system) can leverage the device model 1106 to facilitate integrating the new industrial device 1102 into the greater system as a whole. This integration can include the modeler system 1110 (or virtualization system) updating cloud-based applications or services to recognize the new industrial device 1102, adding the new industrial device 1102 to a dynamically updated data model of the customer's industrial enterprise or plant, modifying a model to integrate, incorporate, or include a model of the new industrial device 1102 based at least in part on the identification and configuration information (or other data), or modifying a virtualization industrial automation system associated with the industrial automation system to integrate, incorporate, or include a virtualized version of the new industrial device 1102 based at least in part on the identification and configuration information (or other data), determining or predicting a response of the modified industrial automation system based at least in part on a modified model or modified simulation model that integrates the new industrial device 1102, making other devices on the plant floor aware of the new industrial device 1102, or other desired integration functions. Once deployed, some data items comprising the device model 1106 can be collected and monitored by the modeler system 1110 (or virtualization system) on a real-time or near real-time basis.

The device model 1106 can comprise such information as a device identifier (e.g., model and serial number) associated with the industrial device 1102, status information for the industrial device 1102, a currently installed firmware version associated with the industrial device 1102, device setup data associated with the industrial device 1102, warranty specifications associated with the industrial device 1102, calculated and/or anticipated KPIs associated with the industrial device 1102 (e.g., mean time between failures), health and diagnostic information associated with the industrial device 1102, device documentation, or other such parameters.

Figure 12:
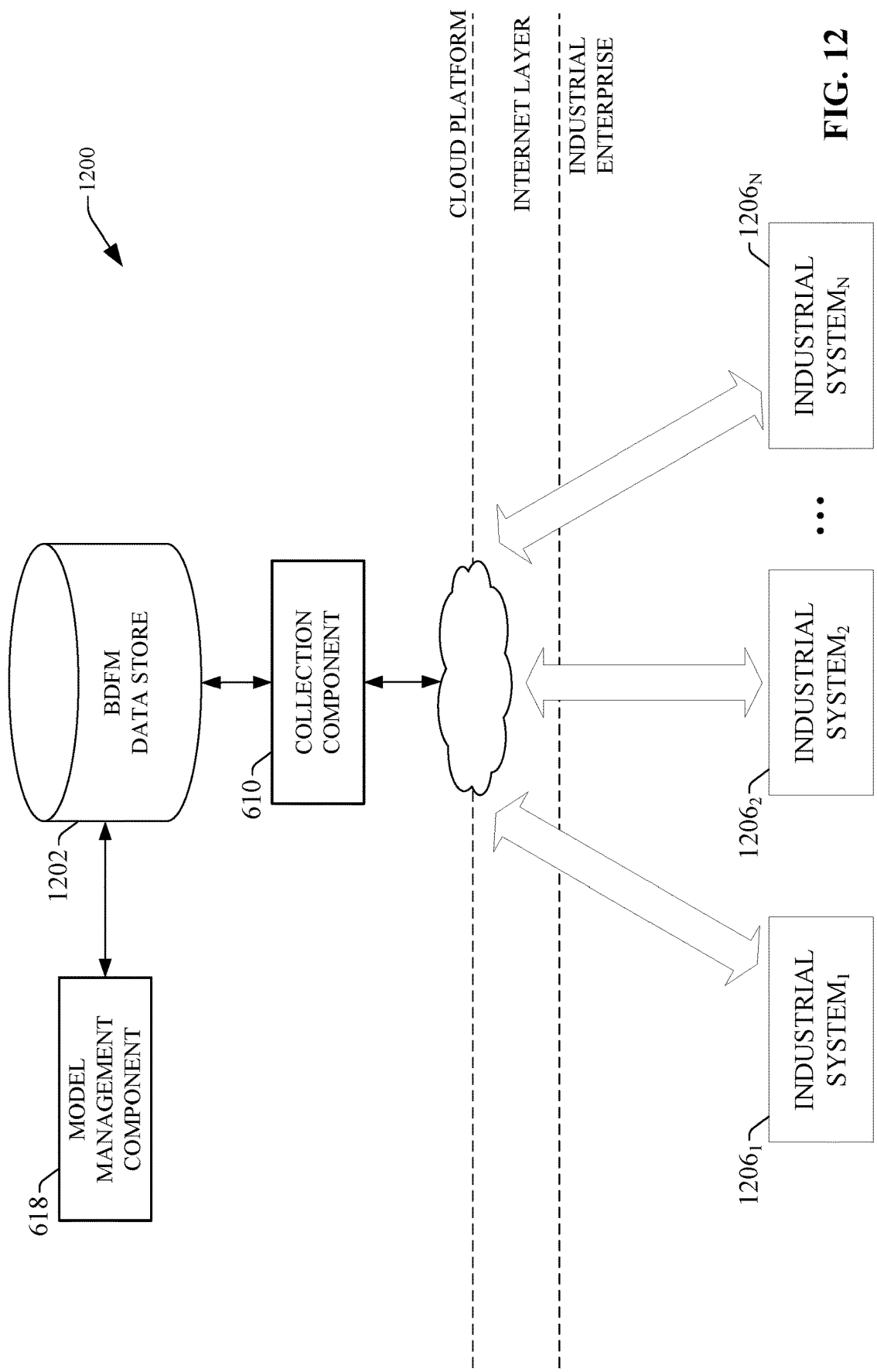
FIG. 12 presents a block diagram of an example system that can facilitate collection of data from devices and assets associated with respective industrial automation systems for storage in cloud-based data storage, in accordance with various aspects and implementations of the disclosed subject matter.

In addition to maintaining individual customer-specific data stores for each industrial enterprise, the virtualization system (e.g., cloud-based virtualization system) also can feed (e.g., transmit) sets of customer data to a global data storage (referred to herein as cloud-based data store or Big Data for Manufacturing (BDFM) data store) for collective big data analysis in the cloud platform (e.g., by the virtualization system). FIG. 12 presents a block diagram of an example system 1200 that can facilitate collection of data from devices and assets associated with respective industrial automation systems for storage in cloud-based data storage, in accordance with various aspects and implementations of the disclosed subject matter. As illustrated in FIG. 12, the collection component 610 of the modeler system (e.g., as facilitated by the interface component 612) can collect data from devices and assets comprising respective different industrial automation systems, such as industrial automation systems $1206_1$, industrial automation system$_2$ $1206_2$, and/or (up through) industrial automation system$_N$ $1206_N$, for storage in a cloud-based BDFM data store 1202. In some embodiments, data maintained in the BDFM data store 1202 can be collected anonymously with the consent of the respective customers. For example, customers can enter into a service agreement with a technical support entity whereby the customer can agree to have their device and asset data collected by the virtualization system in exchange for virtualization-related services or a credit towards virtualization-related services. The data maintained in the BDFM data store 1202 can include all or portions of the classified customer-specific data described in connection with FIG. 7, as well as additional data (e.g., derived, determined, or inferred data). The modeler component 600 (e.g., aggregator component 604, model management component 618, etc.) or another component of the modeler system can organize the collected data stored in the BDFM data store 1202 according to device type, system type, application type, applicable industry, or other relevant categories. The model management component 618 can analyze data stored in the resulting multi-industry, multi-customer data store (e.g., BDFM data store 1202) to facilitate learning, determining, or identifying industry-specific, device-specific, and/or application-specific trends, patterns, thresholds (e.g., device-related thresholds, network-related thresholds, etc.), industrial-automation-system interrelationships between devices or assets, etc., associated with the industrial automation systems associated with the cloud platform. In general, the model management component 618 can perform a data analysis (e.g., big data analysis) on data (e.g., the multi-industrial enterprise data) maintained (e.g., stored in) the BDFM data store 1202 to facilitate learning, determining, identifying, characterizing, virtualizing, simulating, and/or emulating operational industrial-automation-system interrelationships, thresholds, trends, or patterns associated with industrial automation systems as a function of industry type, application type, equipment in use, asset configurations, device configuration settings, or other types of variables.

For example, it can be known that a given industrial asset (e.g., a device, a configuration of device, a machine, etc.) can be used across different industries for different types of industrial applications. Accordingly, the model management component 618 can identify a subset of the global data stored in BDFM data store 1202 relating to the asset or asset type, and perform analysis on this subset of data to determine how the asset or asset type performs over time and under various types of operating conditions for each of multiple different industries or types of industrial applications. The model management component 618 also can determine the operational behavior of the asset or asset type over time and under various types of operating conditions for each of different sets of operating constraints or parameters (e.g. different ranges of operating temperatures or pressures, different recipe ingredients or ingredient types, etc.). The model management component 618 can leverage (e.g., use) a large amount of historical data relating to the asset or asset type that has been gathered (e.g., collected and/or aggregated) from many different industrial automation systems to facilitate learning or determining common operating characteristics of many diverse configurations of industrial assets or asset types at a relatively high degree of granularity and under many different operating contexts. The model management component 618 can use the learned or determined operating characteristics relating to the industrial assets or asset types to facilitate generating, updating, and/or using modeled versions or virtualized versions of the industrial assets or asset types when employed in an industrial automation system to facilitate generating, updating, and/or using a model of an industrial automation component or a virtualized industrial automation system that can be based at least in part on the modeled or virtualized versions of the industrial assets or asset types.

Figure 13:
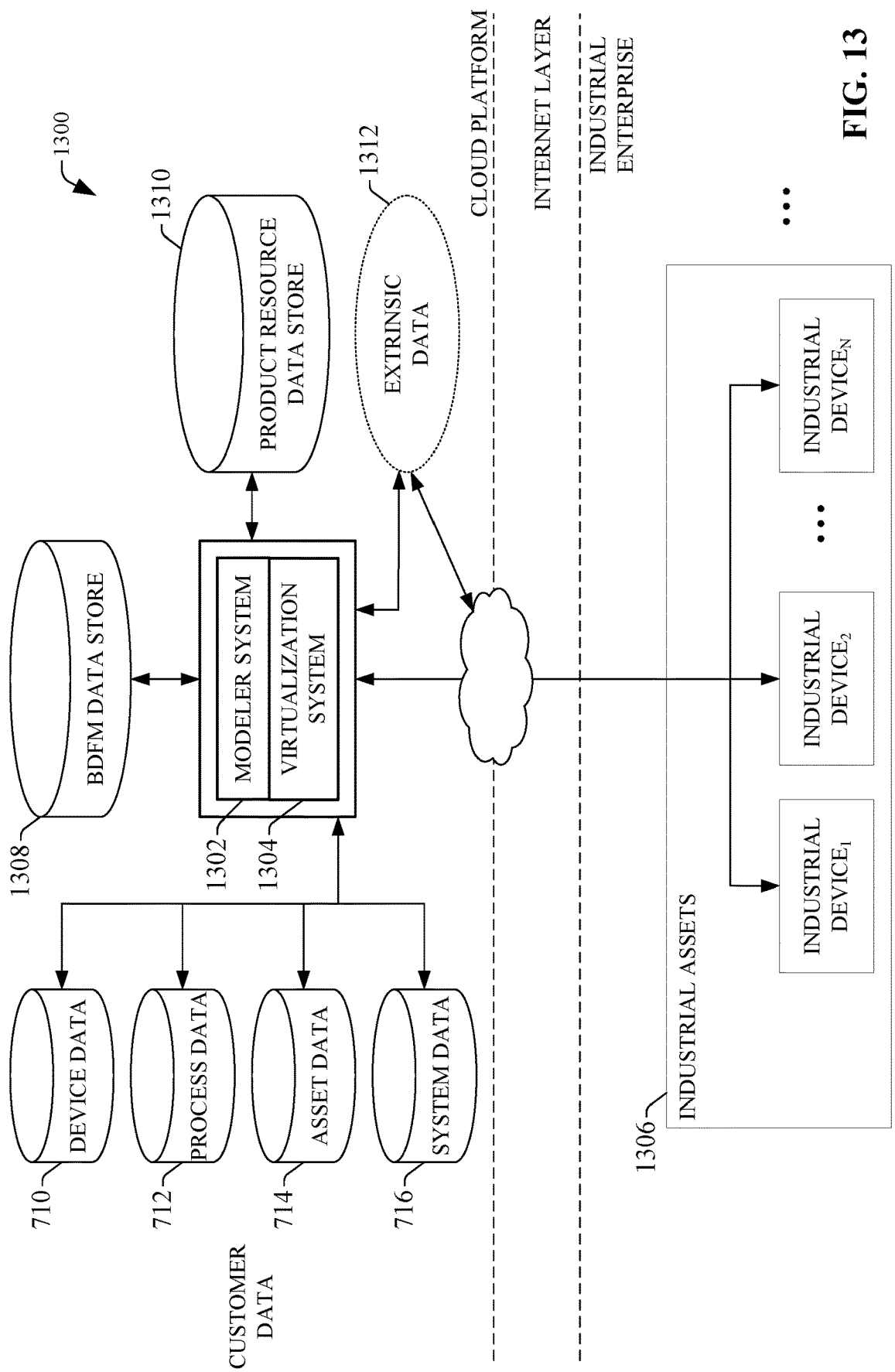
FIG. 13 illustrates a block diagram of a cloud-based system that can employ a modeler system and virtualization system to facilitate performing or providing model-related services and virtualization-related services associated with industrial automation systems, in accordance with various aspects and embodiments of the disclosed subject matter.

FIG. 13 illustrates a block diagram of a cloud-based system 1300 that can employ a modeler system and virtualization system to facilitate performing or providing model-related services and virtualization-related services associated with industrial automation systems, in accordance with various aspects and embodiments of the disclosed subject matter. As disclosed herein, the modeler system 1302 and virtualization system 1304 can collect, maintain, and monitor customer-specific data (e.g. device data 710, process data 712, asset data 714, and system data 716) relating to one or more industrial assets 1306 of an industrial enterprise. In addition, the modeler system 1302 and virtualization system 1304 can collect and organize industrial data anonymously (with customer consent) from multiple industrial enterprises, and can store such industrial data in a BDFM data store 1308 for collective analysis by the modeler system 1302 and/or virtualization system 1304, for example, as described herein.

The modeler system 1302 and virtualization system 1304 also can collect product resource information and maintain (e.g., store) the product resource information in the cloud-based product resource data store 1310. In general, the product resource data store 1310 can maintain up-to-date information relating to specific industrial devices or other vendor products in connection with industrial automation systems. Product data stored in the product resource data store 1310 can be administered by the modeler system 1302 and/or virtualization system 1304 and/or one or more product vendors or OEMs. Exemplary device-specific data maintained by the product resource data store 1310 can include product serial numbers, most recent firmware revisions, preferred device configuration settings and/or software for a given type of industrial application, or other such vendor-provided information.

The system depicted in FIG. 13 can provide model-related services and virtualization-related services to subscribing customers (e.g., owners of industrial assets 1306). For example, customers can enter an agreement with a product vendor or technical support entity to allow their system data to be gathered anonymously and fed into (e.g., communicated to and stored in) the BDFM data store 1308, and this thereby can expand the store of global data available for collective analysis by the modeler system 1302 and/or the virtualization system 1304. In exchange, the vendor or technical support entity can agree to provide model-related services and/or virtualization-related services (e.g., customized virtualization-related services) to the customer (e.g., real-time or near real-time system monitoring; real-time or near real-time generation, updating, and/or use of a model or a virtualized industrial automation system associated with an industrial automation system, etc.). Alternatively, the customer can subscribe to one or more available model-related services or virtualization-related services that can be provided by the modeler system 1302 or virtualization system 1304, and optionally can allow their system data to be maintained in the BDFM data store 1308. In some embodiments, a customer can be given an option to subscribe to model-related services or virtualization-related services without permitting their data to be stored in the BDFM data store 1308 for collective analysis with data from other systems (e.g., industrial automation systems). In such cases, the customer's data will only be maintained as customer data (e.g., in customer data store 708) for the purposes of real-time or near real-time generation, updating, and/or use of a model or a virtualized industrial automation system associated with an industrial automation system relating to that particular customer, and the collected customer data will be analyzed in connection with data stored in the BDFM data store 1308 and the product resource data store 1310 without that customer data being migrated for storage in the BDFM data store 1308 for long-term storage and analysis. In another exemplary agreement, customers can be offered a discount on model-related services or virtualization-related services in exchange for allowing their system data to be anonymously migrated to the BDFM data store 1308 for collective analysis by the modeler system 1302 or virtualization system 1304.

In accordance with various aspects, the customer-specific data can include device and/or asset level faults and alarms, process variable values (e.g., temperatures, pressures, product counts, cycle times, etc.), calculated or anticipated key performance indicators for the customer's various assets, indicators of system behavior over time, and other such information. The customer-specific data also can include documentation of firmware versions, configuration settings, and software in use on respective devices of the customer's industrial assets. Moreover, the modeler system 1302 or virtualization system 1304 can take into consideration customer information encoded in customer model 718, which can have a bearing on inferences made by the modeler system 1302 or virtualization system 1304 based at least in part on the analysis (e.g., big data analysis) stored in the BDFM data store 1308. For example, customer model 718 may indicate a type of industry that is the focus of the customer's business (e.g., automotive, food and drug, oil and gas, fibers and textiles, power generation, marine, etc.). Knowledge of the customer's industry can facilitate enabling the modeler system 1302 or virtualization system 1304 to correlate the customer-specific data with data relating to similar systems and applications in the same industry, as documented by the data stored in the BDFM data store 1308.

Taken together, customer-specific data and a customer model (e.g., 718) can facilitate accurately modeling the customer's industrial enterprise at a highly granular level, from high-level system behavior over time down to the device and software level. The analyzing (e.g., by the modeler system 1302 or virtualization system 1304) of this customer-specific data in view of global industry-specific and application-specific trends learned via analysis of data stored in the BDFM data store 1308, as well as vendor-provided device information maintained in the product resource data store 1310, can facilitate real-time or near real-time generation, updating, and/or use of a model or a virtualized industrial automation system associated with an industrial automation system to facilitate real-time or near real-time remote interaction with (e.g., monitoring, tracking, controlling, etc., of) the industrial automation system using the model or the virtualized industrial automation system (e.g., based at least in part on user interactions with the virtualized industrial automation system by a user via a communication device).

In some implementations, the system 1300 (e.g., via the collection component, modeler system 1302, or virtualization system 1304) also can receive, collect, or capture extrinsic data 1312 from one or more sources (e.g., external data sources). The modeler system 1302 or virtualization system 1304 can use or leverage the extrinsic data 1312 received, collected, or captured from sources external to a customer's industrial enterprise, wherein the extrinsic data 1312 can have relevance to operation of the customer's industrial automation system(s). Example extrinsic data 1312 can include, for example, energy cost data, material cost and availability data, transportation schedule information from companies that provide product transportation services for the customer, market indicator data, web site traffic statistics, information relating to known information security breaches or threats, or other information relevant to the operation of the customer's industrial automation system(s). The modeler system 1302 or virtualization system 1304 can retrieve extrinsic data 1312 from substantially any data source, such as, e.g., servers or other data storage devices linked to the Internet, cloud-based storage that maintains extrinsic data of interest, or other sources. The modeler system 1302 or virtualization system 1304 can analyze the extrinsic data 1312 and/or other data (e.g., user-related data associated with users (e.g., operators, managers, technicians, other workers) associated with the industrial automation system(s), device data 710, process data 712, asset data 714, system data 716, etc.) to facilitate performing virtualization-related or other services in connection with the industrial automation system(s).

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 14-20 illustrate various methods in accordance with one or more embodiments of the subject application. While, for purposes of simplicity of explanation, the one or more methods shown herein are shown and described as a series of acts, it is to be understood and appreciated that the disclosed subject matter is not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Furthermore, interaction diagram(s) may represent methods, in accordance with the subject disclosure when disparate entities enact disparate portions of the methods. Further yet, two or more of the disclosed example methods can be implemented in combination with each other, to accomplish one or more features or advantages described herein.

Figure 14:
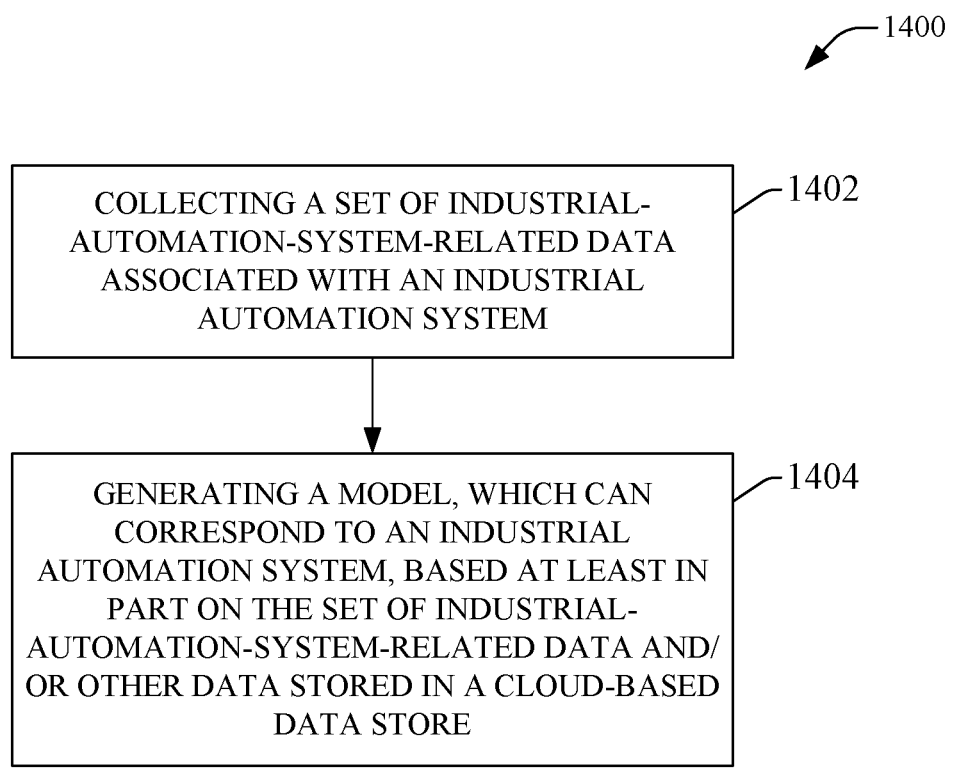
FIG. 14 illustrates a flow diagram of an example method that can facilitate generating and managing a model that can correspond to an industrial automation system associated with an industrial enterprise based at least in part on cloud-based data relating to the industrial enterprise, in accordance with various implementations and embodiments of the disclosed subject matter.

FIG. 14 illustrates a flow diagram of an example method 1400 that can facilitate generating and managing a model that can correspond to an industrial automation system associated with an industrial enterprise based at least in part on cloud-based data relating to the industrial enterprise, in accordance with various implementations and embodiments of the disclosed subject matter. The method 1400 can be implemented by a modeler system that can comprise a modeler component that can comprise a collection component, a data store, and/or a model management component, etc. All or a desired portion of the modeler component can reside in a cloud platform.

At 1402, a set of industrial-automation-system-related data associated with an industrial automation system can be collected. The collection component can obtain, collect, or otherwise receive industrial-automation-system-related data and can store such data in a cloud-based data store. The collection component also can receive other data, including other industrial-automation-system-related data from another (e.g., a related) industrial automation system or one or more extrinsic data sources.

The set of industrial-automation-system-related data can comprise, for example, device-related data (e.g., industrial device-related data, network device-related data), asset-related data, process-related data (e.g., industrial-automation-process-related data), data relating to users associated with the industrial automation system (e.g., role information, user preferences, etc.), and/or other industrial-automation-system-related data associated with an industrial enterprise. The industrial-automation-system-related data can be migrated (e.g., communicated) to the cloud platform using one or more cloud gateways (e.g., communication gateway components) that can serve as uni-directional or bi-directional communication interfaces between industrial devices or assets of the industrial automation system and the cloud platform. The device-related data, asset-related data, process-related data, and/or other industrial-automation-system-related data can be stored in the cloud-based data store in association with identification information, such as, for example, a customer identifier and other customer-specific information.

At 1404, a model, which can correspond to an industrial automation system, can be generated based at least in part on the set of industrial-automation-system-related data and/or other data stored in a cloud-based data store, wherein all or a portion of the set of industrial-automation-system-related data can be received (e.g., collected, obtained, detected, etc.) from the industrial automation system and stored in the cloud-based data store. The model management component can access the cloud-based data store and can receive (e.g., collect, obtain, etc.) the set of industrial-automation-system-related data from the cloud-based data store. The model management component can analyze the set of industrial-automation-system-related data to generate analysis results. The model management component can generate, manage, modify, and/or update the model of the industrial automation system based at least in part on the results of the analysis of the set of industrial-automation-system-related data. For example, using the analysis results, the model management component can facilitate generating, managing, modifying, and/or updating the model of the industrialized automation system, based at least in part on the respective modeling of industrial devices, software and/or firmware configurations (including software or firmware revisions or updates) associated with industrial devices and/or other components of the industrial automation system, network-related devices (e.g., communication devices, computers, routers, etc.) associated with the industrial automation system, functional and communicative relationships between industrial devices, industrial processes, network-related devices, etc. (e.g., communication connections or conditions between industrial devices, types of connections between industrial devices, communication connections between industrial devices and network-related devices, etc.), mechanical or process properties or characteristics associated with industrial devices (e.g., mechanical latency, process cycle times, operating schedules, etc., associated with industrial devices), user behavior or interaction in connection with the industrial automation system (e.g., maintenance schedules, shift-specific or operator-specific behavior or interaction of operators with the industrial automation system), user behavior or interaction in connection with the model or associated virtualized industrial automation system (e.g., via a communication device of a user), production or process flows of the industrial automation system at particular times or in connection with particular projects, and/or other aspects or features of the industrial automation system.

Figure 15:
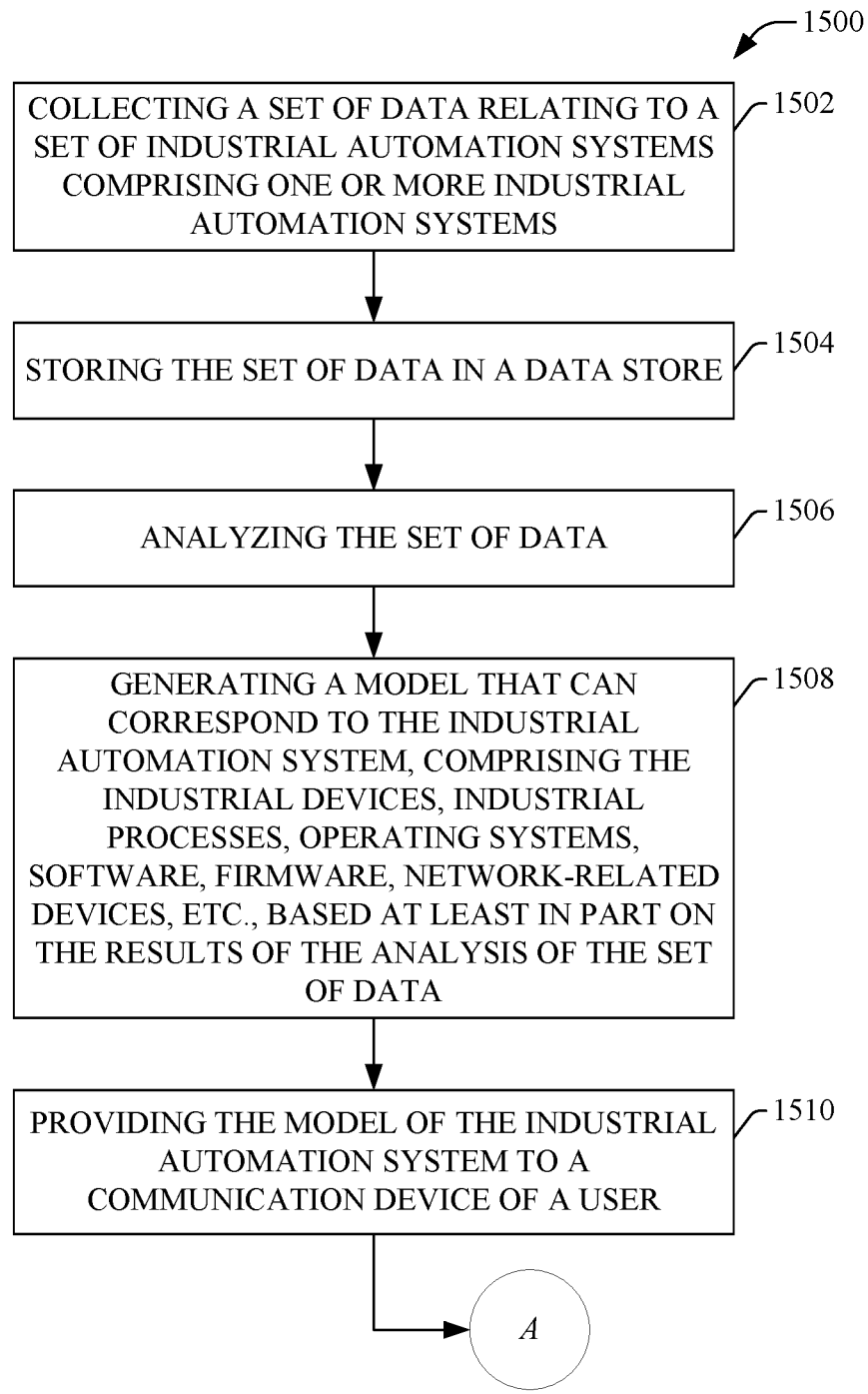
FIG. 15 depicts a flow diagram of another example method that can facilitate generating and managing a model that can correspond to an industrial automation system associated with an industrial enterprise based at least in part on cloud-based data relating to the industrial enterprise, in accordance with various implementations and embodiments of the disclosed subject matter.

FIG. 15 depicts a flow diagram of another example method 1500 that can facilitate generating and managing a model that can correspond to an industrial automation system associated with an industrial enterprise based at least in part on cloud-based data relating to the industrial enterprise, in accordance with various implementations and embodiments of the disclosed subject matter. The method 1500 can be implemented by a modeler system that can comprise a modeler component that can comprise a collection component, a data store, and/or a model management component, etc. All or a desired portion of the modeler component can reside in a cloud platform.

At 1502, a set of data (e.g., industrial-automation-system-related data) relating to a set of industrial automation systems comprising one or more industrial automation systems can be collected. The collection component can collect the set of data relating to the set of industrial automation systems. The set of data can comprise data relating to industrial devices, industrial processes, other industrial assets, and/or network-related devices, etc., associated with the one or more industrial automation systems of the set of industrial automation systems. The set of industrial automation systems can be associated with one or more industrial enterprises.

Respective subsets of the data can be obtained from respective industrial devices, industrial processes, other industrial assets, and/or network-related devices via one or more cloud gateway devices (e.g., respective cloud gateways integrated with the respective devices, processes, assets, etc.). For instance, the model management component can discover the respective industrial devices, industrial processes, other industrial assets, and/or network-related devices in the industrial automation system, and the respective industrial devices, industrial processes, other industrial assets, and/or network-related devices can provide their respective subsets of data via the one or more cloud gateway devices, in response to being polled (e.g., queried) by the model management component.

In some implementations, all or part of the modeler system can be located in a cloud platform. For example, modeler component, the collection component, the data store (e.g., cloud-based data store), the model management component, and/or another component(s) of the modeler system can be located in the cloud platform. In other implementations, certain components (e.g., model management component or collection component) can be located outside of the cloud platform and can access the cloud platform (e.g., the data store in the cloud platform) to facilitate analyzing the data in the data store to facilitate generating, managing, and/or updating a model that can correspond to, and interface or interact with, an industrial automation system of the set of industrial automation systems.

At 1504, the set of data can be stored in a data store. The collection component can facilitate storing the set of data in the data store, wherein the data store can be a cloud-based data store located in the cloud platform.

At 1506, the set of data can be analyzed. The model management component can access the cloud-based data store and can retrieve, obtain, read the set of data from the cloud-based data store. The model management component can analyze the set of data (e.g., perform big data analysis on the set of data) to facilitate generating, managing, and/or updating a model that can correspond to, and interface or interact with, an industrial automation system. The model management component can analyze the set of data to facilitate identifying or determining industrial devices, industrial processes, operating systems, software (e.g., software type, software version, software functions, software manufacturer, etc.), firmware (e.g., firmware type, firmware version, firmware functions, firmware manufacturer, etc.), network-related devices, etc., associated with the industrial automation system; identifying or determining configuration of the industrial devices, industrial processes, operating systems, software, firmware, and network-related devices, including the functional relationships or connections between respective industrial devices, industrial processes, operating systems, software, firmware, and network-related devices; respective properties or characteristics associated with the respective industrial devices, industrial processes, operating systems, software, firmware, and network-related devices; etc.

At 1508, a model that can correspond to (e.g., be a replication of) the industrial automation system, comprising the industrial devices, industrial processes, operating systems, software, firmware, network-related devices, etc., can be generated based at least in part on the results of the analysis of the set of data. The model management component can generate the model associated with the industrial automation system, including generating respectively modeled industrial devices, modeled industrial processes, modeled industrial assets, modeled network-related devices (e.g., modeled communication devices, computers, routers, etc.), modeled software and/or firmware configurations associated with the industrial devices and/or other components of the industrial automation system, modeled functional and communicative relationships between industrial devices, assets, or other components (e.g., modeled communication connections or conditions between industrial devices, types of connections between industrial devices, modeled communication connections between industrial devices and network-related devices, etc.), modeled mechanical or process properties or characteristics associated with industrial devices (e.g., modeled mechanical latency, modeled process cycle times, modeled operating schedules, etc., associated with industrial devices), modeled properties or characteristics associated with the network-related devices (e.g., modeled communication conditions, modeled total bandwidth, modeled available bandwidth, modeled wireless communications, modeled wireline communications, etc., associated with the network-related devices), and/or other aspects or features of the industrial automation system.

At 1510, the model of the industrial automation system can be provided (e.g., communicated, presented), for example, to a communication device of a user. The modeler component can provide the model of the industrial automation system, or a virtualized industrial automation system based on the model, to the communication device of the user via a communication network (e.g., a communication network comprising an IP-based network (e.g., Internet, intranet), a mobile core network, and/or a local area network (LAN)). The user can use the communication device to access and interact with the model or corresponding virtualized industrial automation system to facilitate performing various desired work tasks (e.g., remote viewing, remote controlling, troubleshooting, providing assistance) in connection with the industrial automation system, as more fully disclosed herein.

At this point, the method 1500 can proceed to reference point A, wherein, for example, from reference point A, as disclosed with regard to method 1600, a virtualized industrial automation system can be generated to facilitate performing various work tasks (e.g., remote viewing, remotely controlling, remotely troubleshooting, remotely providing assistance) in connection with the industrial automation system.

Information relating to the model of the industrial automation system can be stored in the cloud-based data store or another desired data store, wherein the modeler component or virtualization component can access data relating to the model from the cloud-based data store or other data store, and can use the data relating to the model to facilitate updating the model, generating a virtualized industrial automation system based on the model, performing work tasks in connection with the industrial automation system using the model or associated virtualized industrial automation system, and/or performing other operations in connection with the model, the virtualized industrial automation system, or the industrial automation system, as more fully disclosed herein.

Figure 16:
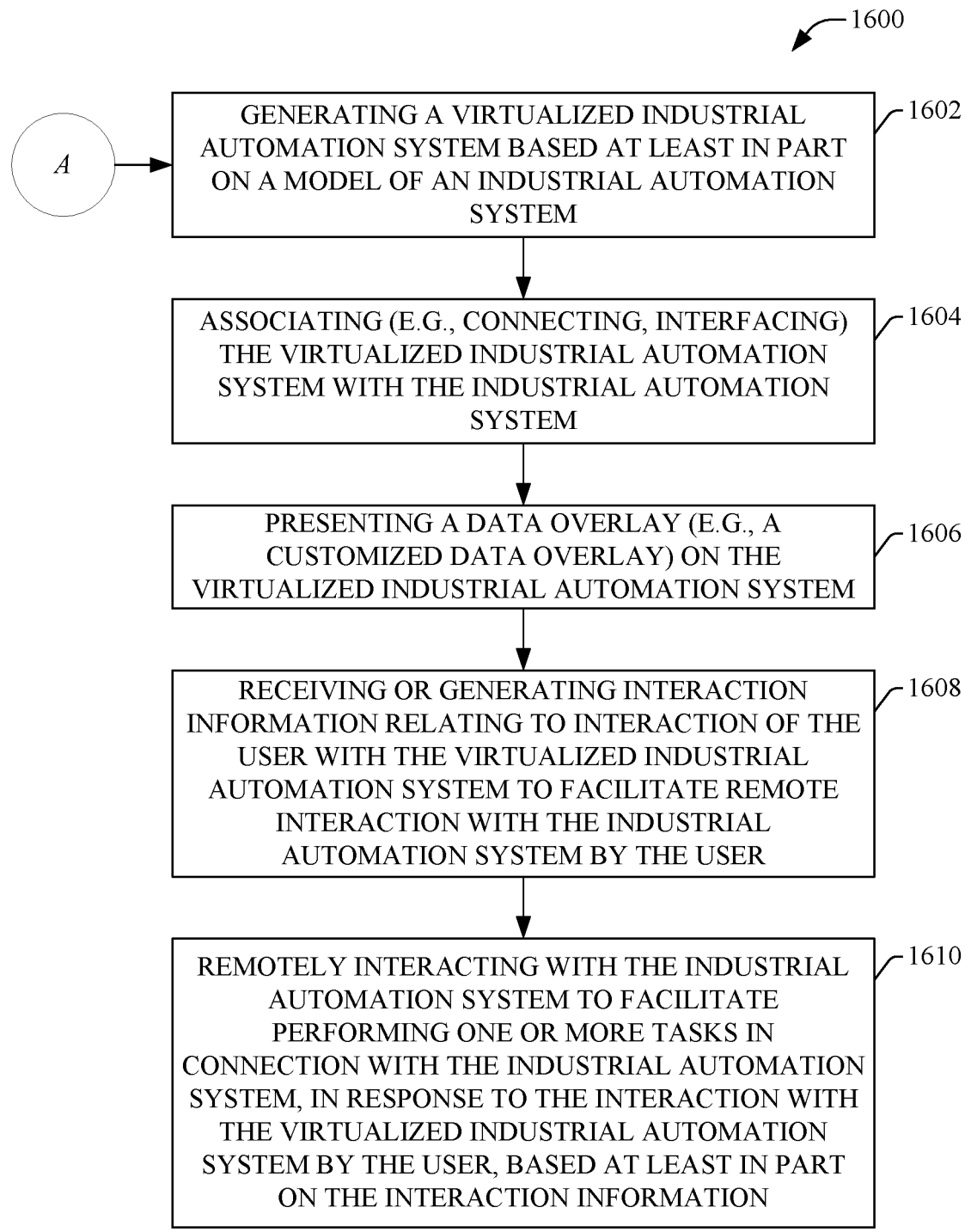
FIG. 16 presents a flow diagram of an example method that can generate and provide a virtualized industrial automation system based on a model of an industrial automation system, in accordance with various implementations and embodiments of the disclosed subject matter.

FIG. 16 presents a flow diagram of an example method 1600 that can generate and provide a virtualized industrial automation system based on a model of an industrial automation system, in accordance with various implementations and embodiments of the disclosed subject matter. The method 1600 can be implemented by a modeler system that can comprise a modeler component that can comprise a collection component, a data store, and/or a model management component, and/or a virtualization component. All or a desired portion of the modeler system and/or the virtualization component can reside in a cloud platform. In some implementations, the method 1600 can proceed from reference point A of the method 1500 (or from reference numeral 1404 of the method 1400).

At 1602, a virtualized industrial automation system can be generated based at least in part on a model of an industrial automation system. The virtualization component can retrieve information relating to the model of the industrial automation system from the cloud-based data store. Based at least in part on the information relating to the model and/or other data (e.g., other industrial-automation-system-related data), the virtualization component can virtualize the industrial automation system by generating a multi-dimensional (e.g., 2-D or 3-D) virtualized industrial automation system that can correspond, or at least substantially correspond, to the industrial automation system, wherein respective virtualized industrial assets can be virtually related to each other in the virtualized industrial system in a manner that at least substantially corresponds to the relationships between the corresponding industrial assets in the industrial automation system.

At 1604, the virtualized industrial automation system can be associated with (e.g., connected to, interfaced with) the industrial automation system. The virtualization component can facilitate associating the virtualized industrial automation system to the industrial automation system (e.g., to respective industrial assets and network-related devices of the industrial automation system).

At 1606, a data overlay (e.g., a customized data overlay) can be presented on the virtualized industrial automation system. The virtualization component can generate a data overlay that can be presented with the graphical representation of the virtualized industrial automation system on an interface (e.g., display screen, such as a touch-screen display) of a communication device of a user. The virtualization component can customize the data overlay and/or the view of the virtualized industrial automation system based at least in part on information (e.g., identifier, authentication credential) relating to the user, a role of the user in relation to the industrial automation system, a preference(s) of the user or enterprise entity, and/or factors, as more fully disclosed herein. This customization can facilitate providing the user with a relevant and useful view of the virtualized industrial automation system and relevant data (e.g., operational or status data) relating to the industrial automation system.

At 1608, interaction information relating to interaction of the user with the virtualized industrial automation system can be received or generated to facilitate remote interaction with the industrial automation system by the user. The user can interact (e.g., via one or more communication device interfaces) with the virtualized industrial automation system presented on the user's communication device to perform one or more work tasks in connection with the industrial automation system. In response to the interaction, the interaction information can be generated (e.g., by the virtualization component or communication device), wherein the virtualization component can receive the interaction information.

At 1610, the industrial automation system can be remotely interacted with (e.g., by the user via the virtualization component) to facilitate performing one or more tasks in connection with the industrial automation system, in response to the interaction with the virtualized industrial automation system by the user, based at least in part on the interaction information. The virtualization component can facilitate enabling the user to remotely interact with the industrial automation system based at least in part on the user's interaction with the virtualized industrial automation system to facilitate enabling the user to perform one or more tasks (e.g., work tasks) in connection with the industrial automation system. The tasks can comprise, for example, remote viewing of the industrial automation system via the viewing of the virtualized industrial automation system by the user, remotely controlling (e.g., remotely controlling operation of) the industrial automation system via the controlling (e.g., controlling operation) of the virtualized industrial automation system by the user, troubleshooting a problem with the industrial automation system remotely via the interaction with the virtualized industrial automation system by the user, remotely providing assistance in connection with the industrial automation system via the interaction with the virtualized industrial automation system by the user, and/or remotely performing other work tasks in connection with the industrial automation system via the interaction with the virtualized industrial automation system by the user.

Figure 17:
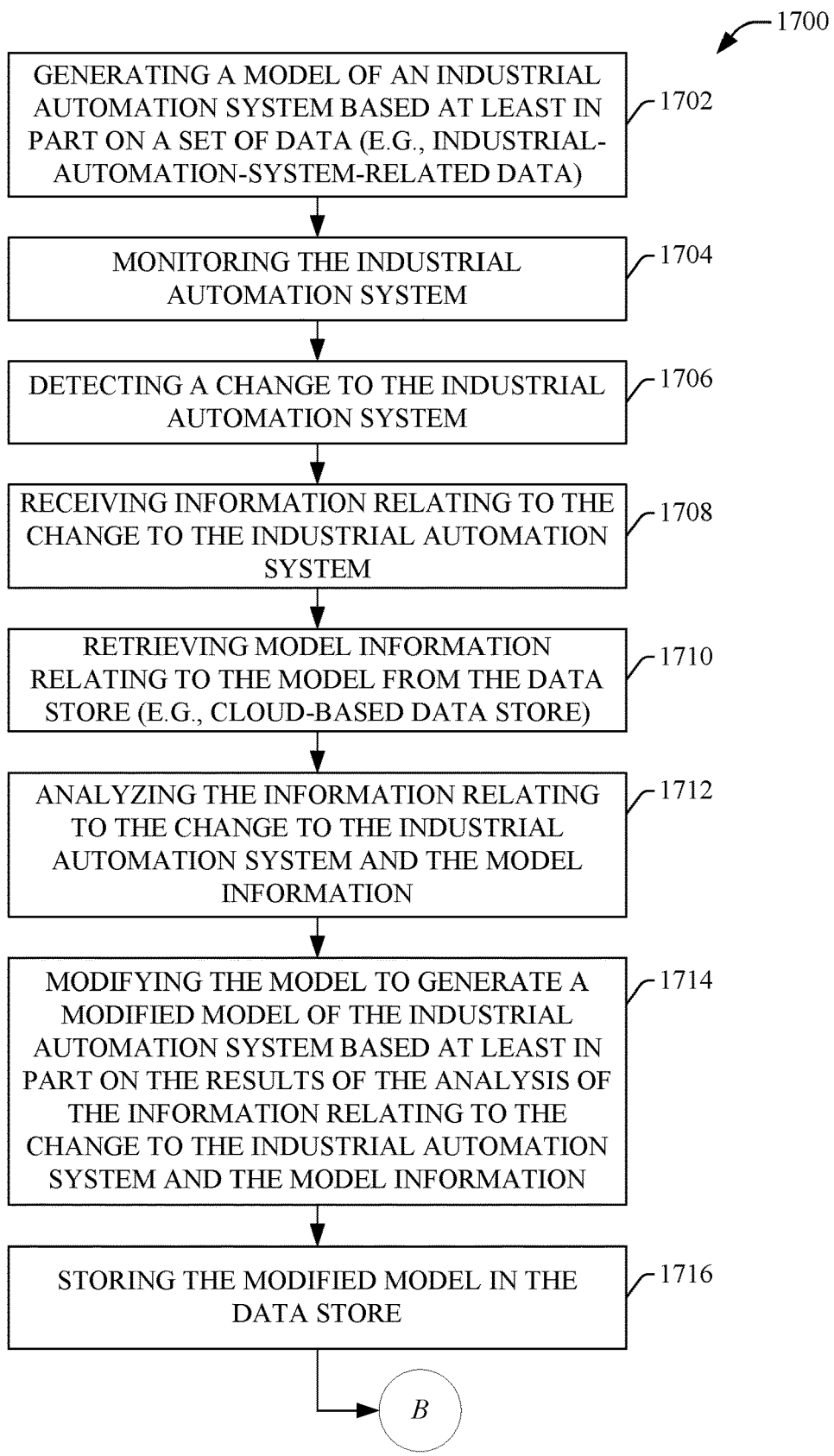
FIG. 17 presents a flow diagram of an example method that can modify a model of an industrial automation system in response to a change made to the industrial automation system, in accordance with various implementations and embodiments of the disclosed subject matter.

FIG. 17 presents a flow diagram of an example method 1700 that can modify a model of an industrial automation system in response to a change made to the industrial automation system, in accordance with various implementations and embodiments of the disclosed subject matter. The method 1700 can be implemented by a modeler system that can comprise a modeler component that can comprise a collection component, a data store, and/or a model management component. All or a desired portion of the modeler component can reside in a cloud platform.

At 1702, a model of an industrial automation system can be generated based at least in part on a set of data (e.g., industrial-automation-system-related data). The model management component can generate the model of the industrial automation system based at least in part on the set of data, as more fully disclosed herein.

At 1704, the industrial automation system can be monitored. The model management component can monitor the industrial automation system, for example, to identify or detect any change that has been made to the industrial automation system.

At 1706, a change to the industrial automation system can be detected (e.g., automatically or dynamically detected). The model management component can detect one or more changes to an industrial device, industrial process, other industrial asset, or network-related device of the industrial automation system. The one or more changes can comprise or related to, for example, a replacement of an industrial device, industrial asset, or network-related device, a modification of a connection or other relationship (e.g., functional or geographic relationship) between an industrial asset (e.g., industrial device, industrial process, or other industrial asset) and another component (e.g., another industrial asset, a network-related device), a modification of an industrial process, or a modification of a parameter(s) or configuration of an industrial asset or network-related device. For example, the model management component can detect or identify that an industrial device of the industrial automation system has been replaced with a new industrial device.

At 1708, information relating to the change to the industrial automation system can be received (e.g., in the cloud). The collection component can receive the information relating to the change to the industrial automation system. For example, if an industrial device has been replaced with a new industrial device, the model management component can poll the new industrial device for information relating to the new industrial device and/or other aspects of the change to the industrial automation system, and the new industrial device can provide such information to the collection component via a cloud gateway component associated with the new industrial device. The information can comprise, for example, a pre-deployed model of the new industrial device, configuration information relating to the new industrial device, parameter information relating to the new industrial device, or a relationship(s) (e.g., a functional or geographic relationship(s)) between the new industrial device and another industrial asset(s) or network-related device(s).

At 1710, model information relating to the model can be retrieved from the data store (e.g., cloud-based data store). The model management component can retrieve the model information from the data store.

At 1712, the information relating to the change to the industrial automation system and the model information can be analyzed. The model management component can analyze the information relating to the change to the industrial automation system and the model information to facilitate modifying or updating the model to reflect the change to the industrial automation system.

At 1714, the model can be modified to generate a modified model of the industrial automation system based at least in part on the results of the analysis of the information relating to the change to the industrial automation system and the model information. The model management component can modify the model to generate the modified model based at least in part on the analysis results. The modified model can incorporate and model the change to the industrial automation system. For example, if the change information comprises a pre-deployed model of the industrial device, the model management component can incorporate the pre-deployed model of the industrial device and any other associated change information in the model to update the model to generate the modified model.

At 1716, the modified model can be stored in the data store. The model management component can store the modified model in the cloud-based data store. The model management component also can provide (e.g., present, communicate) the modified model or a corresponding virtualized industrial automation system to a communication device associated with a user for use by the user in performing work tasks in connection with the industrial automation system. At this point, the method 1700 can proceed to reference point B, wherein the method 1800 can proceed from reference point B, as disclosed herein.

Figure 18:
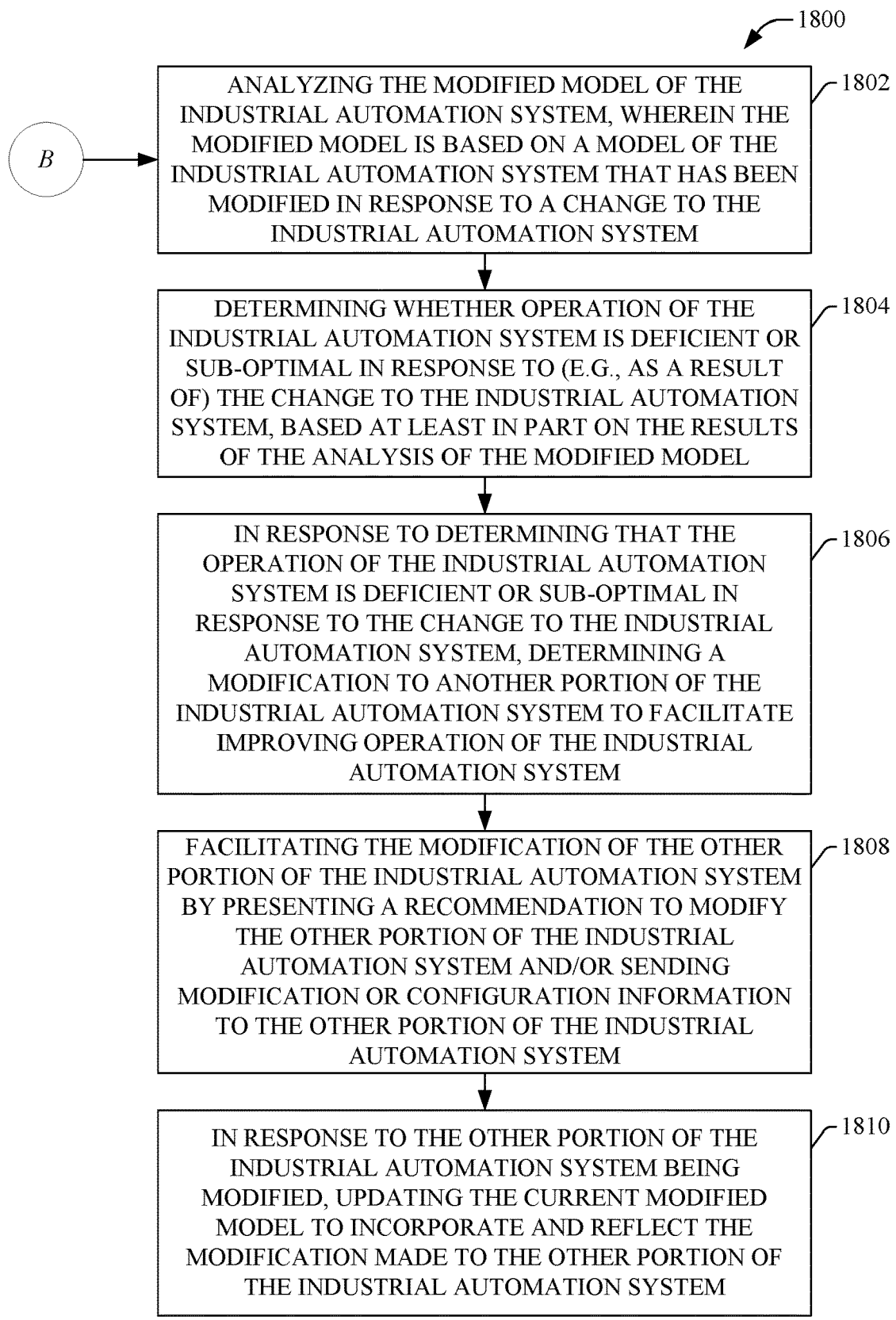
FIG. 18 depicts a flow diagram of an example method that, in response to a change made to an industrial automation system, can use a model of the industrial automation system to facilitate modification of another portion of the industrial automation system, in accordance with various implementations and embodiments of the disclosed subject matter.

FIG. 18 depicts a flow diagram of an example method 1800 that, in response to a change made to an industrial automation system, can use a model of the industrial automation system to facilitate modification of another portion of the industrial automation system, in accordance with various implementations and embodiments of the disclosed subject matter. In some implementations, the method 1800 can proceed, for example, from reference point B of the method 1700. The method 1800 can be implemented by a modeler system that can comprise a modeler component that can comprise a collection component, a data store, and/or a model management component, etc. All or a desired portion of the modeler system can reside in a cloud platform.

At 1802, the modified model of the industrial automation system can be analyzed, wherein the modified model is based on a model of the industrial automation system that has been modified in response to a change to the industrial automation system. The model management component can modify the model of the industrial automation system in response to, and to reflect (e.g., to account for), the change made to the industrial automation system. The model management component also can analyze the modified model (e.g., analyze modified model information of the modified model) of the industrial automation system to facilitate determining whether it is desirable (e.g., optimal, suitable) to make a change to another portion of the industrial automation system in response to the change (e.g., replacement of an industrial device) made to the industrial automation system.

For example, as part of the analysis, the model management component or another component (e.g., a simulator component) can use the modified model to perform a simulation of operation of the industrial automation system, as modified by the change made thereto. The model management component can analyze the results of the simulation of the operation of the industrial automation system to facilitate determining whether the modified model is performing as desired (e.g., optimally, suitably), and thus, whether the industrial automation system is performing as desired in response to the change to the industrial automation system.

At 1804, a determination can be made regarding whether operation of the industrial automation system is deficient or sub-optimal in response to (e.g., as a result of) the change to the industrial automation system, based at least in part on the results of the analysis of the modified model. For example, a determination can be made regarding whether the simulation operation of the industrial automation system using the modified model indicates deficient or sub-optimal operation of the industrial automation system, for example, in response to the change to the industrial automation system. Based at least in part on the results of the simulation of the industrial automation system, via the modified model, the model management component can determine whether the simulated operation of the simulated industrial automation system, based on the modified model, indicates that the operation of the industrial automation system is deficient or sub-optimal, and/or can be improved, to facilitate determining whether operation of the industrial automation system can be improved.

At 1806, in response to determining that the operation of the industrial automation system is deficient or sub-optimal in response to the change to the industrial automation system, a modification to another portion of the industrial automation system can be determined to facilitate improving operation of the industrial automation system. The model management component can determine one or more changes that can be made to another portion of the industrial automation system to facilitate improving operation of the industrial automation system. For example, in response to a change (e.g., replacement of an industrial device) in one portion of the industrial automation system, the model management component can determine that operation of the industrial automation system is deficient and can be improved, and can determine a modification that can be made to another portion of the industrial automation system to facilitate improving operation of the industrial automation system. For example, based at least in part on the analysis results, the model management component can determine that a modification of the configuration of another industrial device or industrial process, in response to (e.g., to account for) the change (e.g., replacement of an industrial device) to the industrial automation system, can improve operation of the industrial automation system.

At 1808, the modification of the other portion of the industrial automation system can be facilitated by presenting a recommendation to modify the other portion of the industrial automation system and/or sending modification or configuration information to the other portion of the industrial automation system. The model management component can facilitate modification of the other portion of the industrial automation system to facilitate improving operation of the industrial automation system, for example, by generating and presenting the recommendation to modify the other portion of the industrial automation system and/or by generating and sending modification or configuration information to the other portion of the industrial automation system.

At 1810, in response to the other portion of the industrial automation system being modified, the current modified model can be updated (e.g., modified) to incorporate and reflect the modification made to the other portion of the industrial automation system. In response to the other portion of the industrial automation system being modified, the model management component can request, the industrial automation system can provide (e.g., via one or more cloud gateway devices), and/or the collection component can receive data (e.g., industrial-automation-system-related data) relating to the operation of the industrial automation system, based at least in part on the modification of the other portion of the industrial automation system. The model management component can analyze the received data, and can update the current modified model to incorporate and reflect the modification made to the other portion of the industrial automation system, thereby creating a new modified model.

It is to be appreciated and understood that the method 1800 can performed in a different manner or different order to facilitate achieving desirable operation of the industrial automation system. For example, when there is time (e.g., in a non-emergency or non-time-critical situation) to simulate the change to the industrial automation system to test the results of such a change, prior to actually making the change, the method 1800 can be modified to perform the simulation of the operation of the industrial automation system, using the modified model, analyze the results of the simulation to determine whether operation of the industrial automation system will be deficient as a result of the change, determine a modification that can be made to another portion of the industrial automation system to account for the change and improve operation of the industrial automation system after the change, and facilitate making the modification to the other portion of the industrial automation system (e.g., by sending modification or configuration information to the other portion of the industrial automation system, and/or by generating a recommendation to modify the other portion of the industrial automation system).

Figure 19:
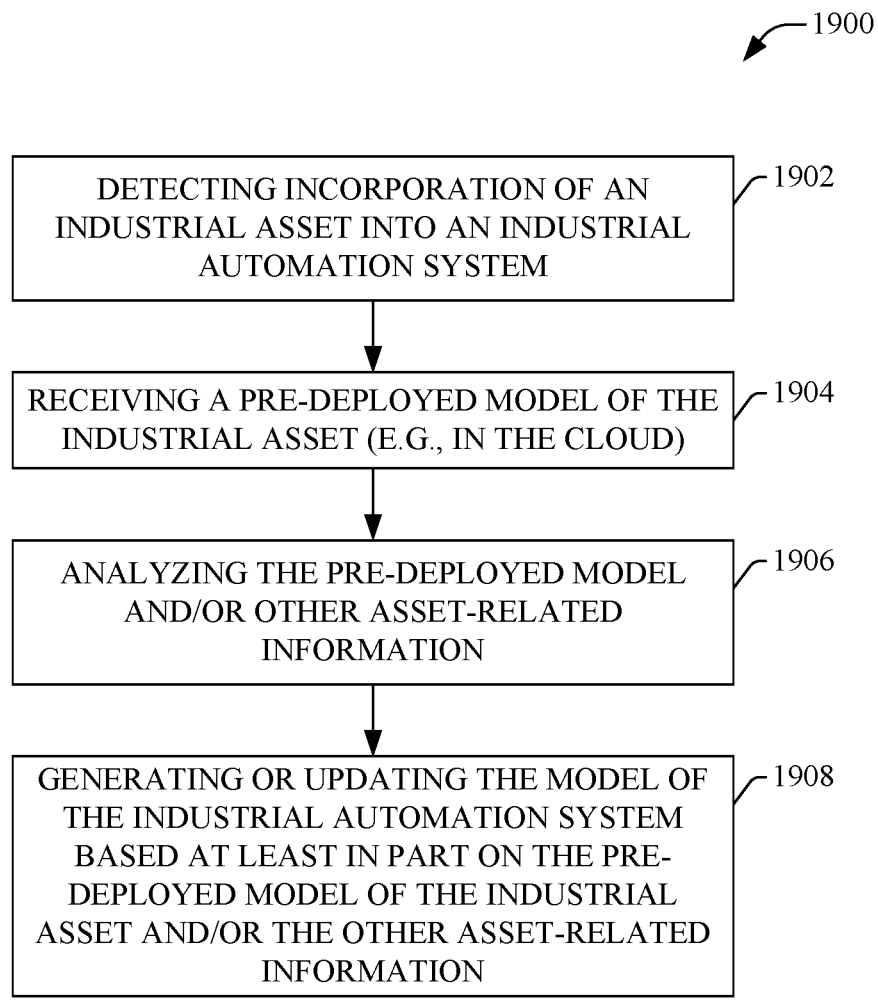
FIG. 19 presents a flow diagram of an example method that can employ a pre-deployed model associated with an industrial asset to facilitate generating or updating a model of an industrial automation system, in accordance with various implementations and embodiments of the disclosed subject matter.

FIG. 19 presents a flow diagram of an example method 1900 that can employ a pre-deployed model associated with an industrial asset to facilitate generating or updating a model of an industrial automation system, in accordance with various implementations and embodiments of the disclosed subject matter. The method 1900 can be implemented by a modeler system that can comprise a modeler component that can comprise a collection component, a data store, and/or a model management component, etc. All or a desired portion of the modeler system can reside in a cloud platform.

At 1902, incorporation of an industrial asset into an industrial automation system can be detected. During the building or modification of the industrial automation system, the industrial asset can be placed into service in and made part of an industrial automation system. The model management component can detect or discover that the industrial asset (e.g., industrial device, process, or other asset) has been incorporated into the industrial automation system. For example, the industrial asset can comprise, be integrated with, or otherwise be associated with a cloud gateway device that can facilitate communication of information between the industrial asset and the cloud, wherein the modeler component can reside. The model management component can detect presence information and/or an asset identifier that can be presented to the model management component from the industrial asset via the cloud gateway device.

At 1904, a pre-deployed model of the industrial asset can be received (e.g., in the cloud). The model management component can poll (e.g., query) the industrial asset (e.g., an information provider component of the industrial asset) to request information regarding the industrial asset, wherein the information can comprise, for example, a pre-deployed model of the industrial asset, identifier information of the industrial asset, specifications of the industrial asset, information indicating functionality or capabilities of the industrial asset, information indicating relationships (e.g., functional and/or geographical relationships) between the industrial asset and another industrial asset(s) in the industrial automation system, information indicating compatible platforms for the industrial asset, and/or other information.

At 1906, the pre-deployed model and/or other asset-related information can be analyzed. The model management component can analyze information relating to the pre-deployed model of the industrial asset and/or other asset-related information received from the industrial asset or other sources (e.g., extrinsic sources) to facilitate modeling the industrial asset in the model of the industrial automation system.

At 1908, the model of the industrial automation system can be generated or updated based at least in part on the pre-deployed model of the industrial asset and/or the other asset-related information. The model management component can generate or update the model of the industrial automation system based at least in part on the information relating to the pre-deployed model of the industrial asset and/or the other asset-related information to facilitate incorporating the pre-deployed model into the model of the industrial automation system.

Figure 20:
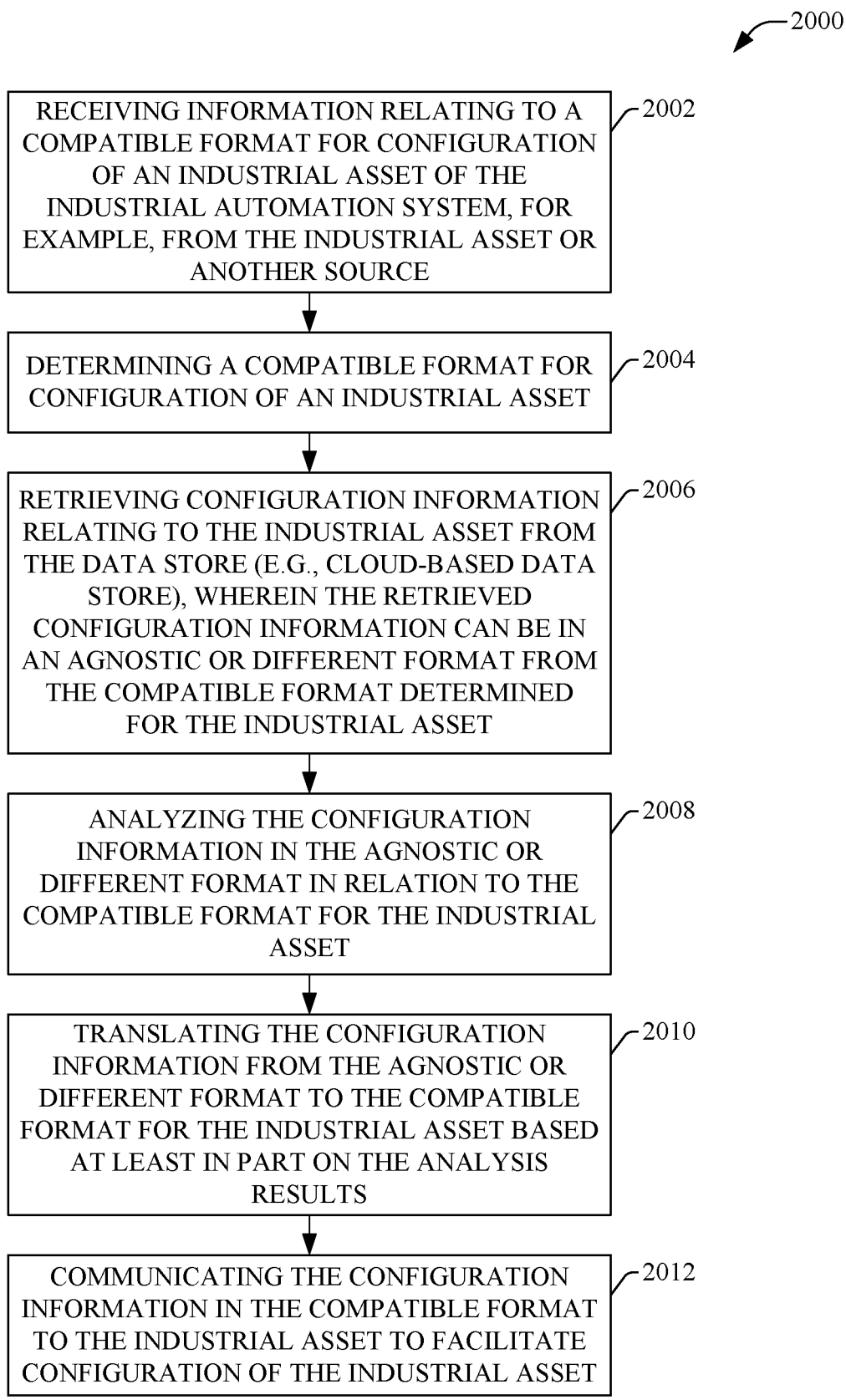
FIG. 20 illustrates a flow diagram of an example method that can translate configuration information relating to an industrial asset to a format that is compatible with the industrial asset, in accordance with various implementations and embodiments of the disclosed subject matter.

FIG. 20 illustrates a flow diagram of an example method 2000 that can translate configuration information relating to an industrial asset to a format that is compatible with the industrial asset, in accordance with various implementations and embodiments of the disclosed subject matter. The method 2000 can be implemented by a modeler system that can comprise a modeler component that can comprise a collection component, a data store, and/or a model management component, etc. All or a desired portion of the modeler system can reside in a cloud platform.

At 2002, information relating to a compatible format for configuration of an industrial asset of the industrial automation system can be received, for example, from the industrial asset or another source. The model management component can receive information relating to a compatible format for configuration of the industrial asset from the industrial asset (e.g., via an associated cloud gateway device) or another source (e.g., extrinsic source, such as the supplier or manufacturer of the industrial asset). The information can comprise information indicating what format(s) (e.g., computer language or code format is supported, a manufacturer, type, or model of the industrial asset, a platform(s) (e.g., operational platform(s)) that is supported by the industrial asset, and/or other format-related information.

At 2004, a compatible format for configuration of an industrial asset can be determined. The model management component can analyze the received information relating to the compatible format for configuration of the industrial asset. Based at least in part on the analysis results, the model management component can determine or identify a compatible format for configuration of the industrial asset.

At 2006, configuration information relating to the industrial asset can be retrieved from the data store (e.g., cloud-based data store), wherein the retrieved configuration information can be in an agnostic or different format from the compatible format determined for the industrial asset. The model management component At 2008, the configuration information in the agnostic or different format can be analyzed in relation to the compatible format for the industrial asset. The model management component can analyze the retrieved configuration information in relation to the compatible format for the industrial asset to facilitate translating the configuration to the compatible format.

At 2010, the configuration information can be translated from the agnostic or different format to the compatible format for the industrial asset based at least in part on the analysis results. The model management component can translate the configuration information from the agnostic or different format to the compatible format for the industrial asset based at least in part on the analysis results.

At 2012, the configuration information in the compatible format can be communicated to the industrial asset to facilitate configuration of the industrial asset. The model management component can communicate the configuration information in the compatible format to the industrial asset in the industrial automation system. The industrial asset (e.g., via the associated cloud gateway device) can receive the configuration information in the compatible format. The industrial asset can be configured (e.g., can configure itself) using the configuration information in the compatible format to facilitate desired operation of the industrial asset in the industrial automation system.

Embodiments, systems, and components described herein, as well as industrial automation or control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drive(s), as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 21:
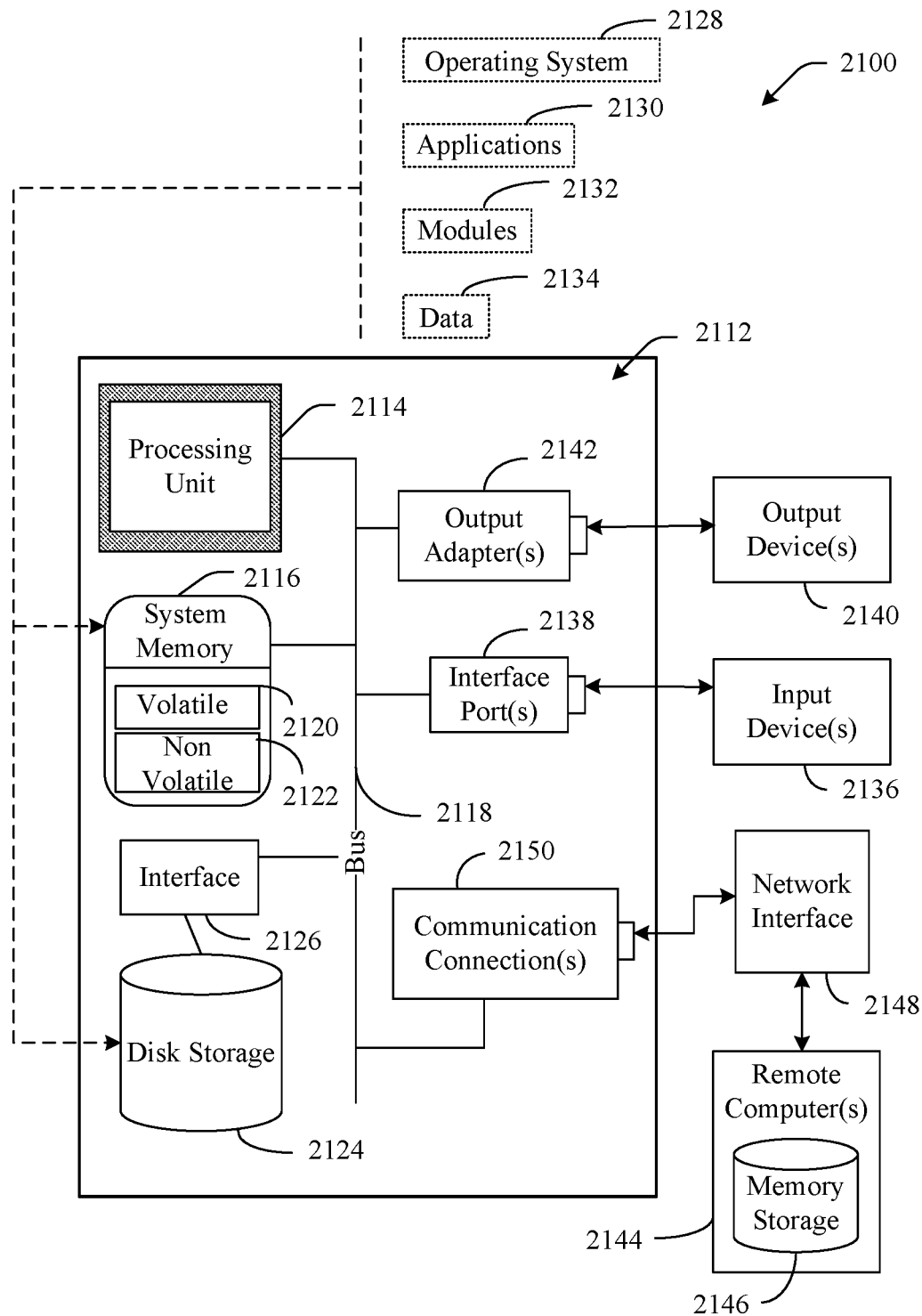
FIG. 21 is an example computing and/or operating environment.
Figure 22:
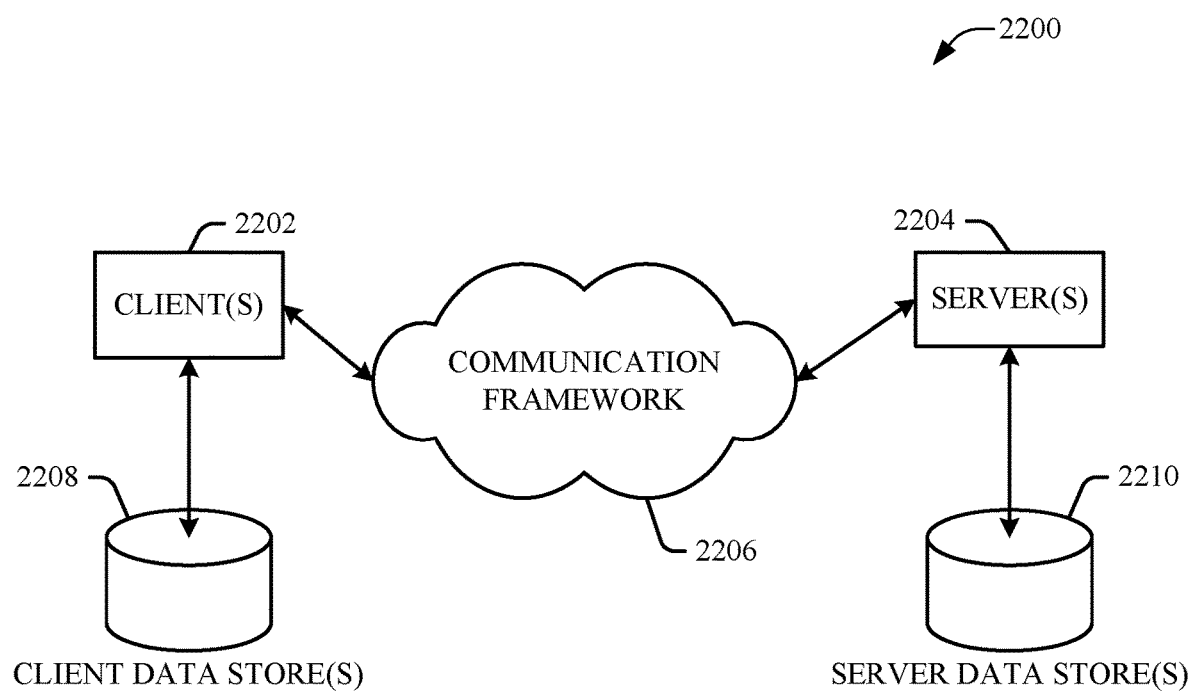
FIG. 22 is an example computing and/or networking environment.

In order to provide a context for the various aspects of the disclosed subject matter, FIGS. 21 and 22 as well as the following discussion are intended to provide a brief, general description of a suitable environment in which the various aspects of the disclosed subject matter can be implemented.

With reference to FIG. 21, an example environment 2100 for implementing various aspects of the aforementioned subject matter includes a computer 2112. The computer 2112 includes a processing unit 2114, a system memory 2116, and a system bus 2118. The system bus 2118 couples system components including, but not limited to, the system memory 2116 to the processing unit 2114. The processing unit 2114 can be any of various available processors. Multi-core microprocessors and other multiprocessor architectures also can be employed as the processing unit 2114.

The system bus 2118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2116 includes volatile memory 2120 and nonvolatile memory 2122. The basic input/output system (BIOS), containing the basic routines to transfer information between elements within the computer 2112, such as during start-up, is stored in nonvolatile memory 2122. By way of illustration, and not limitation, nonvolatile memory 2122 can include read only memory (ROM), programmable ROM (PROM), electrically programmable ROM (EPROM), electrically erasable PROM (EEPROM), or flash memory. Volatile memory 2120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2112 also includes removable/non-removable, volatile/non-volatile computer storage media. FIG. 21 illustrates, for example a disk storage 2124. Disk storage 2124 includes, but is not limited to, devices like a magnetic disk drive, floppy disk drive, tape drive, Jaz drive, Zip drive, LS-100 drive, flash memory card, or memory stick. In addition, disk storage 2124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2124 to the system bus 2118, a removable or non-removable interface is typically used such as interface 2126.

It is to be appreciated that FIG. 21 describes software that acts as an intermediary between users and the basic computer resources described in suitable operating environment 2100. Such software includes an operating system 2128. Operating system 2128, which can be stored on disk storage 2124, acts to control and allocate resources of the computer 2112. System applications 2130 take advantage of the management of resources by operating system 2128 through program modules 2132 and program data 2134 stored either in system memory 2116 or on disk storage 2124. It is to be appreciated that one or more embodiments of the subject disclosure can be implemented with various operating systems or combinations of operating systems.

A user enters commands or information into the computer 2112 through input device(s) 2136. Input devices 2136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2114 through the system bus 2118 via interface port(s) 2138. Interface port(s) 2138 include, for example, a serial port, a parallel port, a game port, and a universal serial bus (USB). Output device(s) 2140 use some of the same type of ports as input device(s) 2136. Thus, for example, a USB port may be used to provide input to computer 2112, and to output information from computer 2112 to an output device 2140. Output adapters 2142 are provided to illustrate that there are some output devices 2140 like monitors, speakers, and printers, among other output devices 2140, which require special adapters. The output adapters 2142 include, by way of illustration and not limitation, video and sound cards that provide a means of connection between the output device 2140 and the system bus 2118. It should be noted that other devices and/or systems of devices provide both input and output capabilities such as remote computer(s) 2144.

Computer 2112 can operate in a networked environment using logical connections to one or more remote computers, such as remote computer(s) 2144. The remote computer(s) 2144 can be a personal computer, a server, a router, a network PC, a workstation, a microprocessor based appliance, a peer device or other common network node and the like, and typically includes many or all of the elements described relative to computer 2112. For purposes of brevity, only a memory storage device 2146 is illustrated with remote computer(s) 2144. Remote computer(s) 2144 is logically connected to computer 2112 through a network interface 2148 and then physically connected via communication connection 2150. Network interface 2148 encompasses communication networks such as local-area networks (LAN) and wide-area networks (WAN). LAN technologies include Fiber Distributed Data Interface (I-DDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2150 refers to the hardware/software employed to connect the network interface 2148 to the system bus 2118. While communication connection 2150 is shown for illustrative clarity inside computer 2112, it can also be external to computer 2112. The hardware/software necessary for connection to the network interface 2148 includes, for exemplary purposes only, internal and external technologies such as, modems including regular telephone grade modems, cable modems and DSL modems, ISDN adapters, and Ethernet cards.

FIG. 22 is a schematic block diagram of a sample computing and/or networking environment 2200 with which the disclosed subject matter can interact. The computing and/or networking environment 2200 can include one or more clients 2202. The client(s) 2202 can be hardware and/or software (e.g., threads, processes, computing devices). The computing and/or networking environment 2200 also can include one or more servers 2204. The server(s) 2204 can also be hardware and/or software (e.g., threads, processes, computing devices). The servers 2204 can house threads to perform transformations by employing one or more embodiments as described herein, for example. One possible communication between a client 2202 and servers 2204 can be in the form of a data packet adapted to be transmitted between two or more computer processes. The computing and/or networking environment 2200 can include a communication framework 2206 that can be employed to facilitate communications between the client(s) 2202 and the server(s) 2204. The client(s) 2202 are operably connected to one or more client data stores 2208 that can be employed to store information local to the client(s) 2202. Similarly, the server(s) 2204 are operably connected to one or more server data stores 2210 that can be employed to store information local to the servers 2204.

What has been described above includes examples of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

It is to be appreciated and understood that components (e.g., modeler component, model management component, virtualization component, collection component, communication device, information provider component, processor component, data store, etc.), as described with regard to a particular system or method, can include the same or similar functionality as respective components (e.g., respectively named components or similarly named components) as described with regard to other systems or methods disclosed herein.

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
   a memory that stores computer-executable components; and
   a processor, operatively coupled to the memory, that executes the computer-executable components, the computer-executable components comprising:
      a collection component configured to collect a set of industrial data from a first set of devices of a first industrial automation system or an extrinsic data source;
      a modeler component configured to determine a model representative of a second industrial automation system, comprising a second set of devices, based on a result of an analysis of the set of industrial data,
         wherein the modeler component is configured to simulate or emulate operation of the second industrial automation system, including simulation or emulation of operation of the second set of devices, based on application of operation data to the model,
         wherein the modeler component is configured to generate simulated operational response data indicative of an operational response of the second industrial automation system in response to application of the operation data to the second industrial automation system, based on the application of the operation data to the model representative of the second industrial automation system, and
         wherein the modeler component is configured to determine whether to implement the second industrial automation system based on the simulated operational response data.

2. The system of claim 1, wherein the model representative of the second industrial automation system is representative of a design of the second industrial automation system, including respective designs of respective devices of the second set of devices, and wherein the modeler component is configured to determine whether to implement or modify the design of the second industrial automation system based on the simulated operational response data.

3. The system of claim 2, wherein, based on an analysis of the simulated operational response data, the modeler component is configured to determine whether a simulated performance of the model representative of the design of the second industrial automation system satisfies a favorable performance criterion relating to industrial automation system performance, to facilitate determining whether the second industrial automation system is expected to satisfy the defined favorable performance criterion, and to facilitate determining whether to implement or modify the design of the second industrial automation system.

4. The system of claim 3, wherein, in response to determining that the simulated performance satisfies the favorable performance criterion, the modeler component is configured to determine that the second industrial automation system is expected to satisfy the favorable performance criterion, and determine that the design of the second industrial automation system is to be implemented.

5. The system of claim 3, wherein, in response to determining that the simulated performance does not satisfy the favorable performance criterion, the modeler component is configured to determine that the second industrial automation system is not expected to satisfy the favorable performance criterion, and determine that the design of the second industrial automation system is not to be implemented.

6. The system of claim 3, wherein, in response to determining that the simulated performance does not satisfy the favorable performance criterion, and based on analysis the set of industrial data or the simulated operational response data, the modeler component is configured to determine a modification that is able to be made to the model to generate a modified model that is expected to result in a modified simulation of the modified model that satisfies the favorable performance criterion, and wherein the modification of the model is representative of a corresponding modification to the design of the second industrial automation system.

7. The system of claim 6, wherein the modeler component is configured to simulate or emulate operation of a modified second industrial automation system, comprising the corresponding modification, based on application of the operation data to the modified model,
wherein the modeler component is configured to generate simulated modified operational response data indicative of a modified operational response of the modified second industrial automation system in response to application of the operation data to the modified second industrial automation system, based on the application of the operation data to the modified model representative of the modified second industrial automation system, and
wherein the modeler component is configured to determine whether to implement a modified design of the modified second industrial automation system based on the simulated modified operational response data.

8. The system of claim 2, wherein the model is representative of respective functions of the respective devices, respective characteristics of the respective devices, respective configurations of the respective devices, respective locations of the respective devices in the second industrial automation system, respective interrelationships between the respective devices in the second industrial automation system, or respective processes of the second industrial automation system.

9. The system of claim 1, wherein the first industrial automation system comprises a first industrial device and a second industrial device, wherein, to facilitate the generation of the model, the set of industrial data comprises device identification data received from the first industrial device, wherein the device identification data identifies the first industrial device, the second industrial device, and a functional relationship and a connection between the first industrial device and the second industrial device, and wherein the first industrial device detects and identifies the second industrial device in proximity to the first industrial device and the functional relationship and the connection between the first industrial device and the second industrial device, and generates at least a portion of the device identification data that identifies the second industrial device and identifies the functional relationship and the connection between the first industrial device and the second industrial device.

10. The system of claim 9, wherein the second set of devices comprises a third industrial device and a fourth industrial device, wherein the third industrial device is same or substantially the same as the first industrial device, and wherein the fourth industrial device is same or substantially the same as the second industrial device.

11. The system of claim 1, wherein the model comprises respective modeled devices representative of respective devices of the second set of devices, wherein the operation data comprises control signal data relating to control signals or control commands applied to a modeled device of the respective modeled devices to simulate or emulate operation of a device of the respective devices in response to application of the control signals or the control commands to the device.

12. The system of claim 1, wherein at least one of the collection component, the modeler component, or a data store are part of a cloud platform, wherein the computer-executable components further comprise an interface component configured to interface at least one of the collection component, the modeler component, or the data store of the cloud platform with the first industrial automation system via a first cloud gateway component of the first industrial automation system or with the second industrial automation system via a second cloud gateway component of the second industrial automation system, and wherein at least one of the collection component, the modeler component, or the data store is configured to receive a portion of the set of industrial data from the first industrial automation system via the interface component.

13. The system of claim 1, wherein the extrinsic data source comprises at least one of an extrinsic data source device, a supplier or a manufacturer of a device of the first set of devices or the second set of devices, a website or a server associated with an Internet or a communication network, or a user associated with an industrial enterprise, the first industrial automation system, or the second industrial automation system.

14. A method, comprising:
determining, by a system comprising a processor, a model that corresponds to a second industrial automation system, comprising a second set of devices, based on a result of analyzing a set of industrial data received from a first set of devices of a first industrial automation system or an extrinsic data source;
simulating, by the system, operation of the second industrial automation system, including simulating operation of the second set of devices, based on applying operation data to the model;
in response to the simulating, generating, by the system, simulated operational response data that corresponds to an operational response of the second industrial automation system in response to applying the operation data to the second industrial automation system, based on the applying of the operation data to the model corresponding to the second industrial automation system; and determining, by the system, whether to implement or modify a design of the second industrial automation system based on the simulated operational response data.

15. The method of claim 14, wherein the determining of the model comprises determining a second model that corresponds to the second industrial automation system, comprising the second set of devices, based on the result of analyzing the set of industrial data received from the first set of devices of the first industrial automation system, a first model that corresponds to the first industrial automation system, and the extrinsic data source.

16. The method of claim 14, wherein the model corresponds to respective designs of respective devices of the second set of devices, respective functions of the respective devices, respective attributes of or associated with the respective devices, respective configurations of the respective devices, respective locations of the respective devices in the second industrial automation system, respective interrelationships between the respective devices in the second industrial automation system, or respective processes of the second industrial automation system.

17. The method of claim 14, further comprising:
based on analyzing the simulated operational response data, determining, by the system, whether a simulated performance of the model corresponding to the design of the second industrial automation system satisfies a favorable performance criterion relating to industrial automation system performance, to facilitate determining whether the second industrial automation system is expected to satisfy the defined favorable performance criterion, and to facilitate determining whether to implement the design of the second industrial automation system.

18. The method of claim 14, further comprising:
one of:
in response to determining that the simulated performance of the model satisfies the favorable performance criterion, determining, by the system, that the second industrial automation system is expected to satisfy the favorable performance criterion, and
determining, by the system, that the design of the second industrial automation system is to be implemented; or in response to determining that the simulated performance does not satisfy the favorable performance criterion, determining, by the system, that the second industrial automation system is not expected to satisfy the favorable performance criterion,
determining, by the system, that the design of the second industrial automation system is not to be implemented, and
determining, by the system, whether a model modification to the model is expected to satisfy the defined favorable performance criterion, wherein the model modification corresponds a modification of the design of the second industrial automation system.

19. A non-transitory machine-readable medium storing executable instructions that, in response to execution, cause a system comprising a processor to perform operations, comprising:
determining a model that relates to a second industrial automation system, comprising a second set of devices, based on a result of analyzing a set of industrial information obtained from a first set of devices of a first industrial automation system or an extrinsic information source;
simulating operation of the second industrial automation system, including simulating operation of the second set of devices, based on applying operation information to the model;
in response to the simulating, determining simulated operational response data that relates to an operational response of the second industrial automation system in response to applying the operation information to the second industrial automation system based on the applying of the operation information to the model relating to the second industrial automation system; and
determining whether to utilize a design of the second industrial automation system based on the simulated operational response information.

20. The non-transitory machine-readable medium of claim 19, wherein the model relates to respective designs of respective devices of the second set of devices, respective functions of the respective devices, respective characteristics of or associated with the respective devices, respective configurations of the respective devices, respective locations of the respective devices in the second industrial automation system, respective interrelationships between the respective devices in the second industrial automation system, or respective processes of the second industrial automation system.

* * * * *